A. RECHNITZER.
CALCULATING MACHINE.
APPLICATION FILED FEB. 21, 1910.

1,205,481.

Patented Nov. 21, 1916.
27 SHEETS—SHEET 1.

A. RECHNITZER.
CALCULATING MACHINE.
APPLICATION FILED FEB. 21, 1910.

1,205,481.

Patented Nov. 21, 1916.
27 SHEETS—SHEET 5.

Witnesses.

Inventor
Alexander Rechnitzer
by
Emerson R. Newell
Attorney

A. RECHNITZER.
CALCULATING MACHINE.
APPLICATION FILED FEB. 21, 1910.

1,205,481.

Patented Nov. 21, 1916.
27 SHEETS—SHEET 6.

Witnesses.
Inventor.
Alexander Rechnitzer
by
Emerson R. Newell
Attorney.

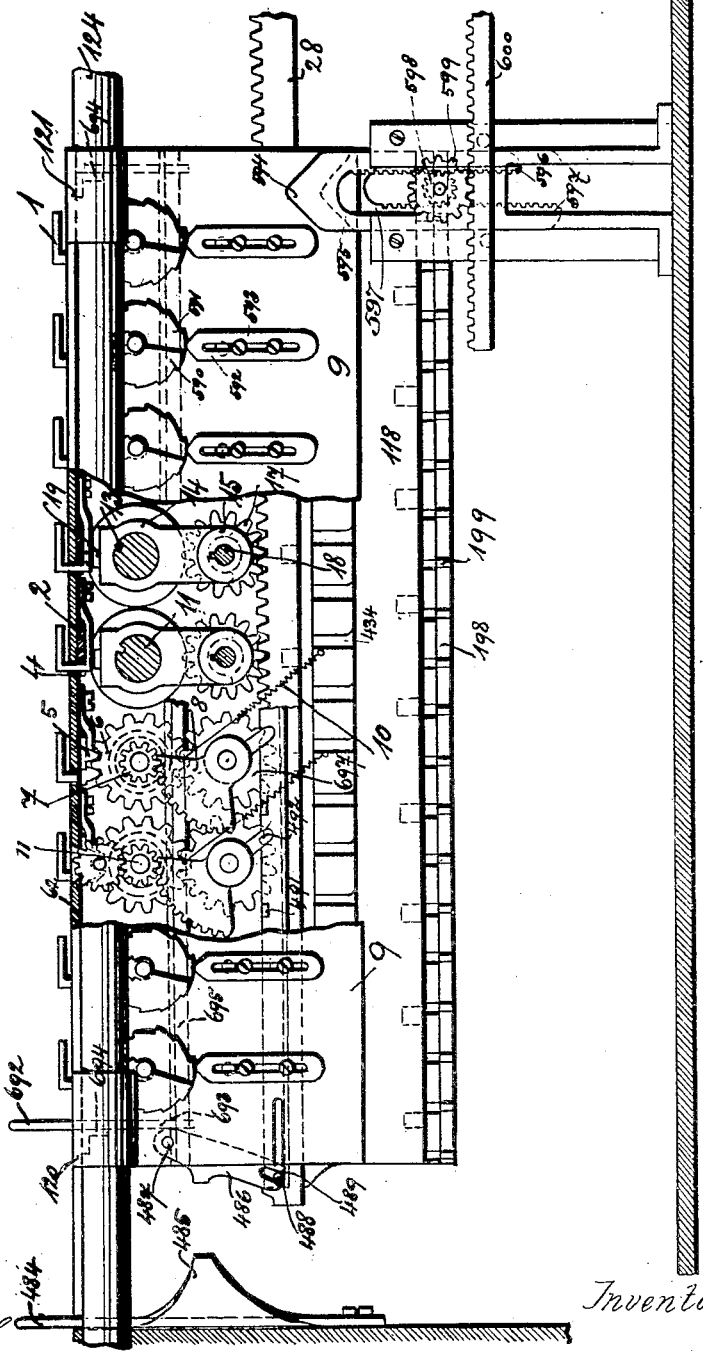

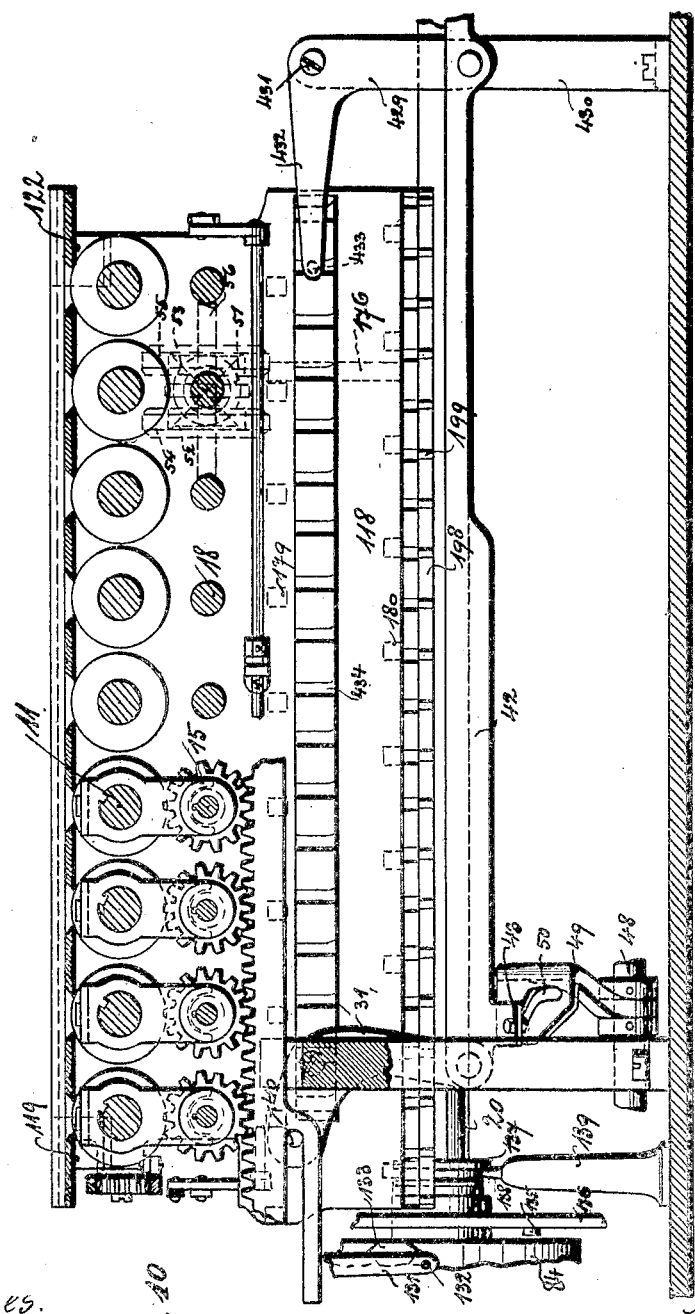

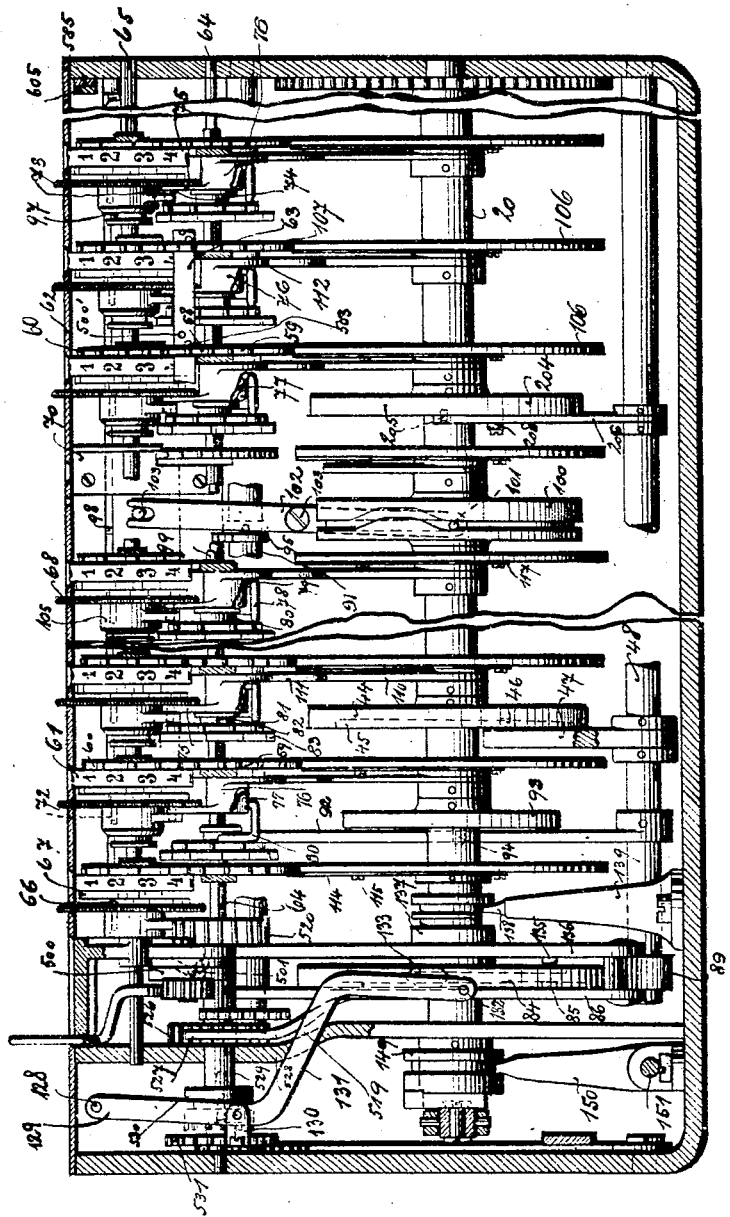

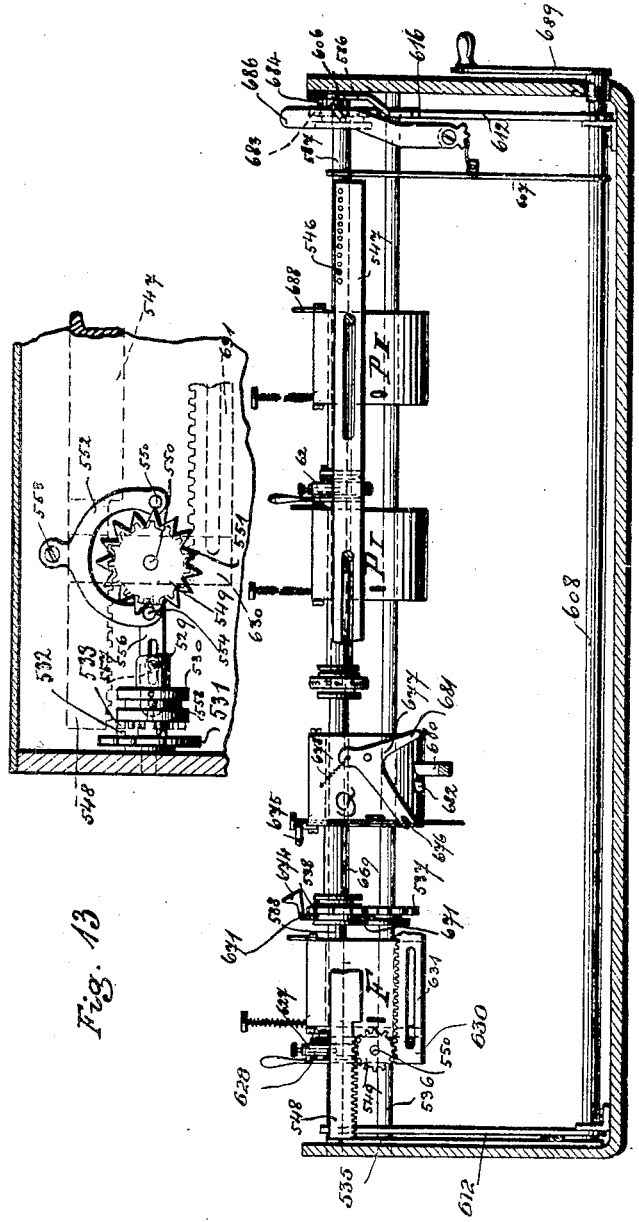

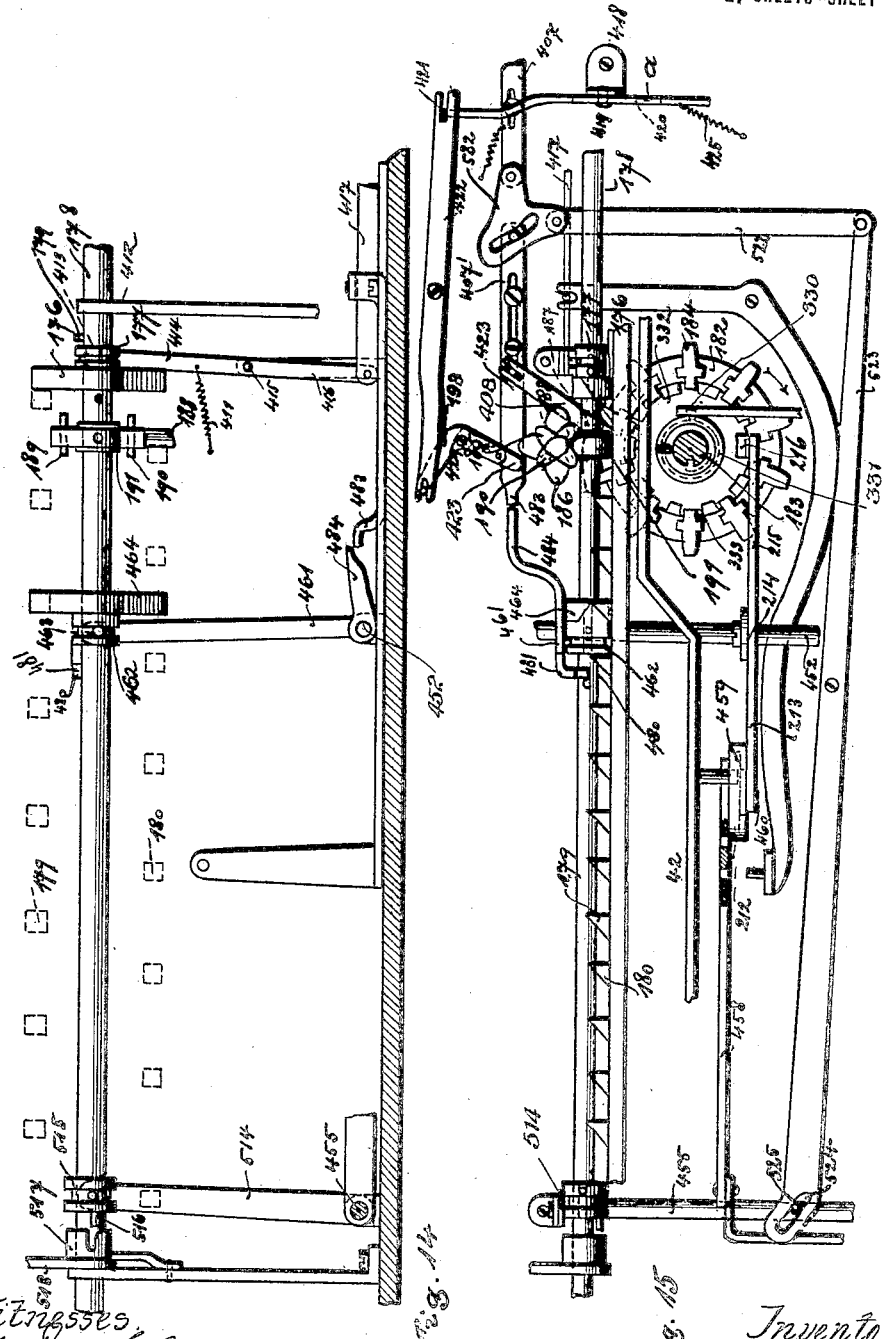

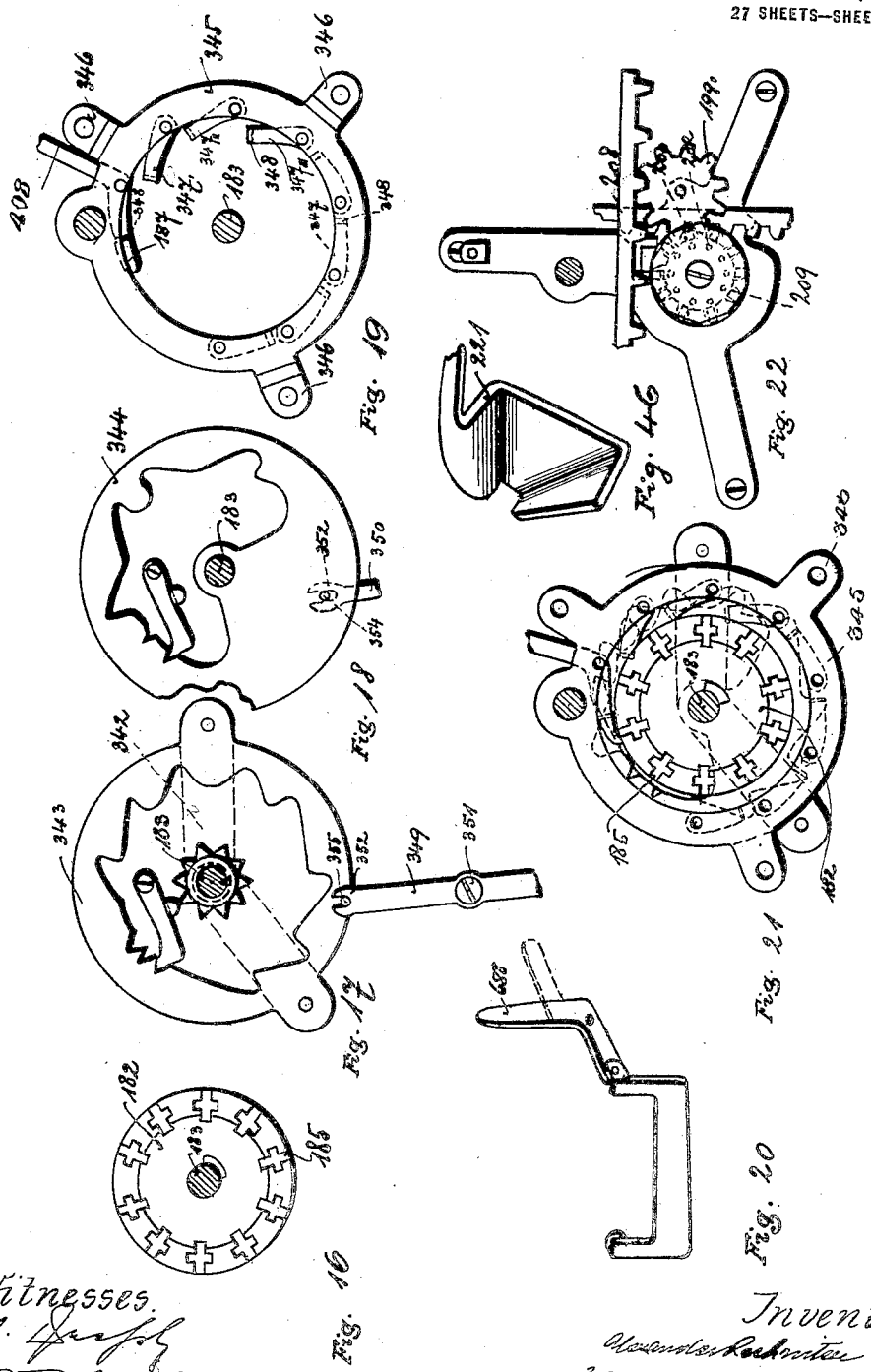

A. RECHNITZER.
CALCULATING MACHINE.
APPLICATION FILED FEB. 21, 1910.
1,205,481.
Patented Nov. 21, 1916.
27 SHEETS—SHEET 15.
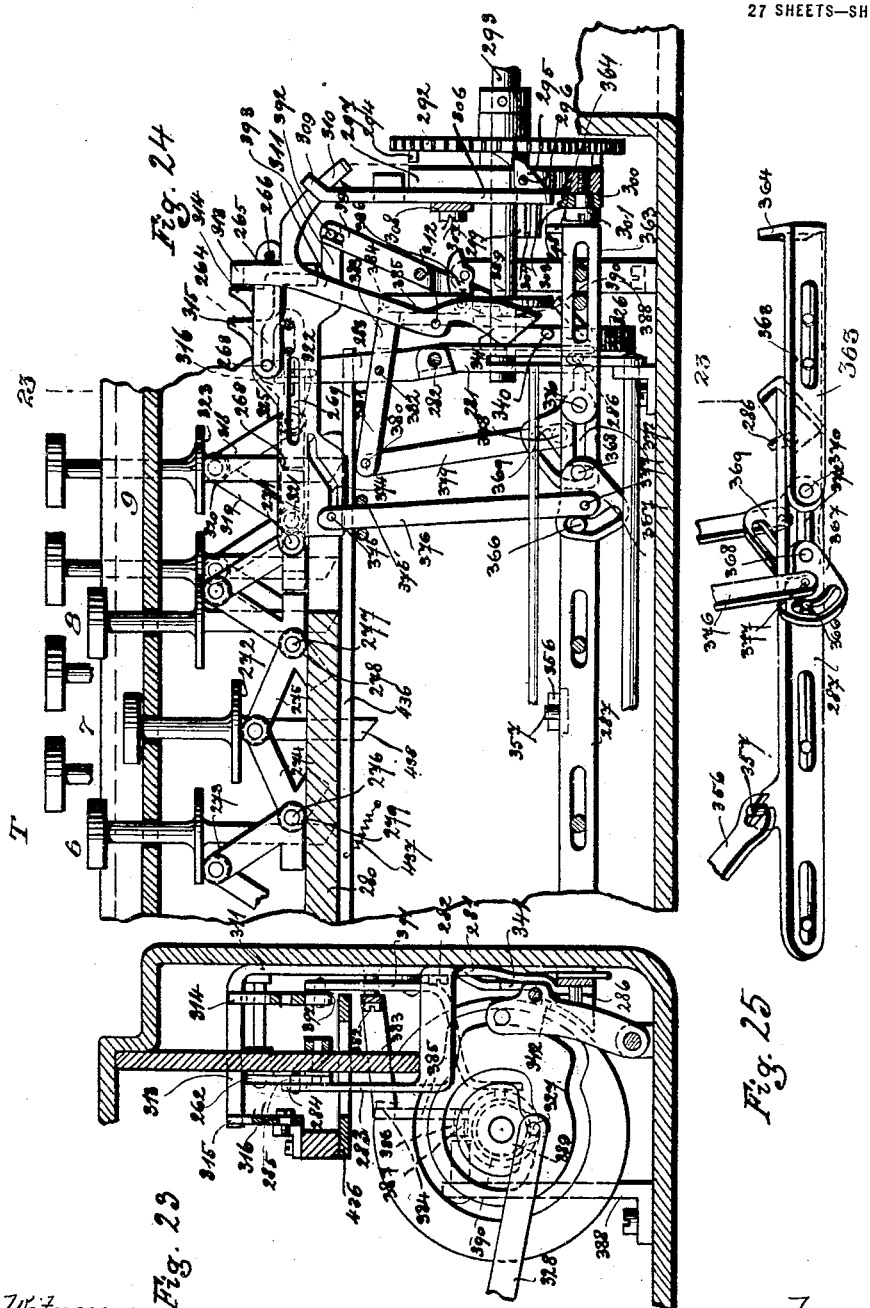

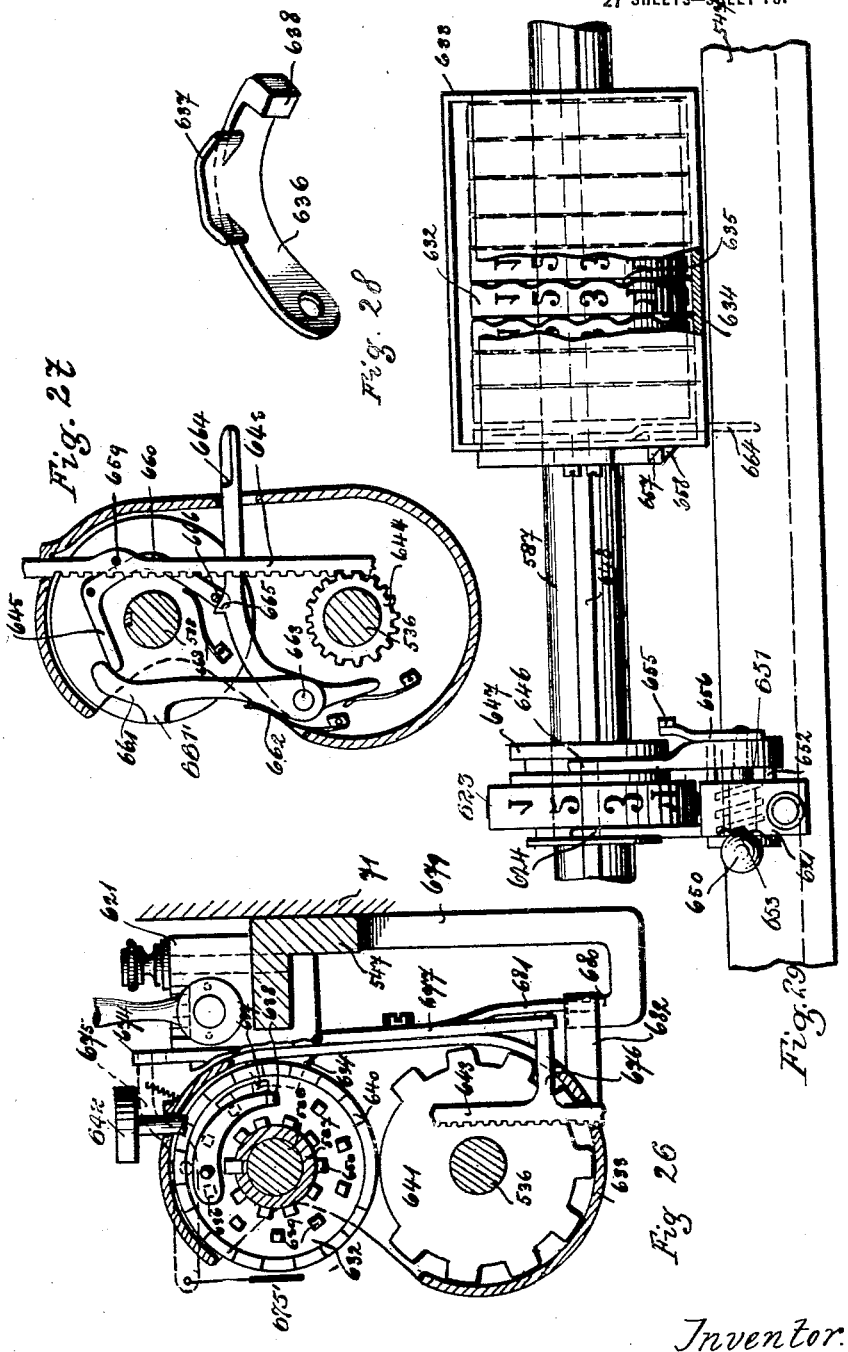

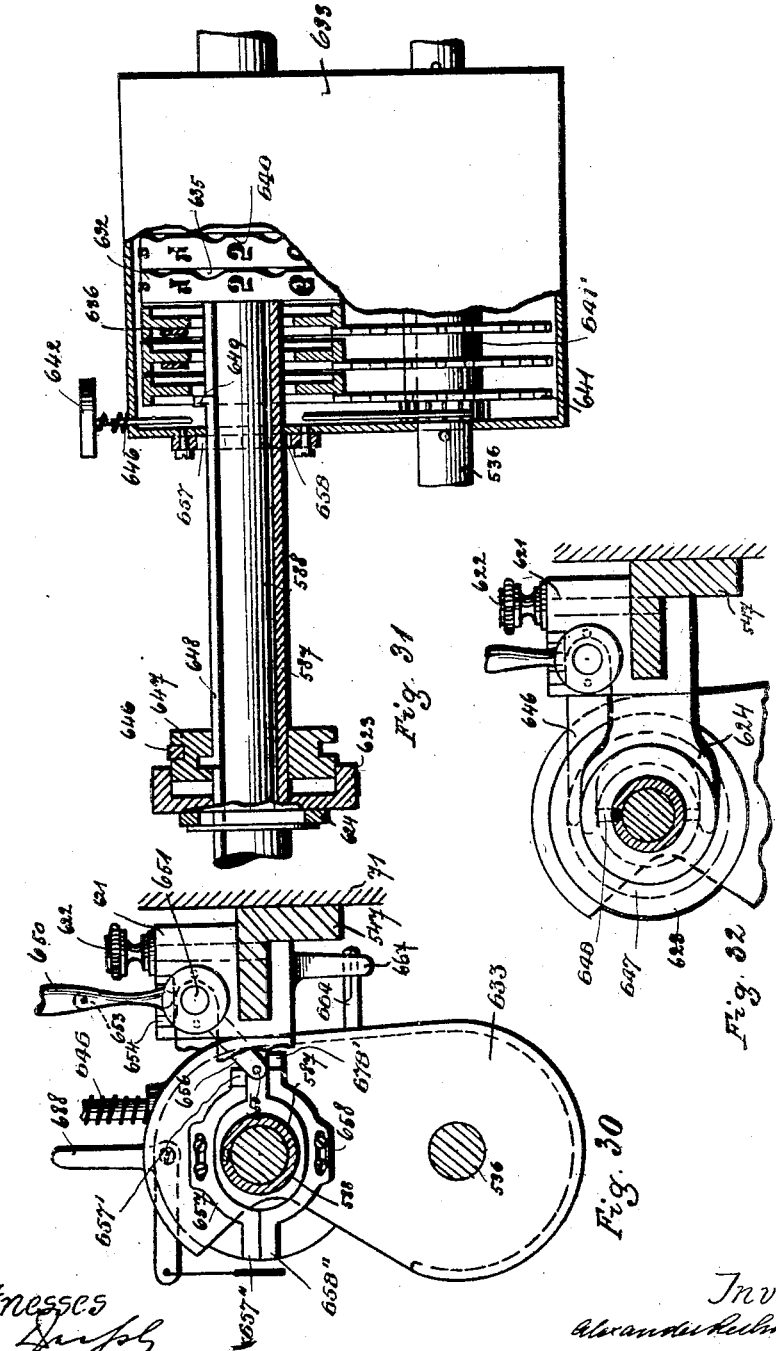

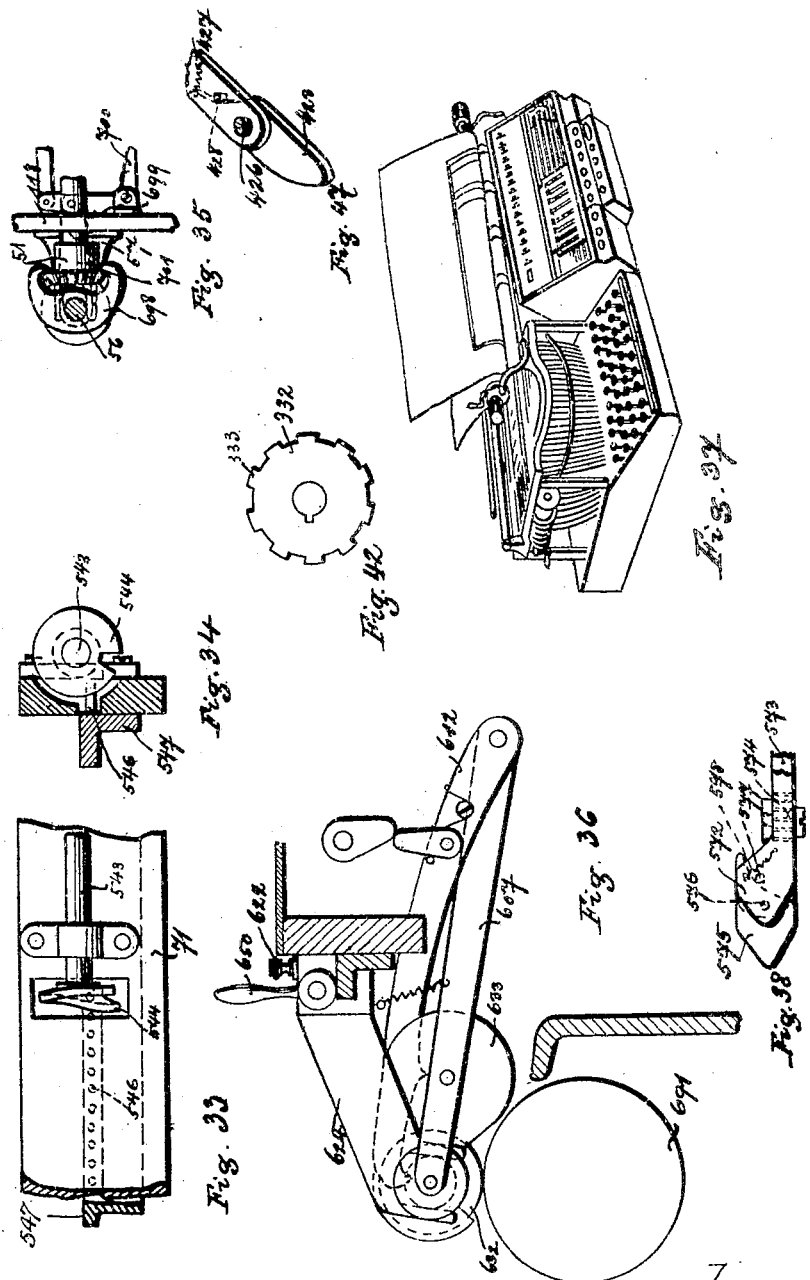

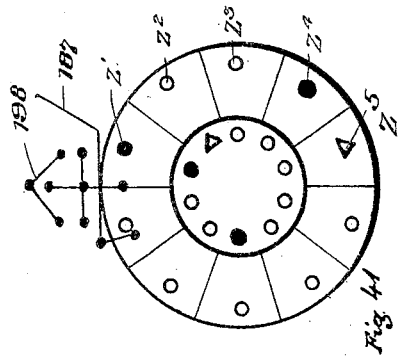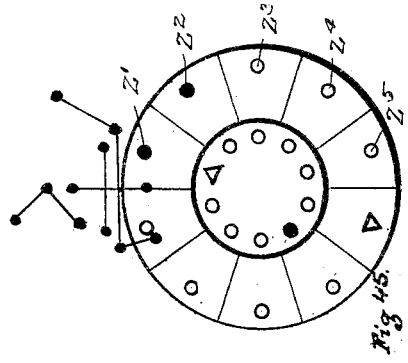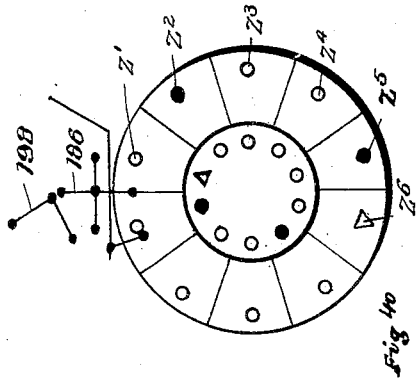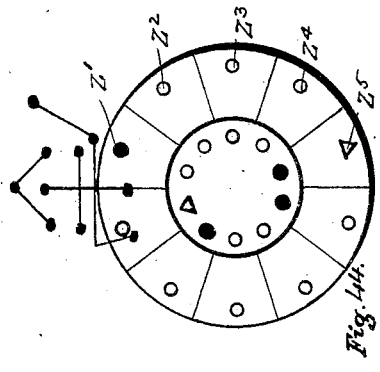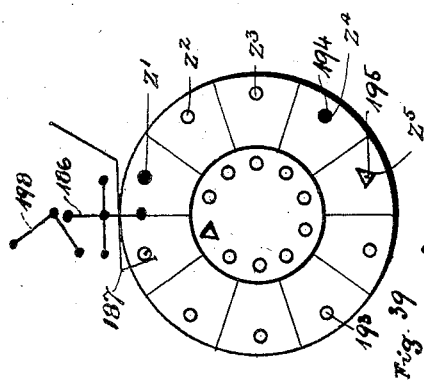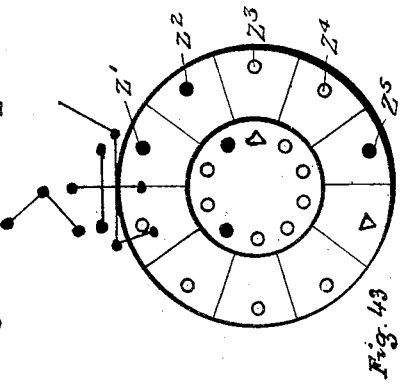

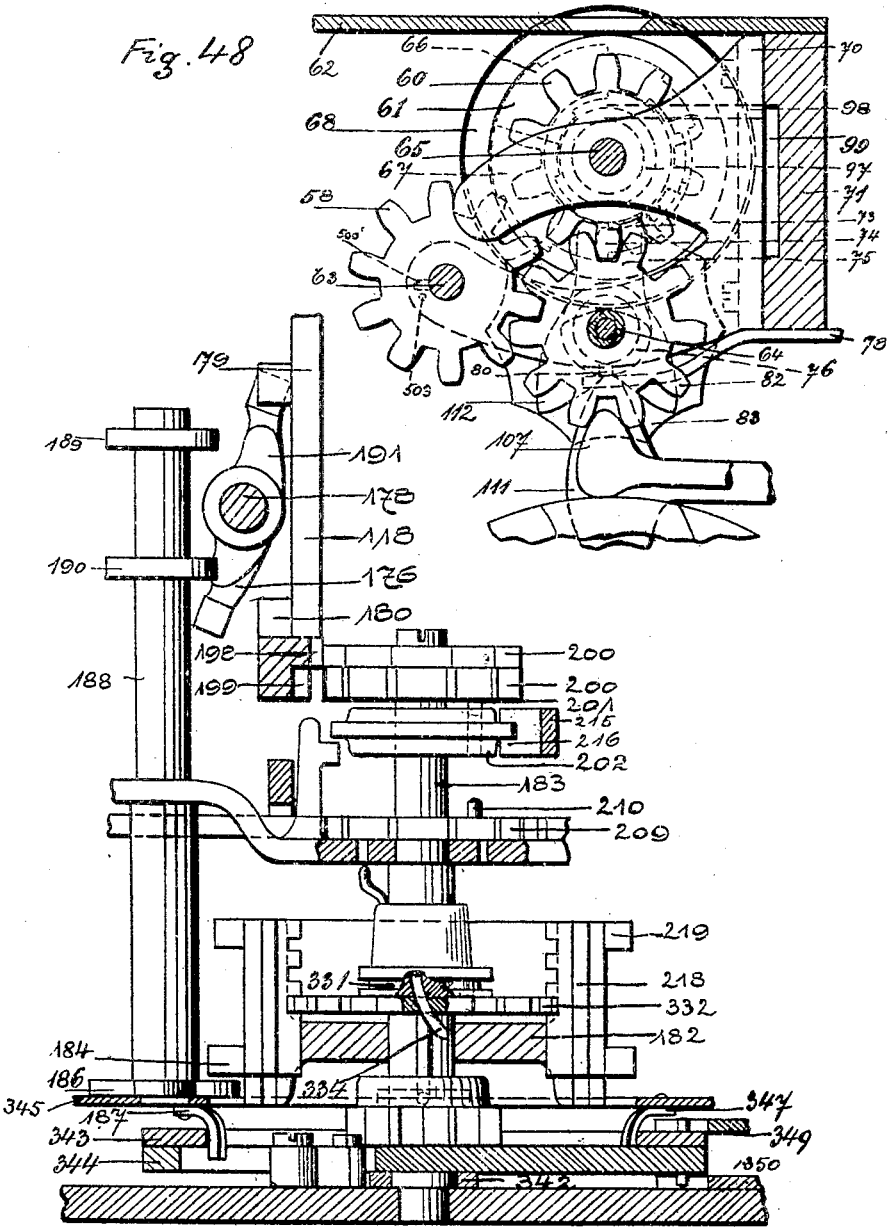

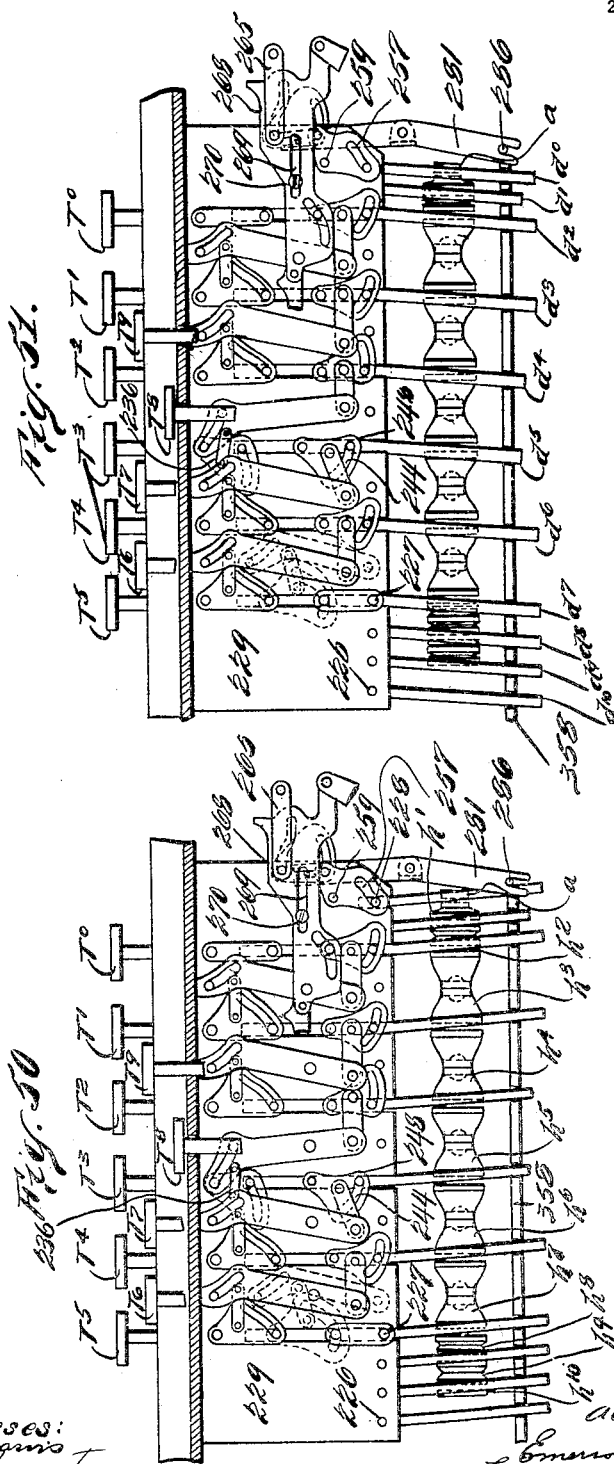

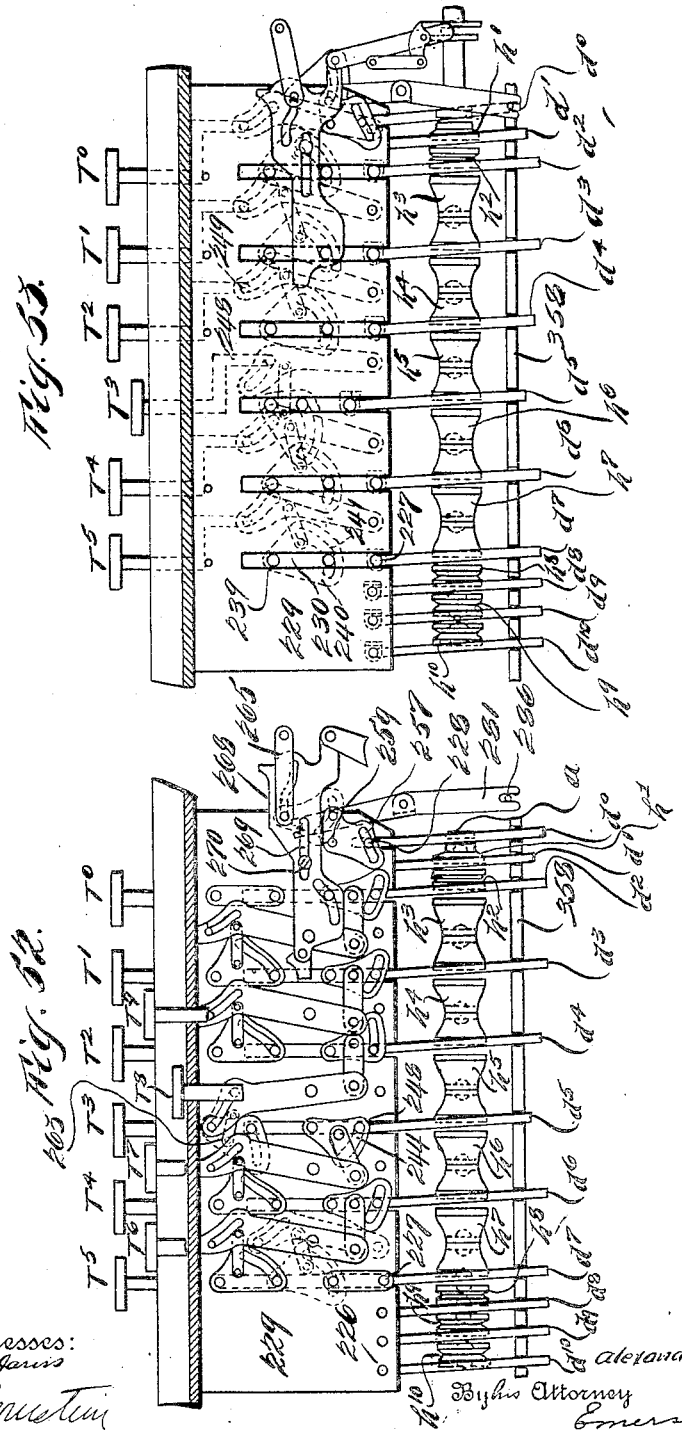

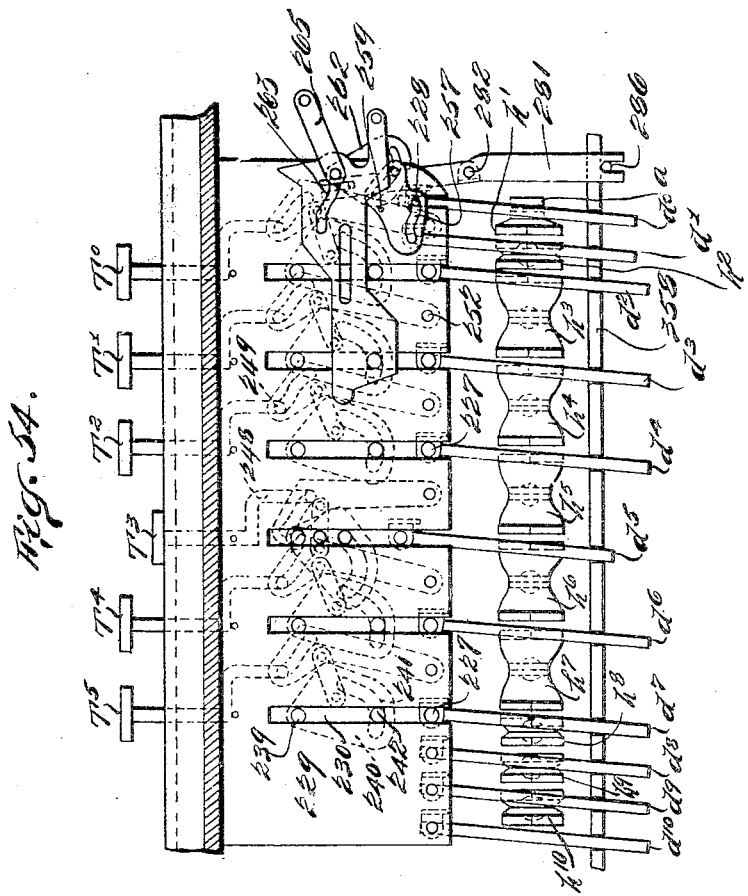

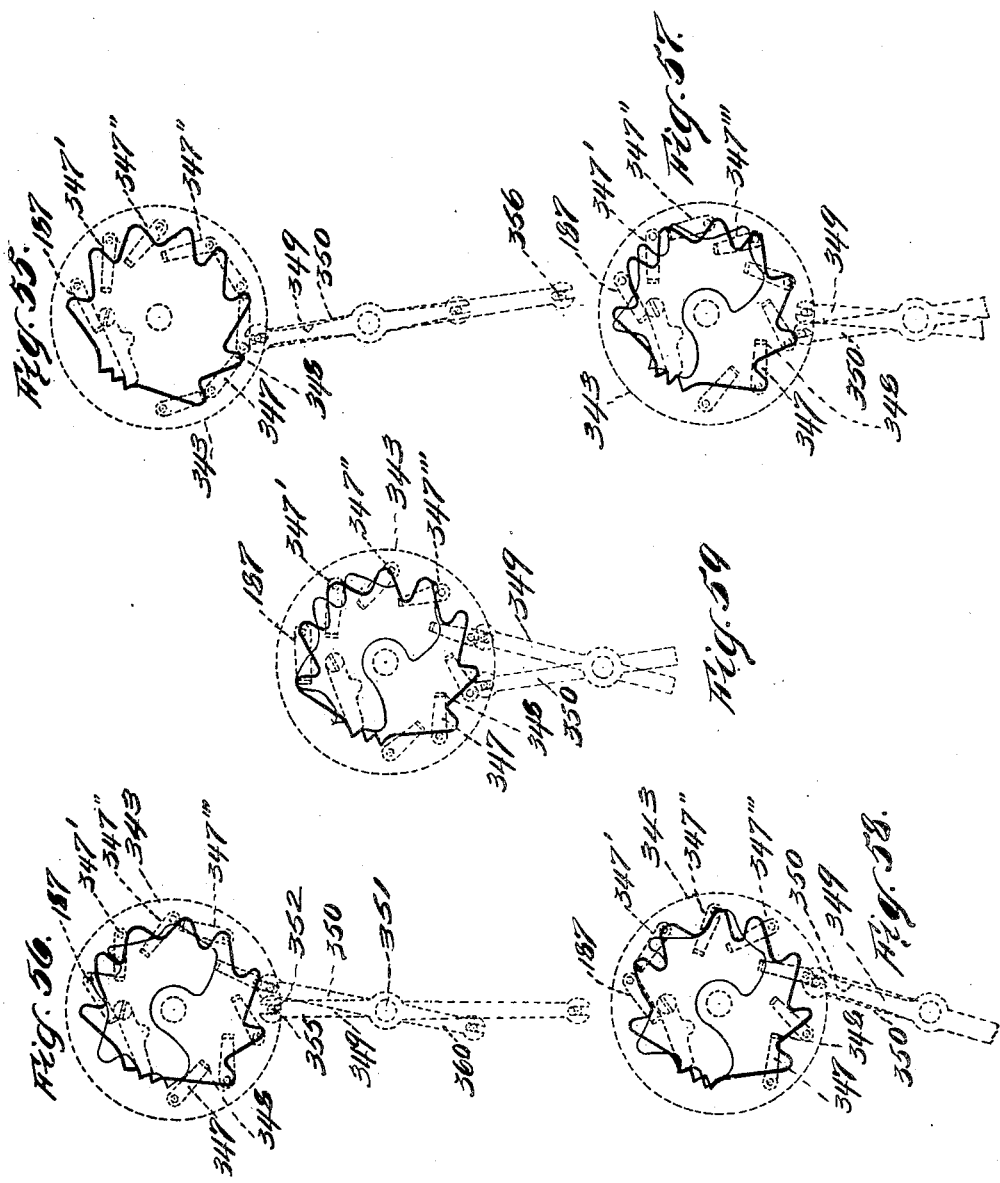

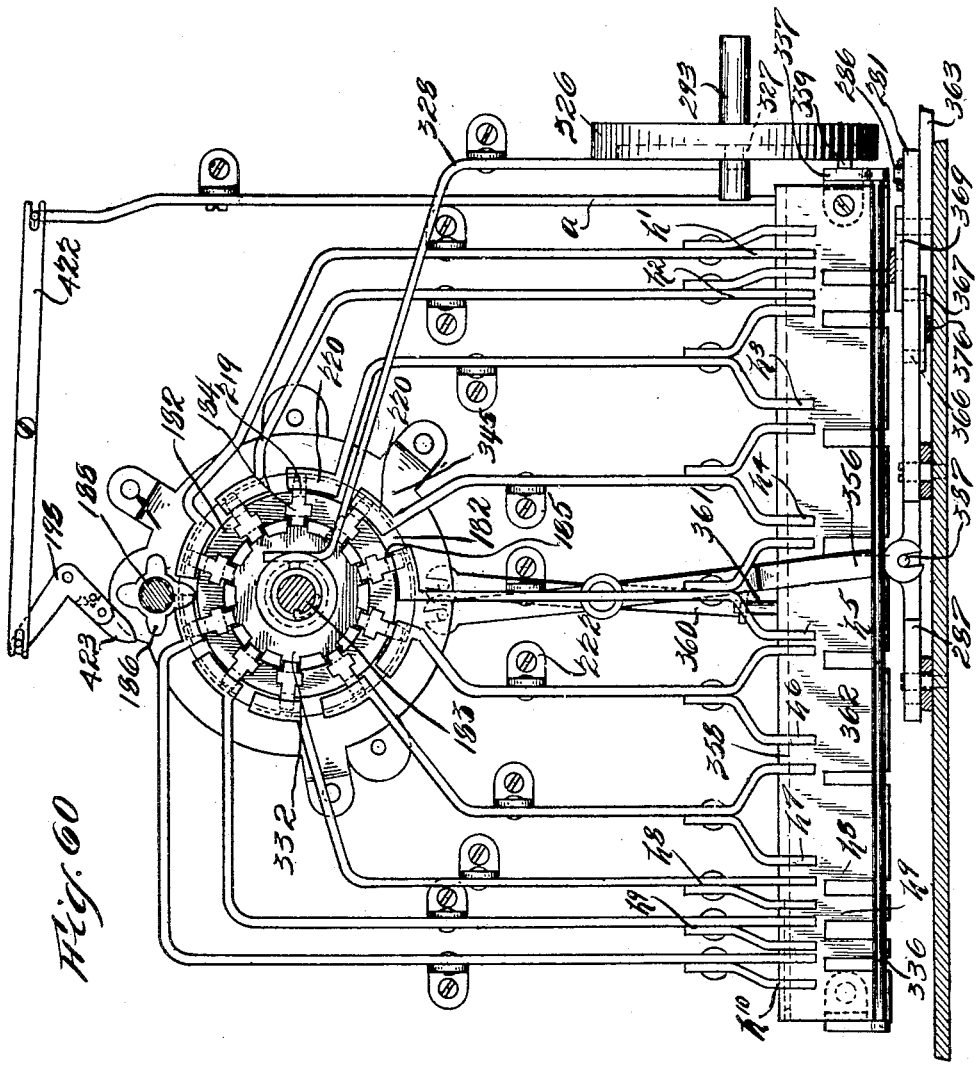

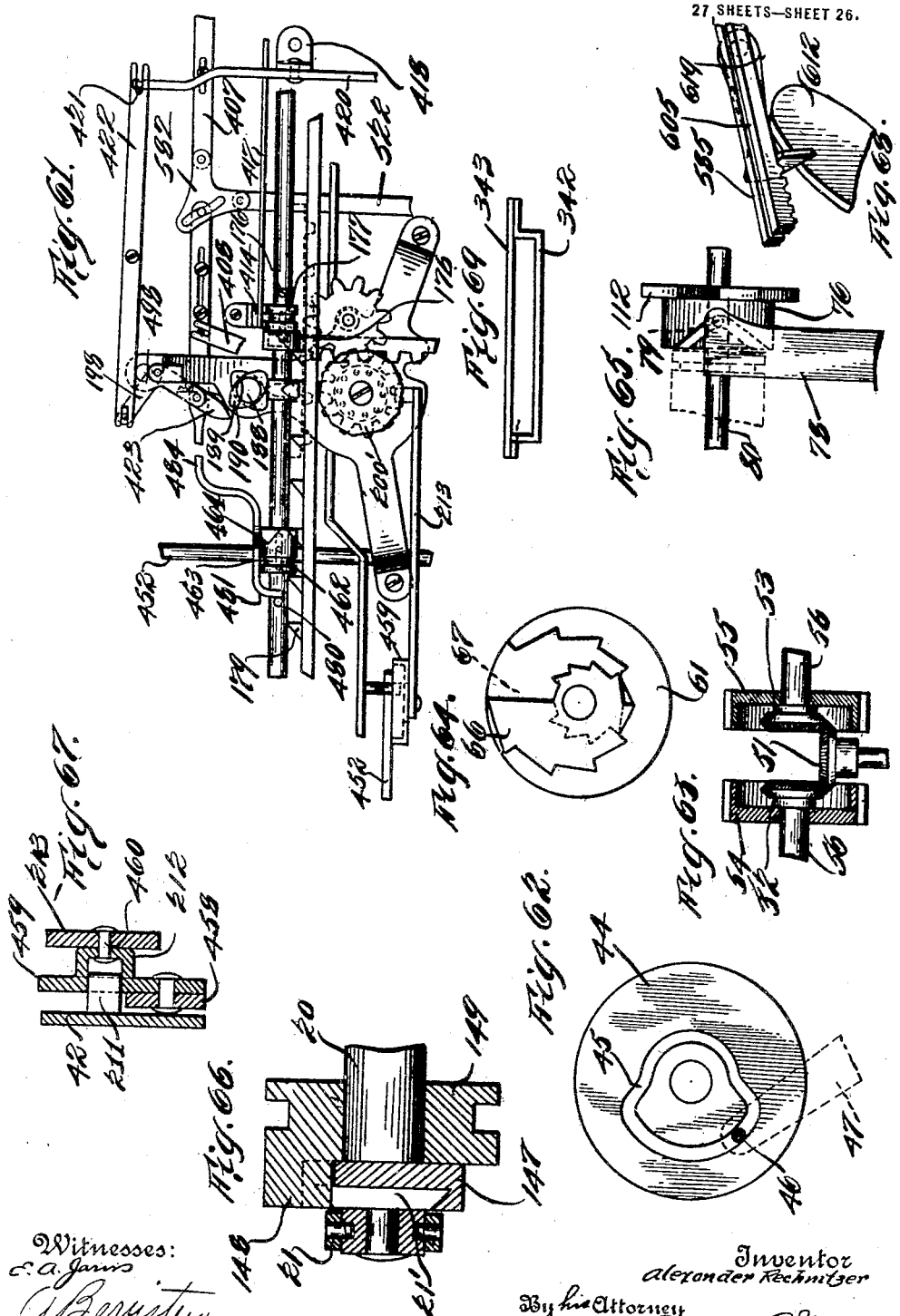

A. RECHNITZER.
CALCULATING MACHINE.
APPLICATION FILED FEB. 21, 1910.

1,205,481.

Patented Nov. 21, 1916.
27 SHEETS—SHEET 27.

UNITED STATES PATENT OFFICE.

ALEXANDER RECHNITZER, OF VIENNA, AUSTRIA-HUNGARY, ASSIGNOR TO AUTARIT-GESELLSCHAFT M. B. H., OF VIENNA, AUSTRIA-HUNGARY.

CALCULATING-MACHINE.

1,205,481. Specification of Letters Patent. Patented Nov. 21, 1916.

Application filed February 21, 1910. Serial No. 545,193.

*To all whom it may concern:*

Be it known that I, ALEXANDER RECHNITZER, a subject of the Emperor of Austria-Hungary, residing at Vienna, Austria-Hungary, have invented new and useful Improvements in Calculating-Machines, of which the following is a specification.

Calculating machines of various types are already well known which can perform addition and subtraction as well as multiplication and division. This invention relates to a calculating machine which automatically makes the calculations set, and prints them, and substantially differs in the whole of its construction from all similar machines of well known construction, and is much better than the same owing to the provision of special devices by means of which the calculator can perform simultaneously the different operations required in invoicing, and print the different results.

The machine will be described with reference to the accompanying drawings.

Figure 1:
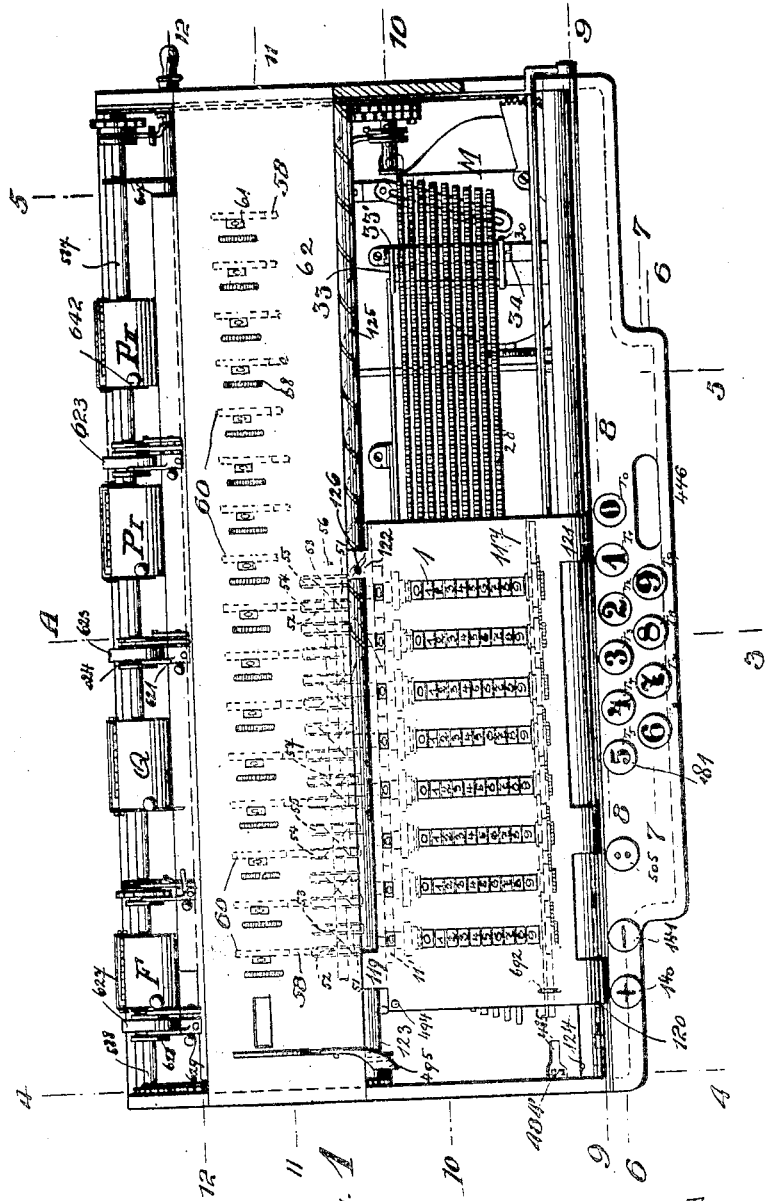
Figure 2:
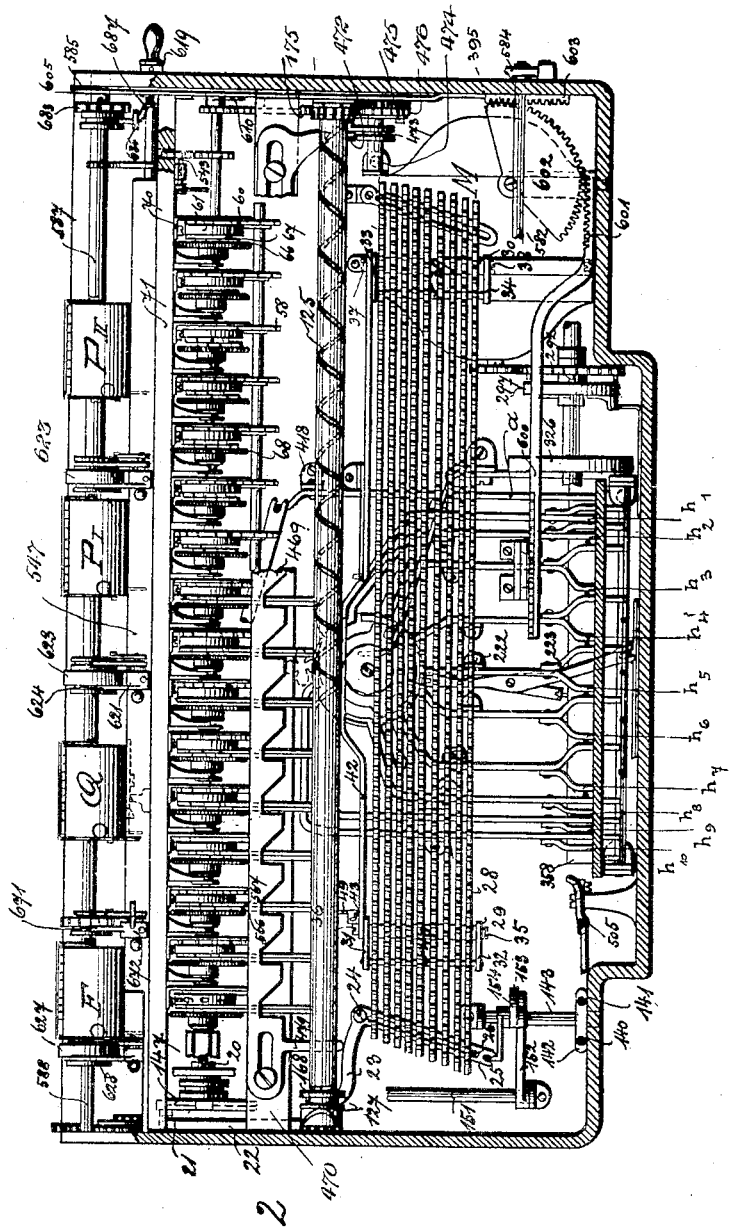
Figure 3:
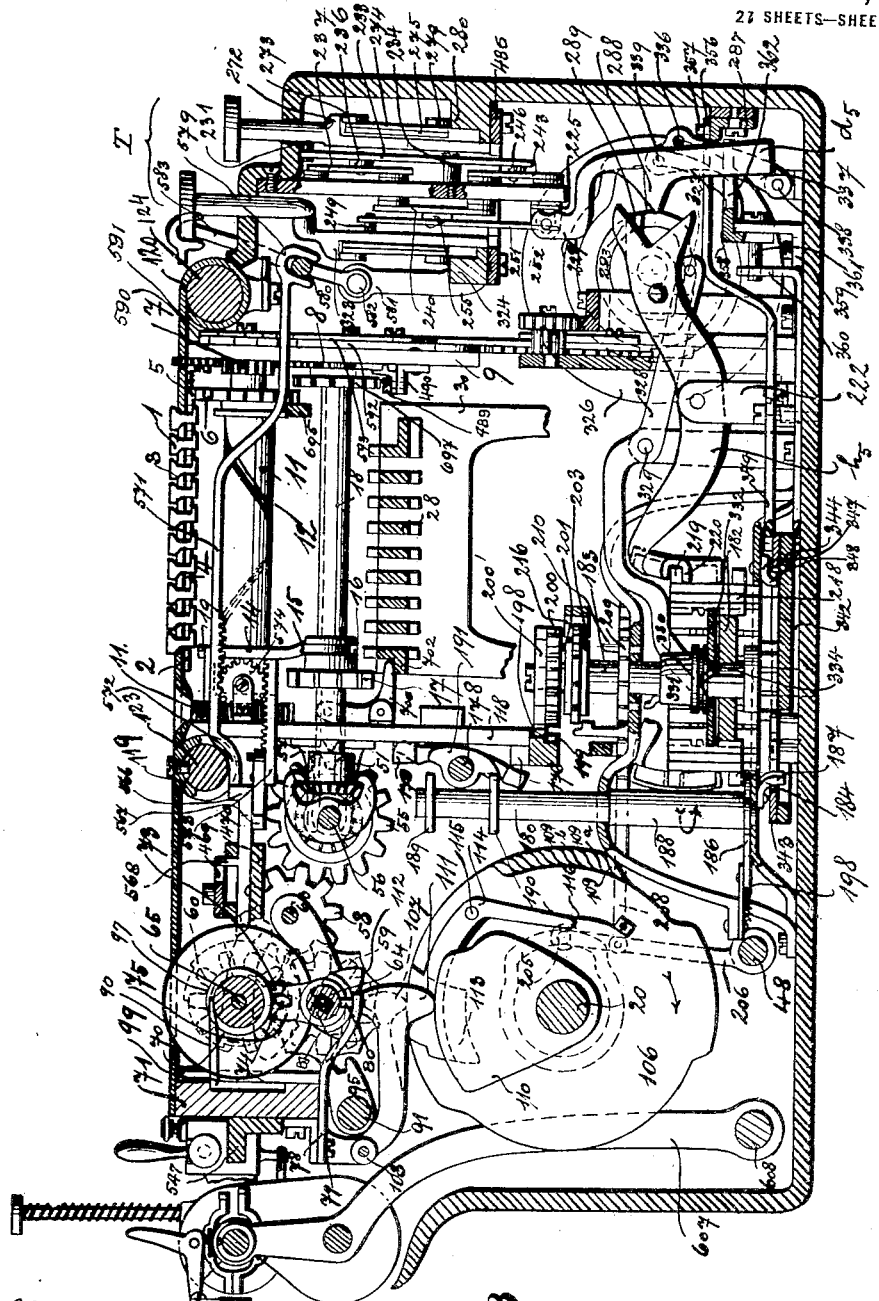
Figure 4:
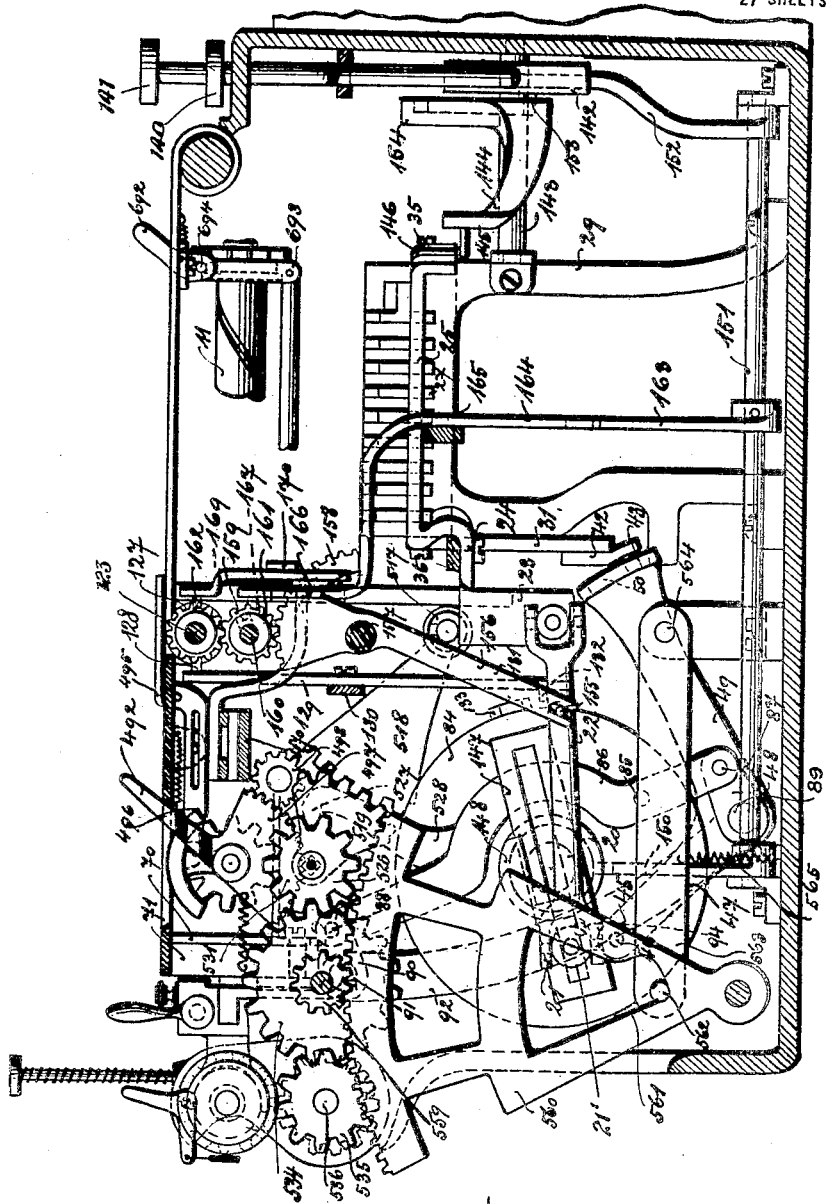
Figure 5:
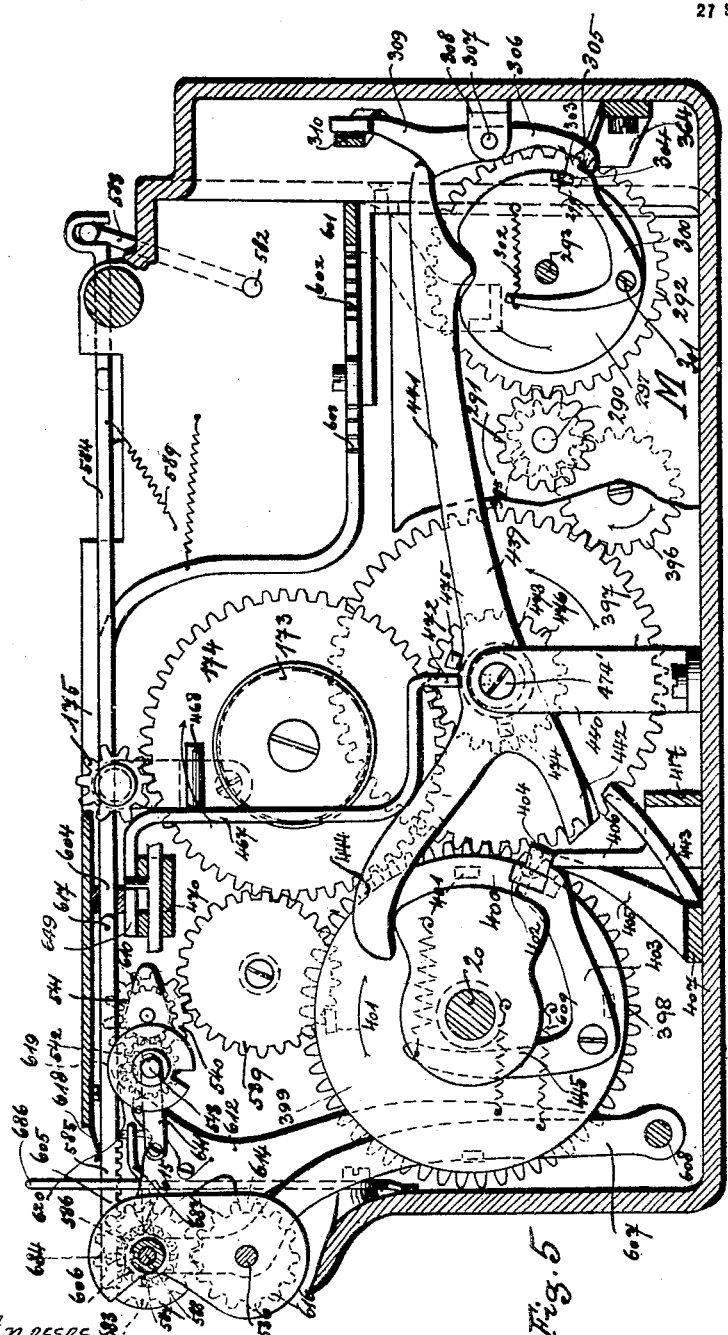
Figure 70:
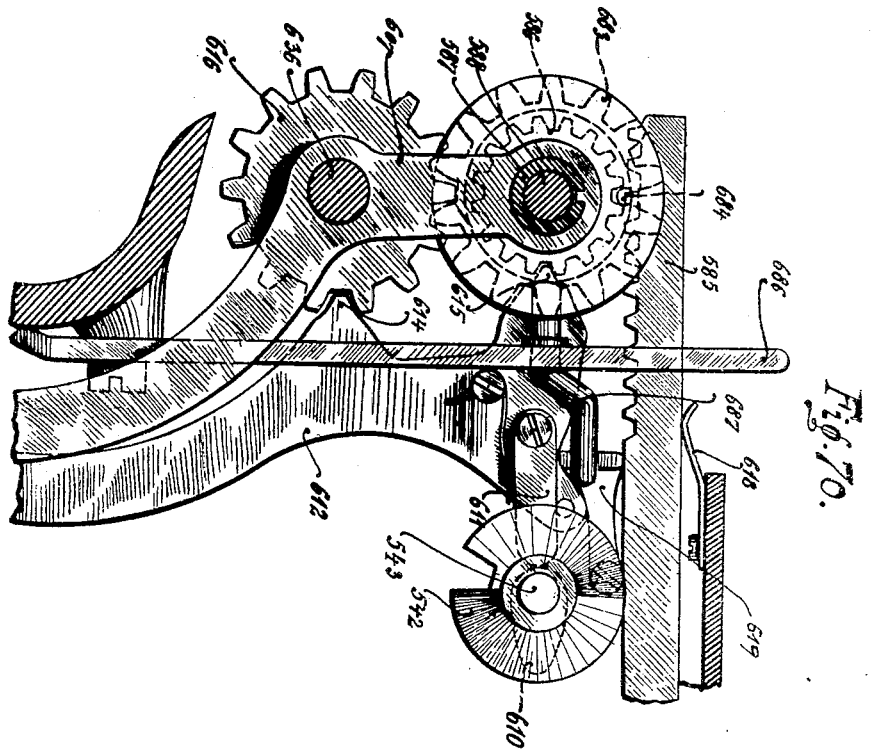
Figure 71:
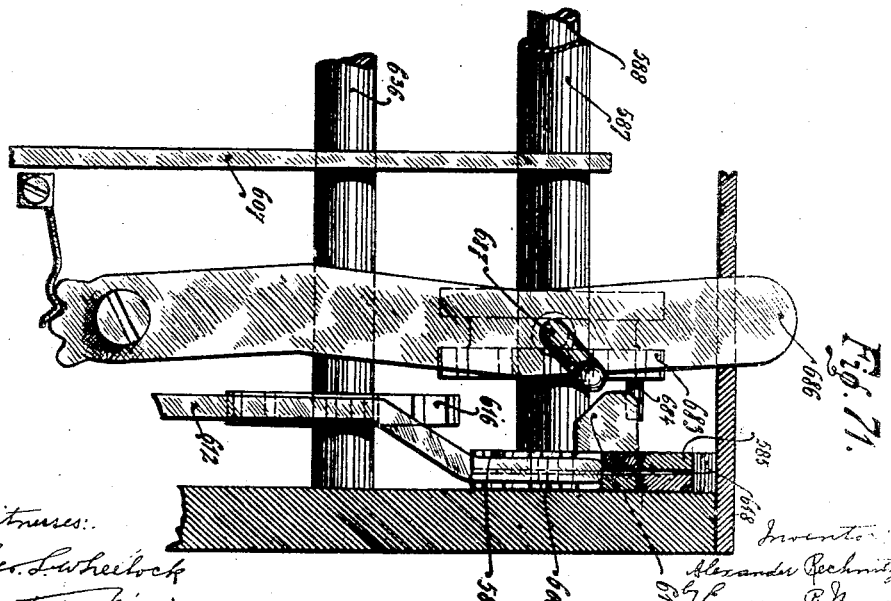

In the said drawings, Figure 1 is a plan of the machine; Fig. 2 is a similar view with the covering plates removed; Figs. 3-5 are cross-sections through the machine, respectively on lines 3—3, 4—4 and 5—5 of Fig. 1, Fig. 3 being enlarged; Figs. 6-12 are longitudinal sections through the machine, the said sections being respectively indicated in Fig. 1, in the sequence mentioned, by the following: 6—6, 7—7, 8—8, 9—9, 10—10, 11—11 and 12—12; Figs. 13-25 show details hereinafter explained; Figs. 26-29 and 30-32 show the mechanism combined with the printing apparatus; Figs. 33-35 are more details; Fig. 36 shows a modification of the machine, which is necessary if it is desired to make the printing in a different direction from that of the main part of the invention; Fig. 37 is a perspective view of the machine in combination with a typewriter; Fig. 38 is a detail view; Figs. 39-41 and 43-45 are diagrammatic views facilitating the explanation of the machine; Figs. 42-46 and 47 show details; Figs. 48 and 49 are enlarged views of the carrying mechanism and the switching wheels, respectively; Figs. 50 to 59 inclusive are views showing different positions of the mechanism operated by the keys T, and detail views showing different positions of the switch; Figs. 60 and 61 are plan views showing the upper and lower portions respectively of the switch mechanism; and Figs. 62 to 69 are views of details. Figs. 70 and 71 are enlarged detail views of the upper left-hand corner of Fig. 5.

In view of the complicated construction of the machine, it is absolutely essential to divide the description for the sake of clearness, and therefore the explanation will be hereinafter given in separate sections. For the same reasons it will be well before entering into a detail of the present machine to point out in a general way some of the many principles which are embodied in the machine, and to specially point out the new principle according to which the present machine works in performing multiplications.

It is well known from my former invention disclosed by my U. S. Patent #809,075 that multiplications can be done entirely automatically by adding at each digit as often as the particular numeral of the multiplicand indicates. For instance, instead of multiplying with the numeral 3, machines of this kind add the multiplicand 3 times; instead of multiplying with 8 they add the multiplicand eight times. This was the way disclosed in such automatic multiplying machines until now but skilled operators who were used to operating non-automatic multiplying machines which really were nothing but adding machines, used this way of multiplying them, only with the numerals 1, 2, 3, 4 and 5 while instead of multiplying with 6, 7, 8 and 9, such skilled operators preferred to add the multiplicand once at the tens place of the product and then subtract the multiplicand at the units place 4, 3, 2 and 1 times respectively; that is, instead of figuring out the product of 8 times 9 by adding 8 times the numeral 9 on the product counter, they add the multiplicand 9 at the higher digit once, therefore adding on the product-counter really the amount 90, and then at the units place they subtracted from the counter two times 9 which is 90 minus 18, that is 72. Thus they attained a multiplication with 8 by one addition and two subtractions, that is three operations, instead of making nine additions which takes nine operations according to the slower method.

Multiplying with eight could be performed in three operations; multiplying with seven in four operations; multiplying with six in five operations. A multiplication with five according to this method called for one addition at the tens place and five subtractions at the units place, that is six operations; therefore, multiplication with 5 and numerals lower than 5 have preferably been done after the old method. But skilled operators went even farther than this. They not only considered each numeral of the multiplier separately before deciding what they wanted to do, but they considered all numerals of the multiplier at once; for instance, if they wanted to multiply with 99 they did not, as a less skilled operator would do, first mechanically multiply according to the shorter method with the multiplier 90 by adding it once at the hundreds place and then subtracting the multiplicand ten times by subtracting it once at the tens place, and after this was done to multiply with the nine units by again adding the multiplicand ten times by adding it once at the tens place and afterward once subtracting the multiplicand at the units place. Such skilled operators compensated immediately one addition and one subtraction at the tens place, and in multiplying with 99 they added the multiplicand once at the hundreds place and immediately went to the units place for deducting the multiplicand once. Thus they gained a multiplication by 99 in two operations only. As another instance, a multiplication with 987 would be attained by adding once at the thousands place and deducting once at the tens and three times at the units place. If the working of the operator after this more complete method should be embodied in a mathematical rule, one could state that if after a numeral higher than 5—which therefore is performed after the shorter method—follows again a numeral higher than 5, this will bring about an addition and a subtraction at the same place, and the skilful operator omits such additions and subtractions entirely. My present new machine works after the method of such a well skilled operator entirely automatically, and it will be clear that such a mechanism must be very difficult to understand and the number of those skilled in the art must necessarily be limited. Moreover, my machine is in some way at a disadvantage over an operator as will now be explained. The multiplier is set up in my present machine on only one set of nine keys T, Figs. 1 and 3, in very much the same manner as an amount is printed by means of a typewriter, commencing with the highest digit and successively striking the following figures of the multiplier on this bank of nine keys T. It will also be explained that my machine immediately commences to work after the first numeral of the multiplier has been struck by the operator.

My machine will therefore be in the position of one of the skilled operators performing multiplications with non-automatic machines, to whom the numerals of the multiplier are dictated while he is operating with the numerals as far as have been dictated to him, that is to say, my machine is in the position, for instance, of the operator who, after the multiplicand was given to him is now told the first digit of the multiplier—for instance 900,—whereupon he immediately commences to multiply with the numeral given, and while he is carrying out this operation the next numeral, say 80, is dictated to him, and thereafter the units place 7 is dictated to him. Now my machine works in such a manner as would a skilled operator who performs the multiplication with the amount given to him as far as it was dictated, that is if the multiplier 900 was given to him, the operator will really work out the multiplication by adding the multiplicand once at the thousands place and subtracting it once at the hundreds place, provided he does not hear the next digit number of the multiplier before he has performed the subtraction at the hundreds place. If he hears that the next digit of the multiplier is 80 at too long an interval thereafter, he will have to add the multiplicand to the hundreds place once more. On the other hand, if this digit of the multiplier was dictated to the operator in time before he had made such subtraction at the hundreds place, he would prefer to compensate the subtraction and the addition at the hundreds place and immediately combine the two numerals in the manner explained before. Now my present machine is in the position of such a skilled operator and works so to speak in the same way. In my automatic machine, the multiplicand is first set up on the keys 1 and the multiplier set by the operator as explained before on the keys T, and at his leisure without any regard or anxiety about the workings of the machine, and the machine will always work out its examples in the most suitable manner, performing its duty with the multiplier as far as given to it, and, as far as given, performing it in the shortest possible manner, while the operator will really be unaware of the complicated manner in which his machine is working. The result will be a very quick working of my new machine. This preliminary statement may be extended a little farther in order that the different details of my machine which are to be hereinafter explained may be more intelligently followed.

In my before-mentioned Patent #809,075,

I have already described a carriage movable in a casing, and that depending upon the position of such a carriage additions and subtractions are to be performed. The same principle is also shown in my new machine but there is a difference in that in my old machine the operating mechanism was stationary and the counter or registering devices were mounted in a movable carriage. In my present machine, the counter or registering devices are mounted in the stationary casing, while the operating devices lying underneath the keys 1, Fig. 1, are mounted on a slidable carriage having guides 119, 120, 121 and 122 arranged on guide rods 123 and 124. Mounted on this carriage is a shaft 18 with a gear 17 turned to a different amount depending upon the keys set, and in the manner to be explained afterward, which rotation of the axis is transmitted by bevel gear 51 to two bevel gears 53 and 52 mounted on each side of bevel gear 51 and to which gears 54 and 55 are fixed so that these gears are rotated in opposite direction. All of this mechanism is very much the same as explained in my said former patent and the transferring from the operating gears 54 and 55 to the numeral wheels 61 of the registering devices is arranged in a like manner to that shown in my said patent, so that normally in the initial position shown in Fig. 1, gear wheels 52 will be in the position to transfer movement of the shaft 18 by means of a train of gears 58, 59 and 60, Fig. 3, to the numeral wheels 61, which gears transfer the movements of the shaft 18 to the numeral wheels according to addition. One step movement of the carriage from the position shown in Fig. 1 will bring the right-hand gears 55 in mesh with the gears 58 and will bring about a connection of the numeral wheels with the opposite turning wheel 55 of the operating means, thereby changing the operation from addition to subtraction and at the same time connecting the operating devices with the next lower digits of the registering devices. The following step of the carriage will not change the digit but only change the operation of the machine from subtraction to addition. All this is known from my former Patent #809,075. We may call the first place at which the machine can operate the millions place, the next the one hundred thousandths, and so on. Then the machine in commencing an operation will ordinarily be in the position of adding millions, which position we may indicate as follows: $\frac{M}{A}$. The next position will be the subtracting position of the one-hundred thousandths place which we may indicate as $\frac{Ht}{S}$: A indicating addition and S subtraction. The next position the adding position for one-hundred thousandths may be indicated by $\frac{Ht}{A}$. The next the subtracting position for ten thousandths by $\frac{Tt}{S}$. The next the adding position for ten thousandths by $\frac{Tt}{A}$ and so on. The machine will therefore successively reach the following positions during the multiplication:

$\frac{M}{A}$  $\frac{Ht}{S}$  $\frac{Ht}{A}$  $\frac{Tt}{S}$  $\frac{Tt}{A}$ etc.

Using this mechanism of my old machine again in my new one, I had to perform the operations as they are indicated in the following tables in order to perform the multiplications according to the shorter method. In the following tables the successive operations are numbered at the left side and it is assumed that the multiplicand was 25; accordingly additions are indicated by indicating +25 and subtractions by indicating −25. The movements of the carriage are considered as separate operations and are indicated in the tables by C. It must be mentioned that the position of rest or the initial position of the carriage before the commencement of each digit multiplication must always be the adding position of the next higher digit to that on which the multiplication is intended to be performed, as owing to the shorter method employed by my present machine it is often necessary to add once on the higher digit before running down to the lower digit at which the multiplication should really be done. Therefore if I want to multiply 25 with 880,000 my machine will do it by either of the following operations:

|    | M/A | Ht/S | Ht/A | Tt/S | Tt/S |
|----|-----|------|------|------|------|
| 1  | +25 |      |      |      |      |
| 2  |     | C    |      |      |      |
| 3  |     | −25  |      |      |      |
| 4  |     | −25  |      |      |      |
| 5  |     |      | C    |      |      |
| 6  |     |      | +25  |      |      |
| 7  |     |      |      | C    |      |
| 8  |     |      |      | −25  |      |
| 9  |     |      |      | −25  |      |
| 10 |     |      |      |      | C    | which gives the additions and the subtractions as follows:—

| 1 | +25,000,000 |
| 3 | −  2,500,000 |
| 4 | −  2,500,000 |
| 6 | +  2,500,000 |
| 8 | −    250,000 |
| 9 | −    250,000 |

22,000,000 or the machine will, if the keys are pushed in due time, omit the superfluous subtractions and additions of operations numbered 4 and 6 of the before given table and follow a still shorter way as indicated in the following table:

| | M A | Ht S | Ht A | Tt S | Tt A |
|---|---|---|---|---|---|
| 1 | +25 | | | | |
| 2 | C | | | | |
| 3 | | −25 | | | |
| 4 | | C | | | |
| 5 | | | C | | |
| 6 | | | | −25 | |
| 7 | | | | −25 | |
| 8 | | | | | C |

The machine has thus performed the following additions and subtractions giving the result 22,000,000

```
1 _____  +25,000,000
3 _____  −  2,500,000
6 _____  −    250,000
7 _____  −    250,000
                    ─────────────
                      22,000,000
```

If the machine is intended to multiply 25 with 330,000 the carriage will first have to be moved two steps from its rest position to its first multiplying position before the three additions are to be performed and consequently the operations of the machine will be the same as indicated in the following table:

| | M A | Ht S | Ht A | Tt S | Tt A |
|---|---|---|---|---|---|
| 1 | C | | | | |
| 2 | | C | | | |
| 3 | | | +25 | | |
| 4 | | | +25 | | |
| 5 | | | +25 | | |
| 6 | | | C | | |
| 7 | | | | C | |
| 8 | | | | | +25 |
| 9 | | | | | +25 |
| 10 | | | | | +25 |

This gives the following additions and subtractions with the correct result:

```
3 _____  2,500,000
4 _____  2,500,000
5 _____  2,500,000
8 _____    250,000
9 _____    250,000
10 _____    250,000
                    ──────────
                     8,250,000
```

The explanations which have been given so far are simply intended to develop the complicated principles according to which my machine works in multiplication. The details will be explained in the course of the specification, but my machine also embodies many other new features, as for instance the manner in which the printing mechanism which is more fully explained in my pending application #457,414 filed October 12, 1908, and therefore not broadly claimed in this application, is used for accumulating the sums, differences, multipliers, multiplicands, dividends, divisors and the results of different operations performed on the machine for obtaining totals and subtotals of any amounts set up and printed on the printing devices of the machine. For accumulating the products of different multiplications on former multiplying machines very complicated registering devices have been added to the machines capable of registering simultaneously on several digits of its registering wheels.

My printing mechanism is made very simple by using one printing wheel for a row of figures to be printed which single printing wheel is successively adjusted to print the different digits of the amount. With this printing wheel which will be rocked successively to different extents dependent upon the amount to be printed, I connect suitable devices which transfer the movements of the printing wheels to an accumulating counter, the different digits of which are successively moved so that these auxiliary counters may be constructed in a very simple manner with a very simple carrying mechanism while the counters used before had to be complicated in order to enable them to receive simultaneous accumulations of all digits on its registering wheels. My new machine is also the first automatic multiplying machine capable of multiplying subtractively, that is, capable of deducting the result of a multiplication from the registering devices instead of adding it to the same.

Many other new features are embodied in my present machine which will be more particularly pointed out in the claims.

*Setting device.*—A factor or a divisor is set on the keys 1 (Figs. 1, 3 and 9) by the operator depressing those keys which correspond to the number to be set. If it is desired to set the number 12345.678 on the key-board, the key 1 of the first row of keys, the key 2 of the second row of the keys, the key 3 of the third row of keys, and so on, are depressed, it being immaterial whether, in addition to the proper key, any keys of a higher value have been depressed by the operator. The depression of the keys results in a bar 2 (Figs. 3 and 9) being drawn to the left, Fig. 3. This is due to cam surfaces 3 on the keys engaging teeth 4 (Fig. 3) on the bar 2 which enter between the keys. In this way, the bar 2, which normally engages at its right hand end by means of a double tooth 5 with a wheel 6, is disengaged from the said wheel, so that the latter may move freely. It will be seen from Figs. 3 and 9 that on the wheel 6 is mounted a smaller wheel or pinion 7 which engages with a segment 8 rotatably mounted on the wall 9 of the machine by means of a pivot-screw and turned to the right of Fig. 9 by means of a helical spring 10. The wheels 6 and 7 are secured to the spindle 11 so that the latter will have a tendency to turn. The spindle 11 is provided with a cam groove 12 with which engages a finger 13 of a sleeve 14. The said sleeve is provided with a downwardly directed arm 15 engaging with a grooved disk 16. On the said grooved disk is mounted a wheel 17 adjustably mounted on the spindle 18 by means of a feather and groove. When, therefore, the spindle 11 is released by depression of a key 1, it will be turned by spring 10; and owing to its cam groove 12 it will have the tendency to pull the sleeve 14 toward the right of Fig. 3. Finally, a tooth 19 on top of the sleeve 14, will strike the depressed key, so that the movement of the sleeve 14 will be limited by the said depressed key, and in that way the wheel 17 will be brought into a different position according to the key 1 that may be depressed. If the corresponding keys are then again released, the teeth 5 will lock the wheel 6, spindle 11 and the wheel 17 in their position. According to the position of the wheel 17 it will be rotated at each revolution of the main spindle 20 to the extent of 1, 2, 3, etc., up to 9 teeth, as will be described in the next section.

*Counting or adding mechanism.*—At each revolution of the main spindle 20 obtained in the manner hereinafter described (Figs. 2–4) the connecting rod gear 21, 22, 23 (Fig. 4) will also be operated once. At the front end (the left hand one in Fig. 2) of the main spindle 20 is mounted the connecting rod head 21 which drives the connecting rod 22, which in its turn will move the bell-crank lever 23—25, pivoted at 24. It will be clear that the connecting rod heads in this construction must be arranged with universal joints, as shown in the drawings, which need not be more fully explained. At each revolution of the main spindle 20, the bell-crank or double lever 23—25 will, therefore, be swung on the pivot 24, or rocked to-and-fro. The lever arm 25 is provided with a slot 26 into which project pins 27 located on tooth racks 28. The tooth racks 28 are adjustably secured in two bearings 29 and 30, so that at each revolution of the main spindle they will be once advanced and once withdrawn. The tooth racks are mounted relatively to the fulcrum 24 of the lever 25 in such manner that the tooth rack situated next to the fulcrum is shifted at each oscillation to the extent of one tooth, while each tooth rack situated beyond is moved to the extent of one tooth more than the one next to it but nearest said fulcrum, so that the last tooth rack will be moved to the extent of nine teeth. The wheels 17 are adjusted above the tooth racks 28 according to the key 1 that is depressed, and thus it will be clear that when the arm 25 is swung forward, that is to say, during the first half of the revolution of the main spindle, the wheels 17 can be rotated by the tooth racks 28 to the extent of 1, 2, 3 . . . or 9 teeth. These tooth racks 28 are mounted in a vertically adjustable manner in their brackets 29 and 30 and are locked in raised or lowered position by the following mechanism: On the brackets 29 and 30 are rotatably mounted double levers 31, 32, 33 and 34, by means of screws 35 or 36, 37, 38. See Figs. 1, 2, 4 and 10. Said levers are connected together by rods 39 and 40 which pass through racks 28 and the bottom arms 31' and 33' of the levers 31 and 33 are connected together by a rod 42. On one side of the said rod 42 is mounted a pin 43 (Figs. 4 and 10).

It will be clear that, according as the rod 42 is moved to the left of Fig. 2, or not, the tooth racks 28 (Figs. 8 and 9) will be raised. For the purpose of raising and lowering the tooth racks, a disk 44 is mounted on the main spindle 20 (Figs. 11 and 14) and is provided at the side with a groove 45, Fig. 62. With the said groove engages a pin 46 secured to an arm 47. The arm 47 is mounted in a freely rotatable manner on a spindle 48 and provided with an arm 49 (Figs. 2, 4, 10 and 11) which is provided at its front bent end with a groove 50 with which engages the pin 43 which, as already stated, shifts the bar 42 and in that way can raise or lower the tooth racks. The grooves 45 and 50 are of such shape that they bring about the raising of the tooth racks immediately at the beginning of each main spindle revolution, and after the first half of the main spindle revolution, lower the tooth rack again, so that during the return movement of the tooth racks no movement is transmitted to the toothed wheels 17.

The rotation imparted to the toothed wheels 17 (Figs. 9 and 3) is transmitted by means of the spindle 18 and of the bevel wheels 51 rotating with the latter, to the bevel wheel pairs 52 and 53, to which are keyed toothed or spur wheels 54 and 55. As will be seen from Figs. 1, 10 and 63, the bevel wheels 52 and 53 are mounted in recesses of the toothed wheels 54 and 55, which is done merely for the sake of economizing space. All the bevel wheel gears 51, 52, 53 with their toothed wheels 54 and 55 are mounted on one and the same spindle 56, in such manner that they can freely rotate on the same between any desired bearings 57 (Fig. 35). From the said wheels 54 and 55 the movement is transmitted in a suitable manner as shown in my former Patent #809,075, by means of wheels 58 (Fig. 3)

to a counting gear, with a corresponding carriage of tens, which counting gear or mechanism correctly adds the single figures set on the setting gear, and is described in the next section.

*Counting gear or mechanism.*—The rotation of the wheels 52, or as will be subsequently described eventually of the wheels 53, is transmitted by means of the wheels 58, 59 and 60 to the figure wheels 61 mounted under the cover plate 62 (Figs. 1, 3, 48 and 11). The toothed wheels 58, 59 and 60 are each freely rotatable, independently of the others, on spindles 63, 64 and 65. With the toothed wheels 60, rotate the figure wheels 61, the two step disks 66 and 67 (Fig. 64) and the hand wheel 68 which projects through the plate 62 and enables the figure wheels 61 to be set by hand.

No further explanation is required for an expert, to show that the figure or number set on the keys 1, will appear on the figure wheels after one revolution of the main spindle. In order that the additions on the said figure wheels should be properly expressed the most essential device of each counting gear, is required, namely, a properly working carriage of tens, which will be now described.

Each figure wheel 61 (Figs. 2, 48 and 11) is mounted between two bearings 70 which, in their turn, are secured to a bar 71. As soon as one of the figure wheels passes, during the first half of the main spindle revolution, from 9 to 0, each figure wheel, in addition to the parts already mentioned, also rotates by means of a driver pin 72, a projection 73 rotatably and adjustably mounted on the spindle 65. As soon, therefore, as a carriage of tens becomes necessary, the projection or finger 73 engages a pin 74 and shifts a lever 75, which is mounted in a freely rotatable manner on the spindle 64 and rotates its supporting drum segment 76 (Figs. 11 and 65) provided with a cam groove 77. At each revolution of the lever 75 and drum 76, a lever 78 situated under the drum and which is engaged by means of a pin 79 with the groove 77 is shifted to the left. The said lever is pivoted by means of a screw 79' to the bar 71, as shown in Fig. 3. If the lever is shifted to the left, it is brought into a position shown between the first and the second figure wheel in Fig. 11. The lever 78, in addition to its right hand pin 79, is provided on the left hand side with a pin 80 engaging with a grooved disk 81. This grooved disk 81 is mounted on the same square portion of shaft 64 as the toothed wheel 59. The toothed wheel 59 is keyed to the square portion, while the grooved disk 81 is adjustable on the said square portion. The toothed wheels 82, the ratchet or locking wheels 83 and disks 81 are shifted on the square portion to the left, that is to say, into the position shown between the first and the second figure wheels of Fig. 11, as soon as a carriage of tens is to take place. In that way the necessary carriages of tens are, therefore, indicated during the first half of the main spindle revolution.

The carriages of tens prepared or indicated are carried out during the second half of the main spindle revolution in the following manner: On the main spindle 20 is mounted a grooved disk 84 (Figs. 4 and 11) in such manner that it is slidable for the purposes hereinafter specified, but at the same time is rotatable with the spindle through the medium of a feather and groove connection. The said grooved disk 84 is provided with a milled groove with which engages a pin 85 secured to a lever 86 for raising or lowering the latter. The said lever 86 can vertically oscillate as one end is jointed or pivoted at the bottom at 87 to the lever 89 (Fig. 11) which is freely rotatable about the spindle 48, and the upper end of the lever is pivoted at 88 to an arm 90 secured to the spindle 91, so that at each raising or lowering of the lever 86, the said arm 90 can turn the spindle 91 upward or downward to a slight extent. The said spindle 91 is, in its turn, mounted not in fixed bearings, but secured to arms 92 secured to the spindle 48, so that it can swing. It will be clear, that the spindle 91 can be advanced or withdrawn, when the spindle 48 is rotated. This can be effected by means of a grooved disk 93 (Figs. 4 and 11) which is provided with a groove into which projects a pin 94 secured to the lever arm 92. The two mechanisms described make it possible, therefore, for the spindle 91 to execute a small oscillating and a small rotating movement owing to the rotation of the main spindle. On the spindle 91 are mounted a series of toothed wheel segments 95 (Fig. 3) which are arranged in such manner as to face the toothed wheels 82 and, therefore, to engage with the same as soon as the said toothed wheels are shifted to the left in the manner already described for the purpose of preparing or indicating a carriage of tens. At all these points, the toothed wheel 82, and consequently the toothed wheel 59 mounted on the same square portion, will be therefore turned to the extent of one tooth, so that the figure wheel 61 mounted above the toothed wheel 59, will be also rotated by means of its toothed wheel 60 to the extent of one figure, and accordingly the carriage of tens to the next highest figure wheel situated on the left hand side will be effected in the manner required.

In order to effect the carriage of tens in the proper manner, in case of a figure wheel for which the carriage of tens implies immediately another one (999+1), there is the following arrangement: Before the carriage of tens is actually effected by the toothed wheel segments 95 (Fig. 11), all the teeth or fingers 73 are pushed to the left. To that end, the teeth or fingers are provided with grooved rings 97 with which engage arms 98 of a slide 99 (Figs. 3 and 11), and in that way they can move all the teeth 73 on their spindle 65, if the slide 99 is moved. The movement of the slide 99 is effected by means of a grooved or cam disk 100 (Fig. 11) secured to the main spindle 20. With the groove of the said cam disk engages a pin 101 secured to a double armed lever 102 pivoted at 103. The upper arm of the lever is engaged with a pin 103' on the said slide, so that the slide, and then all the projections 73, can also be shifted from the main spindle 20.

As already stated, all the projections 73 are pushed to the left before the carriage of tens is effected by means of the toothed wheel segments 95. In that way the projections 73 are brought into engagement with the toothed wheels 82, provided that the latter have not been first shifted, and if during the carriage of tens, or in consequence of the same, one of the figure wheels were to pass from 9 to 0, it will turn direct the next highest figure wheel to the necessary tooth by means of the toothed wheels 82, 59 and 60 (Fig. 3).

All the above movements are effected in a positive manner, for which purpose the locking disk 105 is utilized on the one hand, and on the other hand the locking or ratchet wheels 83. A portion of such a locking disk constitutes the lever 75 (Fig. 3) coöperating with the right hand portion of the locking disk 105, for the purpose of rendering the movement of the drum segment 76 positive. In the same way, for the same safety purposes, the eccentric disks 106 are used, on the circumference of which rest levers 107 pivotally mounted on a spindle 108 on the bar 71, which levers are capable of being forced by the disk 106 between the teeth of the toothed wheel 59. The levers 107 only release the toothed wheels 59, and the toothed wheels 60 and the figure wheels 61, whenever, owing to the movement of the hand wheels 68 or to the engagement of the toothed wheel segment 95, they are to be rotated, while in all other cases, the figure wheels are locked by means of the levers 107.

As will be seen in Fig. 3, all the disks 106 are not quite identical, but the projections with which the disks 106 (Fig. 3) are provided at the point marked 109, stand back successively, the further to the left the corresponding figure wheel 61 belonging to the same, is located. The projection 109, or 109ª, 109ᵇ, 109ᶜ, etc., of the disks 106, will force the levers 107 into the toothed wheels 59 when a carriage of tens has already been effected. As, owing to the different shapes of the disks 106 at point 109, the forcing in of the levers 107 does not take place simultaneously but successively from right to left, these levers will be in a position to gradually remove the air from the counting mechanism, which air would have an injurious action between the numerous toothed wheel engagements from the projection 73, over the toothed wheels 82 and 69 to the toothed wheel 61 etc. in case of a successive carriage of tens, as for instance when 1 would have to be added to 9999999. After the carriage of tens has been effected, all the mechanisms are brought back to their initial position, in the following manner.

The arm 92 is swung back by the grooved disk 93, by means of its pin 94, in such manner that the spindle 91 secured to the same is brought back to the position shown in Fig. 3, out of engagement with the toothed wheel 59. All the drum segments 76 are thereupon brought back to their original position by a disk segment 110 (Figs. 3 and 11) forcing a lever 111 upward into a recess provided on one of the disk segments 112 secured to the drum segment 76. When the spindle 20 is in the position of rest shown in Fig. 3, the figure wheels 61 must be capable of being moved by means of their hand wheels 68. To that end, the disk 106 is provided, so to say, with a piece of springy material, by rotatably mounting a lever 114 at 115 on its disk 106, which lever 114 is pressed upward by a spring 116 and oscillates in a springy manner in a recess 113. As in the position of rest of the main spindle 20, the levers 111 will appear pressed into the disk segments 112, a movement of the levers 75, that is to say, the preparation or indication of a carriage of tens will be impossible in that position, and the figure wheel could not be moved by hand at 0 and 9.

*Reversing switch.*—As already described, the machine, according to this invention, must be capable of either adding or subtracting, according to the position of the addition or summing up gear on the counting gear. In older constructions the counting gear or mechanism was mounted on an adjustable carriage, while the addition or summing up mechanism was stationary. Owing to the construction of the addition or summing up mechanism according to this invention, it is now possible, as soon as the tooth racks 28 are lowered, to shift the setting gear, that is to say, the keys 1 with the mechanism described in the first section, over the tooth racks and past the counting mechanism. To that end, the keys 1 (Figs. 1, 3 and 9) with the setting mechanism are mounted between the cover plate 117 and the two longitudinal walls 118 and 9 of the carriage (Fig. 3, also Figs. 9 and 10). On the longitudinal plates are mounted sleeves 119, 120, 121 and 122 sliding on two bars 123 and 124, so that the setting gear is longitudinally adjustable of the machine, and according to the position of the setting gear, either each toothed wheel 52 can be brought into engagement with a toothed wheel 58, or each toothed wheel 53 can coöperate with a wheel 58. Since, as formerly described, the toothed wheels 52 and 53 are mounted on reversing gears, and therefore rotate in opposite directions, the movement of the toothed wheels 17 will be transmitted according to the rotation of the carriage either so as to obtain addition or subtraction. In order to enable the carriage of tens to be regulated accordingly by the toothed wheel segment 95 in accordance with the position of the carriage, the following arrangement has been made: The sliding bar 123 is rotatably mounted in the lateral walls of the machine frame or box and provided with a groove 125 (Fig. 1) in which slides a pin 126 on the sleeve 122, so that during the sliding of the carriage, the spindle 123 must rotate. When the setting gear is shifted to the extent of one place it will rotate once. On the left hand end the bar 123 carries a grooved disk 127, with the grooves of which engages a pin 128. The said pin is mounted on a lever 129 pivoted about a screw to a support 130 secured to the lateral end wall (Figs. 4, 6, 11 and 1). The bottom arm 131 of the lever 129 (Fig. 11) carries a pin 132.

It will be clear that on the carriage being shifted, the grooved disk 127 will be rotated and in that way the lever 129 and the pin 132 swung to different positions. Opposite the pin 132 the left hand disk 84 is provided with a raised portion 133, the shape of which will be best seen in Fig. 11. At the beginning of each revolution of the main spindle, the pin 132 will push the grooved disk 84, which is adjustably mounted on the main spindle 20 by means of a feather and groove, either to the right or to the left, or leave it in the right or in the left hand position. The position of the lever shown in Fig. 11, is that which it occupies when the carriage is in an "addition" position as shown in Fig. 1. In that case, at the beginning of the main spindle revolution, the grooved disk 84 will be pressed toward the right. This grooved disk is provided on the right hand side with a groove with which, in the right hand side position, will engage a pin 135 mounted on the lever 136. The latter lever 136 is mounted in the same way and has the same shape and function as the lever 86, before described. It will, therefore, be raised and lowered by the grooved disk 84, and at the same time will raise and lower the spindle 91 with the toothed wheel segments 95 for the purpose of effecting the carrying of tens. The two grooves of the grooved disk 84 are of such shape that one of them raises the toothed wheel segments 95 when the spindle 91 is oscillated forward, and lowers them when the spindle 91 is in the position shown in Fig. 3, that is to say, swung back out of engagement. The other groove of the disk will act in the reverse manner, so that it is clear that, according to the position of the grooved disk 84, that is to say, according to the position of the lever 129, or in other words according to the position of the carriage, the wheels 59 will be given by the toothed wheel segments 95, the required movement for carrying the tens either in the direction of addition or of subtraction.

During a revolution of the main spindle, the grooved disk 84 will be locked in its position, owing to its being mounted on a sleeve provided with a grooved ring 137 with two grooves, which is recessed at one point, so that the disk 84 can be shifted on the same only at the beginning of the rotation of the main spindle. During the rotation, a pin 138 mounted on a block 139, locks the grooved ring, and therefore the grooved disk 84, in its position at the moment.

Figure 6:
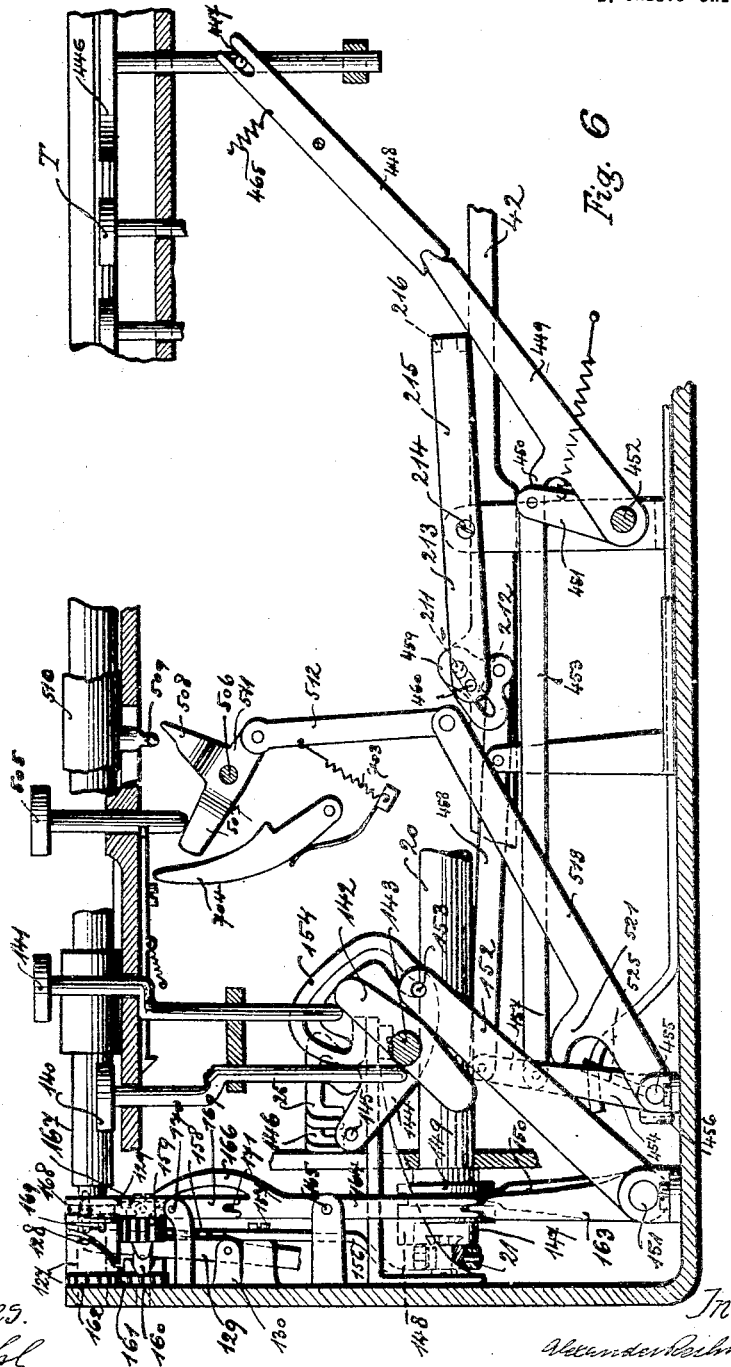

For the reasons which will be subsequently explained, there must be provided in addition to the possibility of obtaining additions and subtractions by shifting the setting gear, a change-over or reversing device which would enable both additions and subtractions to be effected in one and the same position of the carriage. When the key 140 (Fig. 1) is depressed, the whole mechanism (in the position shown in Fig. 1, that is to say, with the toothed wheels 52 engaging with the toothed wheels 58) is to be capable of adding the number set to the counting gear. If, on the contrary, the key 141 is depressed, subtractions are to take place in the same position, that is to say, without shifting the carriage. This is done by means of the following mechanism: When the key 141 is depressed, it presses a lever 142 which is rotatably mounted on a spindle 143 (Figs. 2, 4 and 6). In that way, the spindle 143 will be turned, and as an arm 144 carrying a pin 145 is secured to the front portion of the spindle, the said pin will be shifted, that is to say, it will be given an oscillation from left to right in Fig. 6. The pin 145 engages with a fork 146 provided at the end of the lever 25, and will consequently oscillate said lever 25 and, therefore, the whole of the tooth racks 28 and the connecting rod gear 21, 22. In order to enable the connecting rod gear to swing, the following arrangement has been made. The connecting rod head 21 is mounted on a bar 147 (Figs. 2, 4, 6 and 11) which forms the end of the main spindle. The connecting rod head 21 can be moved on the said bar by means of a slide 21' in a dove-tail or other guide, from the left hand side of the spindle in Fig. 4, to the right hand side. The connecting rod head 21 is locked in its position at any moment by means of a locking slide 148 which engages with the slot in the bar, see Fig. 66. This locking slide 148 is mounted on a grooved ring 149 adjustable on the main spindle 20. During the reversing of the connecting rod by one of the keys 140 or 141, the locking slide is drawn back, that is to say, to the right in Fig. 6. With the grooved ring 149 engages an arm 150 secured to a spindle 151 (Fig. 6). During the locking by means of one of the keys 140 or 141, the arm 150 will pull the grooved ring 149 to the right owing to a lever 152 with a pin 153 being mounted on the spindle 151. Said pin 153 engages with a grooved disk segment 154 turning with the spindle 143 and keeps the lever 152 depressed during the rotation. Owing to the connecting rods, and therefore, also to the tooth racks having been oscillated, the tooth racks will now be moved in the opposite direction, and in that way the wheel 17, and therefore also the counting mechanism, will be rotated in the opposite direction.

In order to enable the tens to be carried in a suitable manner in this case, the grooved disk 127, which, as already stated, regulates the carriage of tens, must also be oscillated. This is effected by providing the connecting rod 22 with a pin 155 which during its reciprocation rocks, by means of an arm 156 (Fig. 4), a toothed wheel segment 158 pivoted on a screw 157. The toothed wheel segment transmits its rotation to a wheel 159, which is mounted on a screw 160 on the end wall so as to be normally freely rotatable and normally does not drive the toothed wheel 161 (Fig. 6). When however the connecting rod is oscillated by the depression of a key 140 or 141, the toothed wheel 159, and therefore, the toothed wheel 162 which is in engagement with the same, will transmit their rotation to each other, which takes place in the following manner.

When a reversal is effected the spindle 151 will be rocked, as is well known, and accordingly also the arm 163 carrying at its upper end a tooth, will be turned to the right. In that way, the lever arm 164 which is engaged by toothed arm 163 will be turned to the right. The said lever 164 is pivoted at 165 and by means of its arm 166 will press the toothed wheel 159 to the left, as the said toothed wheel is provided with a grooved ring 167 engaged by a pin mounted on said lever arm 166. The grooved cylinder 127 must normally rotate with the spindle 123, as a grooved ring 168 mounted on a pin of the spindle 123 by means of feather and groove, normally drives the grooved cylinder 127 by means of a driver pin 169. During the reversing, the grooved ring 168 will, however, be uncoupled from the grooved cylinder 127 by the toothed wheel segment 158, owing to the upper portion of a lever 169 rotatably mounted at 170, engaging by means of a pin with the grooved ring and pulling the latter to the right. The lever 169 will namely in its turn be oscillated by means of a pin 171 secured to the lever 164.

The mechanisms hereinbefore described, constitute a machine which is capable, once, at each revolution of the main spindle, of adding the number set on the setting gear of the keys to the counting mechanism or to subtract it, quite independently of the position of the carriage, the action of which can be completely reversed at will by a suitable depression of the keys 140 and 141.

The position of the carriage is regulated in the following manner: The carriage is always exposed to a constant pull to the right of Fig. 1, which is due to a spring motor 173 (Fig. 5) mounted on the right hand side wall, and which, by means of its toothed wheel 174, has a tendency to turn the toothed wheel 175 secured to the spindle 123. The spindle 123 will, therefore, be always exposed to a spring pressure, and during its rotation will have the tendency to pull the carriage to the right by means of its pin 126 engaging in the groove 125. The carriage will be locked in any of its positions by means of an escapement pawl 176 (Figs. 3, 10, 14, 15 and 49) which is mounted on the spindle 178 by means of grooved ring 177 sliding on the said spindle and caused to turn with it by means of a feather and groove, but said ring is adjustable on the spindle only to a slight extent limited by the stops 179'. The said detent 176 can be held by stops 179, 180 arranged in two rows with the stops alternating and secured to the plate 118 in such manner that the upper stops 179 lock the carriage in the position shown in Fig. 1, that is to say, normally in a position for addition, while the bottom stops 180 lock the carriage in the position in which the wheels 53 come into engagement with the wheels 58. This position of the detent is automatically regulated by the machine, namely, in a manner substantially well known for carrying out divisions, while the method of regulating its position when making multiplication, is new.

*Multiplication.*—Multiplication in the present machine is effected in an automatic manner, when the multiplicand is set on the setting gear, as soon as the single numbers of the multiplier, beginning with the highest place, have been consecutively pressed on the ten keys T (Fig. 1). The machine will work in such manner that it will form the multiplier on the counting mechanism by alternate addition and subtraction of the multiplicand set. It will automatically choose the most advantageous way in each case, that is to say, if it is called upon to multiply by 1, 2, 3, 4, 5, it will add the multiplicand 1, 2, 3, 4, 5 times, but when it is called upon to multiply 6, 7, 8, 9, it will add the multiplicand once at the place of tens, and then subtract at the unit place 4, 3, 2 and 1 times. But the machine will go still farther. If it is called upon to multiply a number by the multiplier 78396, it will also choose the most advantageous way, that is to say, it will first add the multiplicand at the one hundred thousand place, then subtract twice at the ten thousand place, and also twice at the one thousand place, then it will add four times at the one hundred place, jump the tens place and subtract four times again at the unit place. If the multiplicand were the number 3, the machine would have done the following, in order to obtain the product:

```
+300,000
- 30,000
- 30,000
-  3,000
-  3,000
+    300
+    300
+    300
+    300
-      3
-      3
-      3
-      3
```

Giving as the product __ 235,188

It is obvious that a mechanism which performs such a complicated work which only the most experienced calculators can perform with the machines that have to be moved by hand, is not easy to explain. This explanation will be attempted in the section following:

*Switching wheel.*—The most important part of the automatic multiplication switching is the switching wheel 182 shown in Figs. 3, 16, 21, 15, 49, 60 and 61. This switching wheel is keyed to a spindle 183.

It will be rotated to the extent of one tooth at each revolution of the main spindle 20, as well as at every step which the carriage makes to the right during a calculation. A "step" of the carriage is understood to mean a movement produced by the carriage being shifted to the right to an extent equal to the distance of a stop 180 from a stop 179, or to the same distance of a stop 179 from a next stop 180, which movement takes place when the detent 176 is swung out from a stop, so that it can engage with or be held fast by a stop of the next series. When the detent is in the position shown in Fig. 3, that is to say in front of a stop 179, the carriage will be in the original position shown in Fig. 1. When, on the contrary, the carriage comes into engagement, by means of a stop 180, with the bottom arm of the detent, the carriage will be in such position that the wheels 53 will come into engagement with the toothed wheels 58. Normally, that is to say, when the key 140 is depressed, the carriage which is in the position shown in Fig. 1, will make additions. At the first step to the right from the main or original position, the carriage will come into such a position that subtraction will be made at the next lower place. At a further step, additions will be again made at the next lower place compared to the original position, so that at each step of the carriage there will be a reversal of subtractions into additions and vice-versa, and at each second step there will be a reversal to the next lower place compared to the step last but one. This is substantially described in my United States Patent No. 809,075.

The switching wheel 182 with its spindle 183 must be therefore rotated to the extent of one tooth farther at each revolution of the main spindle and at each step of the carriage. This is effected in the following manner: At the lower end of the plate 118 of the carriage is mounted a tooth rack 198 on which are milled single teeth 199 (Figs. 9 and 10). These teeth 199 engage with a toothed wheel 199' (Fig. 22) which transmits its rotation to a toothed wheel 200 (Fig. 49), which is rotatably mounted on a journal of the spindle 183. This toothed wheel is provided with a driver pin 201 (Figs. 3 and 49) projecting downward and engaging with one of the ten perforations 202 of a disk 203, thus driving the disk in question.

The disk 203 is adjustably mounted, by means of a feather and groove, on the spindle 183 and will, therefore, drive the spindle so that, on the rotation of the wheel 200, the switch wheel 182 will also be rotated. The movement of the wheel 200 is rendered positive by means of a locking disk 200' which slides along the rod 198' which, therefore, acts as locking disks. However, the switching wheel must also be turned farther to the extent of one tooth, at each revolution of the main spindle 20. To that end, on the main spindle is mounted a grooved disk 204 (Fig. 11) into which projects a pin 205 of a lever 206. The lever 206 is mounted in a freely rotatable manner on the spindle 48 and has connected to it a tooth rack 208 (Figs. 3, 11, 22) engaging with a wheel 209 mounted in a freely rotatable manner on the spindle 183 and rotated forward and backward by the tooth rack 208 to the extent of one tooth at each revolution of the main spindle.

The forward movement is transmitted by a driver pin 210 to the described disk 203 (Figs. 3 and 49) which, during the revolution of the main spindle, is temporarily lowered and then raised again, and this is effected by means of the following mechanism: On the bar 42 (Figs. 2 and 67) which, for the purpose of raising and lowering the tooth rack 28, is pushed in the manner already described to the right and to the left hand sides of Figs. 2 and 6, is mounted a pin 211 engaging with a groove 212 stamped out in a piece of sheet metal mounted on an arm 213 of a double lever (Fig. 3) rotatably mounted at 214 and provided at its front arm 215 with a fork 216 inclosing a bead turned on the disk 203. At each revolution of the main spindle, the bar 42 (Fig. 2) will therefore, be moved once forward, and once backward, and the pin 211 will at the same time slide in the groove 212 and raise and lower the lever 213, 215 and therefore, also the disk 202. The movements of the tooth rack 208 with the disk 203 are regulated relatively to each other in such manner that the disk transmits the forward but not the backward movement of the tooth rack to the disks, and therefore also to the switch wheel.

It will thus be clear, and it must be borne in mind during the whole specification, that the switch wheel will be moved to the extent of one tooth at each step of the carriage as well as at each revolution of the main spindle.

The switch wheel is substantially a cast body provided on its cylindrical circumference with ten grooves 185 into which fit the inserted teeth 184, so that the said teeth are longitudinally, that is to say, in Fig. 3, vertically adjustable. These teeth can occupy three different positions. In the first position, they will not be in engagement with any mechanism; in the central position, they are lowered to such an extent from their position shown in Fig. 3 that they can come into engagement with a toothed wheel 186. If the teeth 184 are lowered still farther they will come into engagement with a stop 187.

The teeth 184 are mounted in the switch wheel on a slide 218 fitted in it and the upper end of which slide is provided with a second tooth 219 (Fig. 3) by means of which the teeth are seized by the claws 220 provided at one end of the double armed levers $h^1$—$h^{10}$. These ends engage around the switch wheel and, as will be seen from Fig. 46, the said claws 220 are provided with cam faces 221 curved in the direction of the movement, so that the teeth 219, whatever be their position, can always engage with the narrow proper claw portion 220. The levers $h^1$—$h^{10}$ are mounted in a rotatable manner in bearings 222 (Fig. 3) on the bottom of the machine, and it will be clear that by suitably raising or lowering the front ends of the levers $h^1$—$h^{10}$, it will be possible to set the teeth of the switch wheel at will. As will be seen from Figs. 2, 7 and 8, the front ends of the levers $h^1$—$h^{10}$ are formed into forks by two arms 223 being riveted on. Opposite each two adjoining arms of the said forks are arranged levers $d^0$—$d^{10}$ which are mounted in bearings so as to be capable of oscillating in every direction. They are rotatably mounted with their upper ends 227 on angles 225, which in their turn, are rotatably mounted on pins 226, 227 and 228. The levers $d^8$—$d^{10}$ and the lever $d^1$ are secured to the switch plate 229 by means of their pin 226. The other levers, that is to say, the lever $d^0$ and the levers $d^2$—$d^7$, are secured to the pin 227 or to the pin 228 which are not fixed on the switch plate 229, but can be moved vertically in slots 230 as soon as one of the keys $T^0$—$T^9$ is depressed, which keys serve for setting the multiplier; namely, the shifting of the keys $T^0$—$T^5$ produces substantially the same movement of the lever $d$ situated below them, while on the other hand the keys $T^6$—$T^9$ also each act substantially in the same manner, but move the levers $d$ in a different manner from that of the keys $T^1$—$T^5$.

Figure 7:
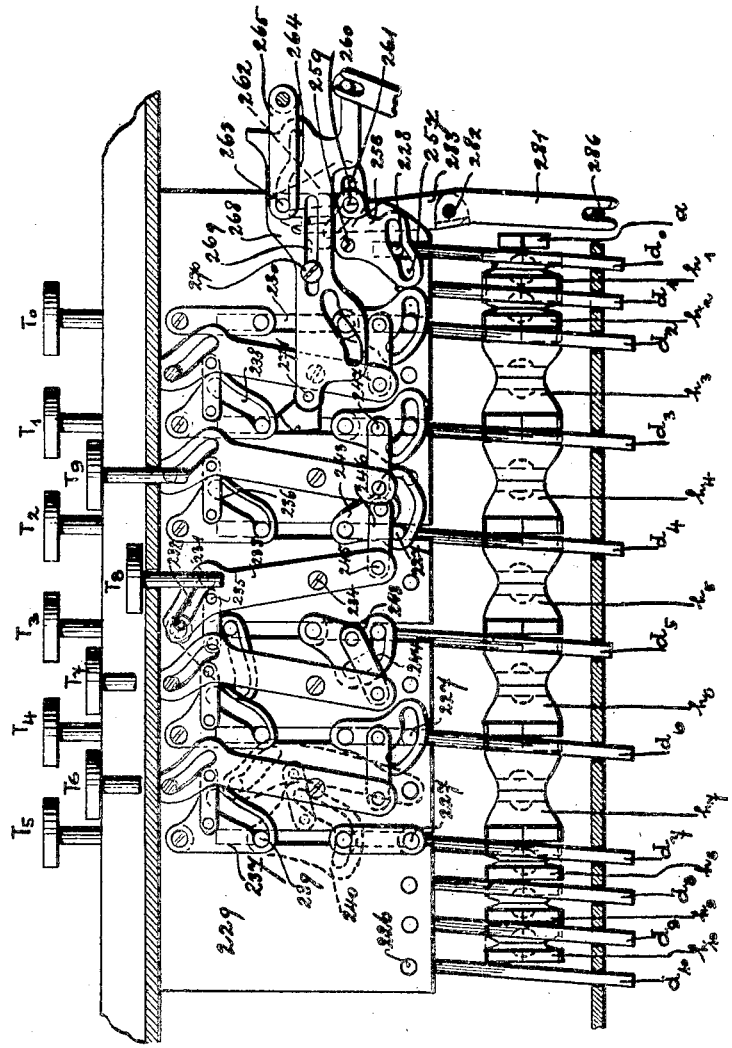
Figure 8:
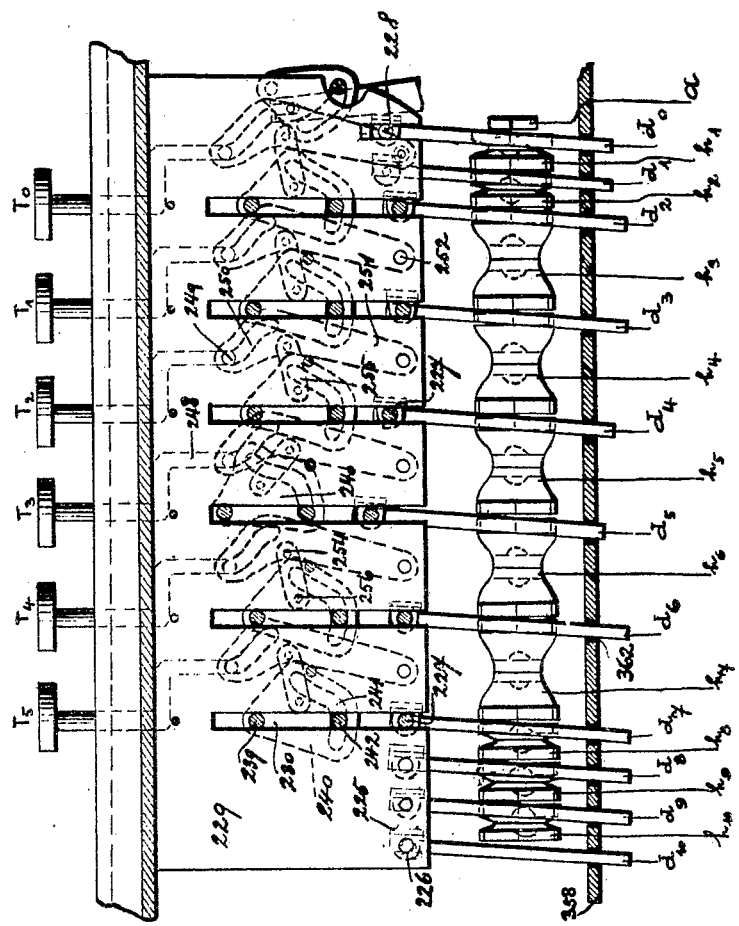

When one of the keys $T^5$—$T^9$ is depressed, for instance the key $T^8$ as shown in Figs. 7 and 8, the following will happen: Each key T is provided with a pin 231 (Figs. 3 and 4) sliding in a slot 232 of a lever 233, and on being depressed, shifts the latter to the left at its fulcrum 234. To the lever 233 is pivoted at 235 an arm 236, the other end of which is pivoted to a lever 237 in which a slot 238 is formed. In the said slot 238 slides a pin 239 projecting through the slot 230 of the switch plate and provided at the rear end with a segment 240. It will be clear from the shape of the slot 238 that when lever 237 is turned, the pin 239, and consequently also the segment 240, will be raised.

The segment 240 has in its turn a slot 241, into which projects a pin 242 which again projects forward through the slot 230 of the switch plate, and in its turn carries a segment 243 in which is a slot 244. With the said slot 244 engages the already described bearing pin 227 on which are mounted the levers $d$ in the manner described. If, therefore, any member or link of the described segment chain is raised, the lever $d$ situated below the same, will also be raised. By depressing the key $T^8$, the lever $d^5$ will, therefore, also be raised.

The lever 233 is, however, double-armed, and has pivoted to its lower end at 245 an arm 248 pivoted at 247 to the already described segment 243. Accordingly, the depression of the key $T^8$ will result in the movement of the segment 243 situated at its right, in which will slide the bearing pin 227 of the lever $d^4$ which will also appear raised. The shape of the segment slots is, however, such that the segments 237, on being moved, raise the levers suspended from them, twice as high as the segments 243. Whenever a key $T^{6-9}$ is depressed, the levers $d$ situated below it at both sides will, therefore, be raised, the left hand lever twice as much as the right hand one.

When one of the keys $T^{0-5}$ is depressed, the following will take place: The keys are provided at their lower arms 248 with pins 249 capable of sliding in a slot 250 of a lever 251, and, on being depressed, turning the lever 251 to the left about its fulcrum 252. To the said levers 251 are pivoted at 254 levers 255, the other ends of which are pivoted at 256 to the already described segments 240 so that on the depression of a key $T^{0-5}$, the segment 240 situated below it, will be moved to the left. In that way the lever $d$ situated under the key depressed, will be raised, to the same distance, as the lever situated on the left hand side of a key $T^{6-9}$, that is to say, to a double distance.

The levers $d^{8-10}$ and the lever $d^1$ are firmly secured to the switch plate 229. On the other hand, the lever $d^0$ can be raised in a fairly complicated manner which will be best understood from Figs. 7, 23, 24 and 25. The bearing pin 228 of the lever $d^0$ slides in a slot 257 in a lever 258 rotatably mounted at 259 and carrying a pin 260 projecting into a slot 261 in a lever 262 rotatably mounted on a pin 263 projecting through a slot 264 and riveted to a lever 265 rotatably mounted at 266 on the frame or box of the machine.

The slot 264 is formed in an adjustable plate 268 mounted by means of its slot 269 on a screw 270 in the switch plate so that it can move to the right and to the left in Fig. 7. At the left hand end, the plate 268 is attached at 271 to a chain of levers, one of which is always pushed to the right as soon as one of the keys $T^{6-9}$ is depressed. This will be best seen in Figs. 24 and 3. Each of the keys $T^{6-9}$ has cast on it a guide face 272 which, on the key being depressed, presses against a roller 273 arranged at the joint of each two levers 274 and 275 connected at 276 and 277 to the next levers 274 and 275, so that all the levers form a chain of triangles which, by means of rollers 278 and 279 mounted at 276 and 277, slide on a guide surface which is machined on a block 280 cast onto the wall of the machine frame or box.

The rollers 273 form the apices of the triangles, and when one of the said triangles is flattened out by the depression of a key $T^{6-9}$, the plate 268 will be moved to the right, as will be seen from Fig. 24. In that way the pin 263 sliding in the slot 264, will be raised with its segment 262, and accordingly the pin 260 will also be raised and in that way the segment 258 rotated and brought into the position shown in Fig. 7. At the same time the pin 228 which slides in the slot 257 and to which is attached the lever $d^0$, will not be moved, but as will be seen from the shape of the slot, will remain in its raised position as shown in Fig. 7.

The lever $d^0$ with its pin 228, will, however, be lowered from its raised position when the segment 258 is turned still farther to the right, that is to say, when the pin 260 is still further raised. This will be the case when the segment 262 in its turn is swung to the left, as the pin 260 will then slide upward in the slot 261, and in that way produce a rotation of the segment 258 beyond the position shown in Fig. 7. The pin 228 will then pass into the lower left hand end of the slot 257, and in that way the lever $d^0$ will be lowered. This eventual rotation of the segment 262 is effected by a lever 281 mounted at 282 on the frame or box of the machine and having stamped out at its bent end 283 a fork 284 by means of which it engages a pin 285 secured to the segment 262.

When the lever 281 is rocked to and fro, it will also contribute to the lever $d^0$ being lowered. It must, however, be remembered that the lever $d^0$ can be lowered only when the plate 268 is moved to the left, which is the case only when one of the keys $T^{0-9}$ is depressed, and moreover, the lever 281 must be pressed with its upper arm 283 quite to the right, that is to say, the lower lever arm 218 must be pulled to the left altogether. The lever 281 is moved by a pin 286 secured to a bar 287 and moved in a way hereinafter explained.

Thus all the mechanisms have been explained, which directly control the position of the levers $d$ which, as will be hereinafter explained, transmit their movement by means of the levers $h$ to the pins of the switch wheel. The levers can be pressed simultaneously with their wedges 288 into the corresponding recesses 289 of the front forked ends of the levers $h$, and it will be clear that according to their position they will raise and lower the levers $h$, so that in that way the teeth 184 of the switch wheel will be correspondingly set.

Of course the machine must select correctly the moment at which it effects the transmission of the position of the levers $d$ to the switch wheel, which is done by means of various mechanisms hereinafter described. The transmission mentioned is automatically effected by the following mechanisms: A motor M is mounted, as shown in Figs. 1, 2 and 5, in the box or frame of the machine. It is immaterial what kind of motor it be. In the drawing, the machine is shown with an electric motor. On the spindle 290 of the motor is mounted a wheel 291 constantly driving a toothed wheel 292. Instead of a toothed wheel gear a belt pulley transmission could of course be adopted.

The toothed wheel 292 is mounted in a freely rotatable manner on a spindle 293 (Fig. 24) and is provided with any desired number of tappet pins 294 acting on a driver 295 pivoted by means of a screw 296 in a recess in the circumference of the disk 297. Normally the driver 295 will be unable to turn about its pivot point 296, as the other arm 298 of the driver normally rests against the end 299 of a double lever 300 pivoted by means of a screw 301 to the disk 297 and pulled to the right by means of a spring 302, so that normally the end 299 will be situated in front of the driver 298 in such manner that the latter cannot yield to the pressure of the tappet pins of the toothed wheel 294, and hence the toothed wheel 292 will normally also drive the disk 297. As soon, however, as a stop such as 305 is brought into the path of the stop 303 mounted at the end of the lever 300, the lever 300 will thereby be turned in opposition to the tension of its spring 302, and, instead of the end 299, a slot 304 will be brought in front of the driver 298, so that the driver will be free to rotate about its pin 296 and thus will move out of the way of the tappet pins 294. The result of this kind of coupling is, therefore, that it will be impossible to stop the driven disk 297 in its normal position by placing any stop in opposition to the stop 303 of the lever 300. Such a stop is, for instance, the end 305 of a lever 306 which is pivoted at 307 to a bearing 308 on the box of the machine.

If no key T is depressed, the stop 305 will be situated in front of the stop 303. The upper arm 309 of the lever 306 is held then by an arm 310 in the retracted position as shown in Fig. 5. The arm 310 is formed on a lever 311 which is pivotally mounted at 312 on the wall of the box of the machine and rests with its upper end 313 in front of the two stops 314 and 315. The stop 314 is on the already described plate 268 which is moved to the right in Fig. 24 as soon as one of the keys $T^{6-9}$ is depressed. The stop 315 (Fig. 23) is on a plate 316 which is moved to the right when one of the keys $T^{0-5}$ is depressed, the said movement of the plate 316 being effected by practically similar mechanism as that used for moving the plate 268.

Under each key $T^{0-5}$ are arranged the same jointed triangles 318, 319 with rollers 320, 321 and 322, as already described for the keys $T^{6-9}$, the rollers in question sliding on the one hand on a bar 324 (Fig. 3), and on the other hand being depressed by guides 323 provided on the keys $T^{0-5}$, whereby the plate 316 pivoted to the right end 325 of the triangle chain, is moved to the right.

It will thus be clear that each setting of the keys, either the stop 314 or the stop 315, will be moved to the right, so that the arm 313 of the lever 311, situated in front, will be moved to the right. This will result in the arm 310 sliding backward, and the said arm is bent in such manner that it will then give sufficient clearance or play to the lever 309 in order that the stop 305 may be withdrawn from the stop 303. In this way the spindle 293 will be rotated once. To the said spindle 293 is firmly secured a grooved disk 326 with the groove of which engages a pin 327 provided on the arm 328 of a double-armed lever pivoted at 329 and having its other end projecting into the switch wheel (Fig. 3). On the said end is mounted a pin 330 engaging with a grooved ring 336 provided on a sleeve mounted in a vertically adjustable manner on the spindle 183 of the switch wheel. Under the said sleeve is mounted a ratchet wheel 332 shown in Fig. 42 and also visible in Figs. 15 and 3. The teeth 333 of the ratchet wheel may engage with recesses shown in the back on the body of the teeth 148. Normally the ratchet wheel will remain in the position shown in Fig. 15, its teeth locking the teeth 184 in their position at the time.

If, however, the sleeve 331 is raised, the ratchet wheel will be thereby slightly turned (Figs. 3 and 49) as the sleeve is provided at the bottom with an oblique pin 334 which, so to say, forms a portion of a screw thread and projects downward through a gap 335 in the ratchet wheel. By the raising of the sleeve with its piece of screwthread 334, the ratchet wheel, will, therefore, be turned to such an extent that its teeth will release the teeth 184. This raising of the sleeve is effected by the lever 328 which, as already described, has a pin 227 which projects into a groove of the rotating grooved disk 326. The teeth 184 are, therefore, now free to move. They are adjusted by the forcing in of the wedges 288 of the levers $d$ into the recesses 289 of the levers $h$ according to the position of the levers $d$ at the time. This forcing in is effected by means of a bar 336 oscillating between levers 337 (Fig. 3) keyed to the spindle 338. A pin 339 is mounted on a lever 337 and projects into a groove of the grooved disk 326, so that on the grooved disk rotating, the bar 336 will press the levers $d$ against the levers $h$.

After the teeth 184 have been thus properly adjusted, the sleeve 331 is lowered, and the bar 336 is withdrawn, whereupon the teeth 184 are again locked in their newly adjusted position. At the same time the depressed key is again brought back to its position of rest, owing to a pin 340 (Figs. 23 and 24) on the grooved disk 326, striking against a wedge 341 at the lower end of the lever 311 before the revolution of the grooved disk is completed, so that the lever 311 will again compress the chains of links 274, 275 or 318 and 319 by acting on the stops 314 and 315 and thus force the depressed key to return to its position of rest.

The operator can now again depress a new key at once. It is obvious that it is necessary to prevent the new position of the levers $d$ thus produced, from being at once transmitted to the levers and to the switch wheel, before the first depressed figure has been properly calculated by the machine. This regulation is effected by means of the following mechanisms which must be described before it will be possible to give a connected description of the processes in the machine during the multiplication.

Below the switch wheel and rotating about the axis or spindle of said wheel, is mounted a double lever 342 which is shown dotted in Fig. 17 and in full lines in Fig. 69. It is provided at its upward bent ends with a disk 343 riveted onto it and stamped out or recessed in a peculiar manner, so that the said disk can alone rotate about the spindle 183. Between the hollow upward bent arms 342 and the disk 343 on the spindle 183 is mounted a disk 344 which also is stamped out or recessed in a special manner. Over these two disks is placed a ring 345 firmly secured by means of three arms or lugs 346 to the bottom of the box as shown in Figs. 19 and 21. To the bottom face of the said ring 345, as will be seen from Fig. 18, is pivoted the stop lever 187 and a number of levers 347, 347', 347'', 347''', and front ends 348 of which are bent downward, as shown in Figs. 3 and 48, so that they project into the already described stamped out or recessed disks 343 and 344. Only the four front levers which are shown in Fig. 19 in their pushed out position, or rather their arms 348, are so long that they can project not only into the disk 343, but also into the disk 344. The ends 348 of the other levers 347 project downward only so far that they can coöperate with the disk 343 alone. These levers are arranged on the same level with the already described stop lever 187 which, as stated, is secured to the ring 345, and the consequence will be that the tooth of the switch wheel 182, which was pushed into its lowest position, will successively press the levers 347 outward during the rotation of the switch wheel. The said tooth will come successively nearer to the stop 187, and as already stated, when the said stop tooth arrives at the stop 187 and presses the latter back, the rotations of the main spindle will be stopped thereby, and the machine will stand still. The levers 347 will, therefore, be successively pressed outward, and their downturned ends 348 projecting into the disks 344 and 343 will adjust the disks differently, owing to the different planes of the disks. The manner in which the said disks adjust themselves, will be subsequently described during the general description. According to the position of the disks the levers 349 and 350 (Figs. 3, 17 and 18) which are pivotally mounted at the bottom of the box about a screw 351 will be moved. The said levers engage by means of the forked front ends 352 and 353 with pins 354 and 355 secured to the disks 343 or 344, so that with the disk in question, the levers 349 and 350 will also be oscillated. The lever 349 engages at its front end 356 a pin 357 which is secured to the bar 287 as shown in Figs. 3, 24 and 25, so that the bar 287 will be placed into different positions according to the position occupied by the low placed stop tooth of the switch wheel. The nearer the stop tooth comes to its stop 187, the farther to the left in Fig. 24 will the bar 287 be pulled, as will be subsequently described.

The lever 350 transmits the oscillating movement of the disk 344 to a bar 358 mounted adjustably on angles 359 at the bottom of the box. As will be seen from Fig. 3, the front forked end 360 surrounds a pin 361 secured to the bar 358. The bar 358 is provided with slots 362 in which oscillate to and fro all the levers $d$, as shown in Figs. 3, 7 and 8. The levers $d$ will, therefore, participate in the reciprocation of the bar 358, and according to the position of the bar, will either move, as shown in Figs. 7 and 8, a little to the left, so that the levers $d^5$ will come into engagement with $h^5$, $d^6$ and $h^7$ and so on, or the levers $d^5$ will all be swung a little to the right, so that the levers $d^4$ will come into engagement with $h^4$, $d^5$ with $h^5$, etc.

It must be mentioned at this point that the movement of the bar 287 is transmitted to a slide 363 (Figs. 23, 24 and 25) which is adjustably mounted on the wall of the box or casing, and the front end 364 of which is bent or formed into a stop which, in the same way as was formerly described for the stop 305, coöperates with the stop 303 for the coupling wheel 326, and as soon as it comes in front of the stop 303, prevents the wheel 326 from rotating. The slide 363 is connected to the slide 287 in the following manner: The slide 287 carries a pin 366 sliding in a slotted segment 367 mounted on a pin 368 projecting into a grooved segment 369 pivotally mounted on a pin 370 secured to the bar 363. The pins 368 and 370 project through a slot 372 in the bar 287.

According to the positions of the grooved segments 367 and 369, the bar 363 will be, therefore, advanced or withdrawn independently of the bar 287. The segment 367 is moved according to the position of the plate 268. The latter is provided with a groove 374 milled in, into which projects the pin 375 of an arm 376 guided between pins 376' and pivoted at 377 to the grooved segment 367. The pin 375 will, therefore, slide in the groove 374 as soon as the plate 368 is shifted, that is to say, as soon as one of the keys $T^{6-9}$ is depressed.

The other segment 369 will assume different positions according as to whether in the previous digit value one of the keys $T^{6-9}$ had just previously been depressed or not. To the segment 369 is pivoted at 378 a lever 379, the other end of which is pivoted at 380 to a lever 381. The lever 381 is pivoted on the casing or box wall at 382 and has a forwardly bent arm 383 pivoted at 384 to a lever 385 which, in its turn is pivoted to the double lever 386. The double lever 386 is pivoted at 387 to a bearing 388 so that, as shown in Fig. 23, it is situated above the spindle 293.

On the spindle 293 is adjustably mounted by means of a feather and groove a projection or finger 389. It is provided with a grooved ring 390 with which engages a pin on the double-arm lever 391 provided at its upper end with a fork engaging a pin 392. The said pin 392 is mounted on an arm 393 of the plate 268, so that, therefore, according as one of the keys $T^{6-9}$ is depressed, the projection 389 will come to rest either under the left or under the right hand end of the double lever 386 during one rotation of the spindle 293. On the rotation of spindle 293 (Fig. 24), the projection 389 will then press upward either the left or the right hand end of the double lever 386, and in that way set the segment 369 upward or downward, by means of the levers 385, 383 and 379.

Before describing the multiplication as a connected process, it is still necessary to explain the method of driving the main spindle. The motor M (Fig. 5) is provided at the near end of its spindle 290 with a driving wheel 395, the rotation of which is transmitted to the toothed wheel 398 by means of toothed wheels 396 and 397 secured by means of screws to the right hand wall (as shown in Fig. 2). The toothed wheel 398 is rotatably mounted on the main spindle 20, and rotates a disk 399 mounted on a sleeve. A driver disk 400 is arranged opposite the disk 399. On the disk 399 are mounted drivers or tappets 401 which drive the disk 400 by means of a driver 402 when the arm 403 with its stop 404 is free. The method of coupling the wheel 398 to the driver 402, is the same as already described for the wheel 292 and the driver 304 as shown in Fig. 24 so that it is not necessary to describe such a coupling again.

The main spindle 20 to which is keyed the disk 399 of the driver 402, will be, therefore, coupled to the motor when the stop 404 is free. This stop can on the one hand be stopped by the stop 405, and on the other hand by the stop 406. The stop 405 is mounted on a rod 407 (Fig. 15) mounted on the bottom of the machine and thrown into gear as soon as the stop of the switching wheel throws out the stop lever 187, that is to say, as soon as the machine is to be stopped.

The stop lever 187 is provided with an arm 408 engaging by means of a fork over a pin 409 mounted on the bar 407, the movement of which arm is transmitted to the bar 407, so that the motor is disconnected from the main spindle as soon as the stop pin of the switch wheel presses against the stop 187.

The second stop 406 (Fig. 5) uncouples the motor from the main spindle 20 when the claw 176, already described, is moved to the left in Fig. 14 by the action of the spring 411. The claw is connected by means of the pin 412 and the bifurcated end 413 (Fig. 14) of the lever 414 to the claw, so that the spring 411 will have the tendency to pull not only the lever 414 but also the claw 176 to the left. If the carriage becomes hooked with one of its counter-hooks 179 or 180, to the claw, the stronger tension spring of the carriage will overcome the pull of the spring 411, and the claw with the lever 414 will then be brought into the position shown in Fig. 14.

When the carriage is not hooked on to the claw, the lever 414 will follow the pull of the spring 411, and the lever 414 will be drawn to the left. The said lever 414 is mounted at 415 and provided with a bottom arm 416 to which is pivoted a bar 417 provided, as shown in Fig. 5, with the stop 406, so that one of the two stops 406 or 405 can throw out of gear the motor which will thus be disconnected from the main spindle when either the carriage is not hooked firmly to the claw, or when the stop tooth of the switch wheel strikes the stop 187.

In order not to have to describe in detail any more mechanisms in the next section, when describing the multiplication it must be mentioned now that when the lever $d^0$ (Figs. 7 and 8) presses on the lever $a$, which will be the case when the bar 358 is shifted to the right, it will result in a rotation of the wheel 186.

The lever $a$ is, unlike the levers $h$ which are rotatable about their bearings, mounted in a longitudinally adjustable manner, which can be effected for instance by screwing on to the bottom of the casing a bearing 418 with a pin 419 sliding in a slot 420 of the bar $a$, so that the latter is guided by the pin in question.

If the bar $a$ is pressed backward by the depression of the lever $d^0$, its front end will move by means of a pin 421, the double armed lever 422 which in its turn will oscillate by means of a pin and fork, a double lever 198 about its bearing 424. The front arm of the lever 198 is provided with a tooth 423 which, on the lever 198 swinging, will turn the wheel 186 also to the extent of one tooth, as is generally done by the switch wheel.

The lever $a$ will be brought by a spring 425 back to its original position, the tooth 423 no longer driving the wheel 186 (Fig. 15). As will be seen from the detail view in Fig. 47, the tooth 423 is pivotally mounted on the lever 198 by a pin 426, and a spring 427 and a stop pin 428 cause the tooth 423 to drive the wheel 186 in one direction, while during the snapping back of the lever $a$, the tooth 423 will move past the wheel 186. It must also be pointed out that of course, while the tooth racks 28 are raised, the carriage must be fixed or locked in its position at the time, in order that the tooth racks 28 should properly transmit their movements to the wheel 17. This can be effected for instance by pivoting to the bar 42 a double lever 429 (Fig. 10) pivotally mounted on a bearing 430 by means of a screw 431. The front arm 432 of the lever in question carries a pin 433 engaging with milled slots 434 on the wall 118 of the carriage, whereby the carriage is, therefore, always stopped when the rod 42 is pressed to the left, the tooth racks 28 being raised as is well known.

With the mechanism described above, it is possible to carry out multiplications by setting the multiplicand on the keys 1 of the slide, and thereupon setting the multiplier by the depression of the multiplier figures on the keys T, starting with the figure of highest value. The machine will then begin to multiply immediately after the depression of the first multiplier figure, and during the multiplication the next multiplier figure can be set, while the other figures of the multiplier can be set in sequence, as far as the time of depression of the keys is concerned, and the machine will in any case multiply correctly, and it will follow the shortest way for making the multiplication that is possible with regard to the figures which are set by the operation of the multiplier keys.

In order to understand the complicated processes which take place in the interior of the machine, the said processes will be explained with reference to a typical example, namely, the multiplication of any desired multiplicand by the number 888,833. The different ways in which during the course of the calculation the switch wheel or disk, or the teeth of the same are set, is diagrammatically shown in Figs. 39, 40, 41, 43, 44 and 45. In the said figures the four-toothed wheel 186, with which can engage the teeth of switching wheel, is indicated by a cross (Fig. 39). The bell crank lever 198 which, as already stated, is adapted to rotate the wheel 186, is indicated by an angle. When the said angle opens to the left, as in Fig. 39, this indicates that the lever 198 has not been actuated. If, however, the said angle opens downward, as shown in Fig. 41, this indicates that the lever 198 has exercised a turning action on the switch wheel. The ten teeth 184 of the switch wheel are indicated in the said figures, according to the position intended to be shown by the diagram, either by open circles 193 (Fig. 39) or by solid black circles 194, or by triangles 195. The open circle indicates the uppermost position of the teeth 184 in which they do not exercise any action at all if the switch wheel is rotating. The solid circle indicates the central position of the teeth 184 in which, owing to the rotation of wheel 186, they can lift out or disengage the pawl 176 and thus produce an advance or step of the carriage as soon as they pass the wheel 186. The triangle indicates the lowest position of a switch wheel tooth 184, in which position the switch wheel tooth may act on the stop 187, and thus disconnect the motor from the machine. The stop 187 is diagrammatically shown in the figures in question.

The diagrammatic illustrations show two concentric circles each with ten teeth. The inner circle represents the position of the teeth of the switch wheel before the moment in which the switch wheel is brought into a new position. The outer toothed circle represents the position of the teeth in the new adjusted position.

Let it be assumed that the number 1 has been set as a multiplicand in any series of keys 1, and that in accordance with the above mentioned example, the figure 8 has been depressed as the highest multiplier figure of the multiplier 888,833. The position of the switch wheel before that moment is shown by the inner circle in Fig. 39. The stop tooth is situated in front of the stop 187, whereby, as already stated, the motor is disconnected from the machine. By depressing the key 8, the lever 311 will be forced to the right in Fig. 24, as already described, and in that way the stop 305 will be forced away from the stop 303 (Fig. 5) whereby the spindle 293 will be coupled to the motor for one revolution. In that way, the levers $d$ will be pressed into the levers $h$ or into the lever $a$, and the position of the said levers will thus be transmitted to the switch wheel teeth. The position of those levers is shown in Fig. 50. The levers $d$ are forced to the right from the position shown in Figs. 7 and 8, by the bar 358, as soon as the stop pin of the switching wheel is opposite the stop 187, as indicated by the inner circle of Fig. 39.

The downwardly projecting tooth 348 of the stop 187 will then be pressed into such a recess of the disk 344 that the disk will pass into the position shown in Figs. 18 and 59, in which the lever 350 is turned in such manner that it presses to the right the bar 358. The lever $d^0$ will then force back the stop lever $a$, while the lever $d'$ will adjust the lever $h'$, and the lever $d^2$ the lever $h^2$, according to the position of the levers $d$ as shown in Fig. 50, so that the same position of the levers $d$ shown on the outer tooth circle of Fig. 39, will be obtained on the switch wheel, as will now be explained.

As will be seen from Fig. 39, the stop lever 187 has not been struck. In the case just described, the lever $d^0$ will occupy not the position shown in Fig. 7, but its lowest position as shown in Fig. 50, so that its tooth 288 will come under the end of the lever $a$ and will not act on the same. This is due to the fact that the bar 287 (Figs. 23–25) is always pressed entirely to the left, as soon as the stop pin of the switch wheel is in front of the stop 187, which is effected by a suitable shape of the stamped out curves of the wheel 343 (Figs. 17 and 59) which as described, operates the bar 287 by means of the lever 349, 356. On the bar 287 is mounted, as described, the pin 286 which moves the lever 281 (Figs. 24 and 50) so that the said lever will be pushed to the left, whereby its upper arm 283 will move the slotted segment 262, so that the slotted segment 258 will be turned, and in that way the lever $d^0$ lowered.

Owing to the adjustment of the teeth of the switch wheel as indicated at the outer circumference of Fig. 39, the tooth which is in front of the stop 187, is raised into its position of rest. In that way, as described, the motor is coupled to the main shaft 20 so that the multiplicand will be added once at the highest place. During that addition, the switch wheel will, as described, be turned to the extent of one tooth, so that the next tooth $z'$ which is in the middle position, will pass 186, and in that way, as already described, swing the pawl 176.

Accordingly, after the completion of the addition, the carriage will make a step whereby, as described, the operating mechanism will be ready to perform subtraction from the numeral wheels of the next lower denomination. During this advance or step of the carriage the tooth $z^2$ (Fig. 39) has also passed in front of the wheel 186. The machine will then subtract once at the next lower place, the tooth $z^3$ passing in front of the wheel 186, whereupon there will be another subtraction, the tooth $z^4$ passing the wheel 186. The latter tooth is in the central position, it will therefore bring about a step forward of the carriage and during the advance of the carriage, the tooth $z^5$ would advance and act on the stop 187 and bring about the stoppage of the main spindle 20. The multiplicand is thus added once at the higher place, subtracted twice at the next lower place, whereby a multiplication with 8 has been carried out.

We will, however, assume now that, just before the last mentioned step of the carriage takes place, the calculator depresses the next multiplier figure, which 8 repeated. At this moment, therefore, when the switch wheel is in a position shown by the inner circle in Fig. 40, the position of the levers $d$ will be transmitted in well known manner to the switch wheel by a rotation of the spindle 293. The lowest tooth of the switch wheel will not then press the stop 187 (Fig. 19) but the stop 347' into the stamped out recesses of the two disks 344 and 343, as illustrated in Fig. 58. The position of the disk 343, and therefore of the slide 287 controlled by the same, will be the same as already described, so that also the lever 281 (Fig. 51) and the lever $d^0$ controlled by it, will be in the same position as described, that is to say, the lever $d^0$ will be lowered. On the contrary, the slide 358 will be brought then by the disk 344 into the left hand position shown in Fig. 51, so that the position of the lever $d^0$ will be transmitted to the lever $h'$, the position of $d'$ to $h^2$, and so on. The teeth of the switch wheel will accordingly be brought into the position shown in Fig. 40, and the following will take place.

At the moment that the adjustment or setting of the switch wheel took place as described, the pawl was lifted out or disengaged, so that, after the completion of the rotation of the main spindle, the carriage will have the tendency to make one more step. During the said step of the carriage, which brings the latter to the position for the addition of the same place value, at which the two subtractions had previously taken place, the tooth $z'$ of the wheel 196 will pass in front of the wheel 186. The carriage will then be locked in a position for addition, and an addition will be effected for a place value which represents for the newly set multiplier figure, the value of tens, that is to say, to the already calculated 800000 there will be added another 100000 (10 times 10000). During that addition, the tooth $z^2$ which is in the middle position, will pass 186, so that during the said addition the pawl will be lifted out of engagement with the proper carriage stop. The carriage then makes a step which will bring $z^3$ past 186, whereupon a subtraction will take place at the ten thousand value, and $z^4$ will pass 186; thereupon the second subtraction will take place, and $z^5$ will pass 186 and lift out the pawl 176, so that the next performance would be a step of the carriage, which would bring the carriage into its next adding position, that is to say, into its position for addition, and the stop $z^6$ in front of the stop 187. We will assume, however, that before the last subtraction takes place at the ten thousand place, the calculator has depressed the key 8 to indicate the multiplier figure of the following thousands place. At that moment, the switch wheel will be in the position shown by the inner circumference in Fig. 41. At that moment the lower stop tooth of the switch wheel will press the lever 347'' (Fig. 19) into the recesses of the two disks 343 and 344 into the position shown in Fig. 57. In that way the disk 344 will again move the bar 358 to the right, as also happened in the case of Fig. 39. The disk 343 will now no longer pull the arm 287 entirely to the left, as formerly described, but will press it so far to the right, that the stop 364 (Figs. 25 and 5) would normally coöperate with the stop 303 and prevent the spindle 293 from rotating.

The multiplicand had, however, already been multiplied by 8, whereby, as explained in the beginning, the slotted segment 369 will now be depressed downward. As during the previous rotation of the spindle 293, the key $T^8$ was depressed, the projection 389 was brought thereby into the position shown in Fig. 24, by moving the pin 392, and shifting the lever 391 to the right of Fig. 24. In such position it will, during a subsequent rotation of the spindle 293, rock the double lever 386 in such manner that it lowers the grooved segment 369. This will be presumed to have already taken place. Owing to the lowering of the grooved segment 369, the stop 364 was pushed so far to the left that, in spite of the movement of the bar 287 to the right, the spindle 293 can be rotated. From this follows the general rule that the machine enables the switch wheel to be adjusted or set before the last main spindle rotation which has to be effected for a preceding place value, when the preceding multiplier figure, as well as the multiplier figure to be set, is greater than 5. The position which the levers $d^0$ occupied before the last subtraction of 10000 took place will therefore, be transmitted to the switch wheel. This time, however, the lever $a$ has been struck by the lever $d^0$ as now to be described. As the bar 287 is pushed to the right, the lever 281 will be pulled by the pin 286 to the right, that is to say, into the position shown in Fig. 52, which will also result in the lever $d^0$ being left in the position shown therein. It has been pointed out that the bar 358 will then be pressed to the right, so that the levers $d^0$ will coöperate with the levers $a$, $d'$ with $h'$ and so on. Accordingly the switch wheel will be set in the position shown by the outer circumference of the teeth in Fig. 41. The following will then take place: The bell crank 198 was struck and lifted out the pawl. The result is a step or an advance of the carriage from the subtraction position to the addition position for tens of thousands. During the said advance of the carriage, the tooth $z'$ will pass at 186 and, as it is in the middle position, it will again lift out the pawl.

The consequence will be a further advance or step of the carriage into the subtraction position for thousands value. At that moment $z^2$ will pass 186. A thousand will, therefore, be now subtracted once from the ten thousands which were previously insufficiently subtracted. The tooth $z^3$ would thereupon pass 186, another thousand would be subtracted, whereupon $z^4$ would pass at 186, which would bring about another step of the carriage, so that the stop tooth $z^5$ would stop the machine. The machine will have omitted one addition and one subtraction of 10,000. It will be assumed, however, that before any subtraction of thousands takes place, the calculator has already pressed the next multiplier number 8 for the hundreds. The consequence will be that at this moment the switch wheel will be in the position shown by the inner circumference of Fig. 43. In that position, the stop tooth will press the lever 347''' (Fig. 19) into the recesses of the disks 344 and 343 into the position shown in Fig. 56. The disk 343 will bring the bar 287 into the position as described in connection with Fig. 41, and as for the rest the position of the segments 369 and 367 will also remain the same as described in connection with Fig. 41; the stop 364 will allow the spindle 293 to rotate once and therefore the position of the levers $d$ to be transmitted to the levers $h$. If, however, the operator had already previously again depressed the key $T^8$, no rotation of the spindle 293 would have taken place in spite of it, as long as the stop tooth is not in the position shown in Fig. 43. In such previous positions, the stop tooth of the switch wheel will press one of the levers 347 into the disk 343, as shown in Fig. 55, whereby the said disk will press the slide 287 and, therefore, also the stop 364, so far to the right, that it will in any case strike the stop 303 (Fig. 5) and prevent the rotation of the spindle 293. As soon, however, as the switch wheel comes into the position shown in Figs. 43 and 56, the position of the levers $d$ may be transmitted to the switch wheel teeth, as already stated. Figs. 7 and 8 represent exactly the position of the levers $d$ at that moment. The bar 358 will, therefore, keep the levers $d$ pulled to the left. The resulting position of the teeth of the switch wheel is shown by the outer circumference of Fig. 43. The machine was about to subtract the first thousands, when the switch wheel adjustment took place. One thousand will now be subtracted. In consequence, the tooth $z'$ which is in the middle position will pass at 186 and disengage the pawl.

This results in an advance or step forward of the carriage. During that movement $z^2$ will pass at 186 and again lift out the pawl. Another advance or step of the carriage will take place, so that the carriage will now move into the position for subtracting hundreds. During that carriage movement $z^3$ will pass 186. A subtraction takes place, $z^4$ passing 186. A further subtraction takes place, $z^5$ passing 186 and lifting out the pawl. An advance or step of the carriage takes place, and it is brought into the addition position for the hundreds, and $z^6$ will engage in front of the stop 436 and stop the machine. Let it now be assumed that at that moment the operator depresses the key $T^3$ as the figure of the value of tens. As may be seen in Fig. 8, the following will then take place: Owing to the depression of $T^3$, as shown in Fig. 53, the lever $d^5$ will be raised, as already stated, into the highest position which will then be transmitted to the switch wheel to lower the position of a tooth, which is the stop position. All other levers $d$, with the exception of the constantly raised lever $d'$ and with the exception of the lever $d^0$, will remain in their lowest position, that is to say, in their position of rest. The lever $d^0$ will remain raised, because the plate 268 will remain in its left hand position of rest. In this position the pin 263 will remain pressed down in its slot guide 264, whereby also the segment 258 will be in any event in such a position that the lever $d^0$ will remain raised. The position of the stop pin of the switch wheel before the transmission is, as shown by the inner circumference in Fig. 44, the same position of rest as in Fig. 39. Like in the latter case the bar 368 will also be pushed to the right, so that the transmission of the lever $d^5$ on the lever $h^5$ will take place, so that the newly adjusted stop will be at $z^5$. The position of the switch wheel will be seen on the outer circumference of Fig. 44. The following will now take place: The lever $d^0$ has pressed the lever $a$ and thus lifted out the pawl 176. The carriage will make one step, whereby $z'$ will pass at 186 and during that time, as the tooth is in the middle position, it will again lift out the pawl. The consequence will be a further step of the carriage, which will bring it into the addition position for the tens. During that time $z^2$ will pass at 186. This will be followed by three additions, $z^3$ $z^4$ and $z^5$ successively passing at 186, the stop pin $z^5$ stopping the machine.

Let it be assumed that the unit place had been depressed by the operator at some prior moment. In any event no transmission to the switch wheel could take place until the switch wheel comes into the position shown in Fig. 45. The segments 367 and 369 push the stop 364 then to the right, when one of the keys $T^{6-9}$ is depressed. In other case, the segment 367 will be raised by the bar 376, and in that way connect the stop bar 363 to the bar 287 in such way that in any case the stop 364 will prevent a rotation of the spindle 293, if the bar 287 is not in its outermost left hand position. As already described, this will be the case only when the stop pin is in one of the two positions shown in Figs. 39, 40, 44, 45 or 59 and 58 respectively. The bar 358 will then be pushed to the left, Fig. 54 so that in the case shown in said figure, the position of the lever $d^5$ will be transmitted to $h^6$, and thence to $z^6$ so that the position of the teeth of the switch wheel will be the same as shown in Fig. 45. The adjustment or change of position of the switch wheel took place before the last addition of tens. During the last addition of tens, $z'$, in passing at 186, will lift out the pawl. A carriage step then takes place, causing $z^2$ to lift out the pawl. A further step of the carriage takes place in consequence of which the carriage will arrive in the position for the addition of units. During that step of the carriage, $z^3$ will have passed at 186. Three additions then take place, $z^4$, $z^5$ and $z^6$ passing 186, the stop tooth $z^6$ stopping the machine.

The following additions and subtractions have, therefore, taken place during the calculation:

|   | Additions. | Subtractions. |
|---|---|---|
| + | 1,000,000 | -------- |
| − | -------- | 100,000 |
| − | -------- | 100,000 |
| + | 100,000 | -------- |
| − | -------- | 10,000 |
| − | -------- | 1,000 |
| − | -------- | 100 |
| − | -------- | 100 |
| + | 10 | -------- |
| + | 10 | -------- |
| + | 10 | -------- |
| + | 1 | -------- |
| + | 1 | -------- |
| + | 1 | -------- |
|   | 1,100,033 | 211,200 |
|   | 211,200 |   |
|   | 888,833 |   | which is the correct product of the factors taken, namely once 888,833.

With the assistance of the example illustrated, an expert will be able to follow the action of a mechanism described in calculating other examples. It will be seen that a mechanism has been described which, whenever it is an advantage, automatically forms first an excessive product, and then reduces it, and always selects automatically the most advantageous way. It must also be specially pointed out that the machine according to this invention begins to calculate immediately after the setting of the first multiplier figure, and that the next multiplier figures can be set while the machine is doing the calculation with the preceding multiplier figure.

In the section "reversing" it was already described that in any position of the carriage the machine will make subtractions instead of additions, and additions instead of subtractions, if instead of the key 140 (Fig. 1), the key 141 is depressed. It will be clear that when a multiplicand is multiplied with a multiplier as already described, while the key 141 is depressed the final result of the multiplication will not appear added to the counting mechanism, as was just described, but will be subtracted from the counting mechanism, so that, if before the multiplication, a number has been set in the counting mechanism, it will appear reduced by the desired product. At the end of this section it is necessary to mention some other mechanisms which may be useful as safety devices. In well known manner, the simultaneous depression of two keys is prevented by a bar 436 which normally, under the influence of the action of a spring 437 is pulled to the right in Fig. 24. On the depression of any key $T^{0-9}$, the lower ends of the keys engage by their beveled ends 438 with recesses of the bar and push the latter in well known manner to the left, whereby the bar will be placed in front of the keys not depressed, and prevents the other keys from being depressed, as long as the key depressed has not returned to its original position, which, as is described, automatically takes place after the transmission of the various positions of the levers $d$ to the switch wheel by the compression or flattening out of the chain of triangularly arranged links 274, 275.

Another safety device prevents the main spindle 20 from beginning a new rotation, while a transmission to the switch wheel takes place. To that end, a lever 439 (Fig. 5) is pivotally mounted on a support 440 and engages, by one arm 441, with the surface of the disk 297. If the spindle 293 has started a revolution, the lever arm 441 will thus be raised, and on the other hand the oblique or cam projection 442 on the same lever will be lowered. This cam 442 will press back, by means of an arm 443, the bar 407 to such an extent that the stop 405 already described, will thereby bring about the disengagement of the main spindle 20 from the motor under any circumstances, that is to say, even if the said bar 407 is not pressed back by the stop 187 as otherwise may be the case.

As on the other hand it is advantageous that the spindle 293 should be unable to begin a rotation at the moment when the main spindle is near its position of rest, a third arm 444 of the lever 439 is provided, which at a given moment is pressed upward by a disk segment 445 mounted on the spindle 20. The other arm 441 of the lever will then be pressed downward, and force back the already described lever arm 309 and, therefore, also stop the spindle 293 by moving the stop 305.

*Zero positions.*—As already described, the carriage, obeying the action of its spring, is pressed to the right during each multiplication. When the multiplication is completed, the carriage is brought back to its original position shown in Fig. 1, in the following manner: A key 446 (Fig. 1) is provided near the keys T, and its depression brings about the return of the carriage to its original position. The mechanism connected to the key is shown in Figs. 1, 2 and 6. By means of a pin 447 (Fig. 6) engaging with a bifurcated end of a lever 448, the key 446 depresses the said lever 448 which, in its turn, raises a lever 449. The lever 449 strikes by means of a nose 450 against a lever 451 mounted in a pivotal manner on a spindle 452. The lever 451 transmits its movement by means of a pivoted link 453, to another lever 454 which is also mounted in a pivotal manner on a spindle 455.

The lever 454 is firmly secured by means of a bent arm 456 to a lever 457 arranged farther back, so that the movement of the lever 454 brings about also the movement of the lever 457. To the latter is pivoted a rod 458, the other end of which is pivoted to a rocking part 459. This rocking part 459 is pivotally mounted at 460 on the lever 213 and will, therefore, be turned by the lever 457 and 458 in such manner that the before specified groove 212 with which the said rotary part is provided, will assume a perfectly horizontal position, instead of an oblique one as shown in Fig. 6.

It was already described that sliding horizontally with the rod 42 there is a pin 211 that travels in the groove 212 so that in the position shown in Fig. 6, the whole lever arm 215 and the disk or wheel 203 which is moved thereby and is mounted on the switch wheel spindle 183, will be raised and lowered. By the change of position of the rotary part 459 the lever 215, and consequently the disk or wheel 203, will remain in its central position, so that a movement of the carriage or even a rotation of the main spindle will not affect the switch wheel.

By the depression of the key 446, the spindle 452 (Figs. 14 and 15) was however, turned, as described. On the rear end of the said spindle is mounted an arm 461 engaging by means of a pin 463 at its upper end with a grooved ring 462. On the said grooved ring 462 is mounted, on the spindle 178, an oscillating part 464 which is practically similar to the pawl 176 repeatedly described. It is, however, provided at its end with cam faces filed in such manner that the stops 179 and 180 when passing the said faces during the movement of the carriage, must swing the swinging part to and fro. The said swinging part 464 is generally in such a position that it can be forced back from its position only when the pawl 176 proper is pressed back, that is to say, when the pawl proper is passing over the corresponding stop 179 or 180. By the depression of the key 446, the swinging part 464 is pressed so far to the left in Fig. 14 that the stops 179 and 180 will press back the oscillating or swinging part 464 at the very moment that such a stop is about to engage with the claw 176 proper, that is to say, in other words, all the stops 179 and 180 are then simply inoperative.

As long therefore, as the pressure key 446 is held depressed in opposition to the pull of its spring 465, the carriage obeying the action of its spring, will be pulled to the right. Finally the carriage will then strike an arm or a pin 468 (Fig. 5) mounted on an arm 467 provided on a slide 469. The slide 469 is adjustably mounted (Figs. 2 and 5) by means of a slot and screws on a bar 470 extending through the whole box or casing of the machine. When the carriage actuates the arm 467, the latter connects the motor to the carriage in the following manner:—The arm 467 engages by means of a pin 472 with a grooved ring 473 adjustably mounted by means of a feather and groove on a spindle 474' (Figs. 2 and 5). The grooved ring 473 is provided with a driver arm 474 which will now coöperate with a driver 475, so that the following coupling will be brought about. As described, the wheel 397 is driven by the motor in the direction of the arrow. This rotation is transmitted by the coupling just described also to the spindle 474' and, therefore, to the wheel 476 secured to the said spindle and which carries said driver 475. The wheel 476 meshes with wheel 174 which carries a clock spring for pulling the carriage, the said clock spring generally pulling the carriage to the left. The wheel 174 will now drive in the well known manner the wheel 476, the spring being at the same time wound and therefore drive the spindle 123, but in the opposite direction to that in which they are driven when the carriage is being moved to the right, so that the carriage will now be brought by the groove 125 of the spindle 123 into its outermost left hand position. During that time, the carriage will return the slide 469 into its former position owing to the carriage striking an arm 479 at the left of the machine, whereby the motor is then again disconnected from the carriage. The motor will then be again exposed to the action of its spring, and when the pressure key 446 is released by the calculator the oscillating part 466 will have the tendency to return to its position of rest, since the spring 465 (Fig. 6) will force back all the parts under its influence. This can be effected, however, only as soon as the oscillating part 464, and therefore, also the pawl 176 are forced by one of the stops 180 into the position shown in Fig. 3, as a pin 480 mounted on the spindle 178, will not allow the lever 461 to pass to the right until owing to a corresponding swing of the pawl and consequently of the spindle 178, the pin is brought so far forward in Fig. 15 that the lever 461 with its arm 481 can pass in front of the pin, so that the carriage must always return to its original position, which is necessary for the proper working of the multiplication mechanism.

The pressure key cannot be depressed unless the stop of the switch wheel has forced back the bar 407. To that end, the end 483 is bent upward from the bar 407, and prevents the arm 484 from passing as long as no movement of the bar 407, due to the preceding multiplication, has taken place for the purpose of stopping the main spindle.

When the carriage arrives in its outermost left hand position, it can bring back to the zero position the series of keys 1 as well as the counting mechanism. In order to bring the series of keys to zero position, there is provided on the left hand wall of the casing or box a lever 484' (Figs. 1 and 9) provided with a stop 485. This stop when the carriage returns to the left, will press to the right the lever 486 which is pivotally supported on the carriage at 487. At the lower end, the lever 486 surrounds, by means of a fork, a pin 488 mounted on a bar 489 adjustably mounted on angle brackets 490 on the carriage wall 9 (Fig. 3). This bar strikes by means of pins 491 against the arms 492 mounted on the segments 8, so that the latter, in opposition to the action of the springs 10, are brought back to their position of rest, at the same time turning the spindle 11 in such manner that the angles 14 and the toothed wheel 17 will also come into the position of rest, and the figure wheel 11' will show the figure 0.

It must be pointed out that the teeth 5 of the locking bar 2 are provided at one side with oblique cam faces, so that they will lock the wheels 6 only in one direction, while the said wheels will remain movable in the direction opposite to that of the action of the spring. The lever 484 can be moved back at will by the calculator in such manner that the stop 485 lies outside the lever 486, in which case the keys will not be brought to the 0 position.

All the figure wheels 61 will be brought to the 0 position when the lever 492 (Fig. 4) is turned back by hand, which could also be done by the carriage if a pin provided for the purpose is inserted into a perforation 494 (Fig. 1) provided on the left hand side of the covering plate of the carriage. Such a pin will then strike the cam or oblique face of a lever 495 adjustably mounted in the machine, the front end 496 of which will then strike the lever 492 and likewise turn the latter.

Owing to the turning of the lever 492, the toothed wheel segment 497 mounted on the same, will rotate a pinion 498 secured to the spindle 63. The said spindle can be moved longitudinally in its bearings, and while it is rotating, this is effected by means of a grooved disk 500 (Fig. 11) with which engages a pin 501 secured to a block on the through bar 71. On the spindle are mounted pins 500' coöperating with pins 503 secured to the wheels 58 which, as described, drive the figure wheels. The pins and the grooved disk are arranged as described so that, on the spindle 63 rotating, the wheels 58 will be driven until all the wheels are in the zero position, whereupon the lever 492 is drawn back by the spring into the position of rest, and the figure wheels become again independent of each other and freely rotate, the pins 500 then moving away from the pins 503.

*Dividing.*—Division is effected in practically the same manner as described in my former Patent No. 809,075 and former application #270,054. The dividend is set in the counting mechanism, that is to say, on the figure wheels 61, and the divisor on the keys 1 of the carriage, whereupon the division key 505 is depressed (Figs. 1, 2 and 6). On the division key being depressed, it turns the triple lever pivoted at 506 on the wall of the casing, by pressing downward one of its arms 507 (Fig. 6). At the same time, the other arm 508 moves the carriage to the left by means of a pin 509. The pin 509 is secured to the sleeve 510, so that, as soon as the lever 508 has passed the pin 509, the carriage will be able to be locked at the left hand side at the first position of subtraction. With the lever 507 oscillates an arm 511 which, by means of the pivoted rod 512, raises a lever arm 513 secured to the spindle 455 and turns the latter. At the other end of the spindle 455 is mounted, as shown in Figs. 14 and 15, a lever 514 engaging by means of a pin with a grooved ring 515 provided with a driver 516 which will now be pushed into a corresponding recess of the sleeve 517 (Figs. 4 and 14) and as the grooved ring 515 is mounted on the pawl spindle 178 by means of a feather and groove, the sleeve 517 and the tooth wheel segment 518 secured to it, will be coupled to the spindle 178 of the pawl.

The toothed wheel segment 518 is driven from a toothed wheel segment 519 mounted on the tube or sleeve with a wheel 520 which can be rotated only when the highest figure wheel passes from 9 to 0 or from 0 to 9 also shown in Fig. 11. As a cam 521 of the lever 513 (Fig. 6) presses back the lever 454, whereby, as described, the switch wheel is disconnected from the other mechanism, the pawl will then be regulated depending upon whether the foremost figure wheel passes from 9 to 0, or from 0 to 9.

By the depression of the division key 505, the machine is at the same time brought into action, owing to the stop bar 407 being withdrawn, which is effected in the following manner: The stop bar 407 is coupled to the stop 187 not directly, but by means of a slotted segment 582 to the intermediate bar 407' so that, by the turning of the segment 582, independently of the position of the stop, the bar 507 can be moved.

On the segment 582 is mounted a link 522 connected to a double lever 523 (Fig. 15). The other end of the double lever 523 has formed in it a slot 524 into which projects a pin 525 mounted on the spindle 455, so that, owing to the rocking of the spindle 455, the bar 407 is also moved, and in that way the motor and the main spindle 20 are coupled in the described manner.

The division can now be automatically effected in well known manner by repeated subtraction and subsequent correction of the error. Means must be now provided for showing the correct quotient. This will be discussed in the next section which deals with the printing of the problem set.

*Printing.*—The problems set and the results obtained are printed in the machine according to this invention, in the manner described in the subsequent sections.

*Printing of the quotient.*—In order to print the quotient, it is necessary to print at each place a figure or number corresponding to the number of subtractions made by the machine at the corresponding place. As the machine according to this invention always subtracts too much, and subsequently corrects the error by one addition of the divisor, the revolutions of the main spindle must be counted for the proper printing of the quotient in such manner that each subtraction is counted in a positive, and each addition in a negative manner.

As already stated, the spindle 91 (Figs. 3 and 11) is controlled, for the purpose of carrying the tens, in such manner that the toothed segments 95 mounted on the spindle, can rotate the toothed wheels 82 forward or backward to the extent of one tooth according as an addition or a substraction is to be made. A wheel 526 corresponding to the said wheels 82 (Fig. 4) is mounted in a freely rotatable manner on its spindle 91, and one of the toothed wheel segments 95 situated opposite the same, will rotate this wheel at each addition or substraction to the extent of one tooth in one or in the other direction.

The movement of the toothed wheel 526 is rendered positive owing to a detent 527 mounted on an arm 528, locking the toothed wheel when the spindle 91 (Fig. 3) together with the toothed segment 95, is swung back, as described, as the arm 528 is mounted on the lever 86 which swings back with the spindle 91. This positive movement of the wheel 526 is transmitted by the sleeve 529 to which the wheel 526 is secured, to a grooved ring 530 (Figs. 11 and 13). The grooved ring 530 transmits its movement to the wheel 531 which will be driven by means of its driver 532 by one of the ten driver pins 533 of the grooved disk 530. The rotation of the wheel 531 is transmitted by means of the wheel 534 to a toothed wheel 535 secured to a spindle 536 (Figs. 4 and 12). On the said spindle 536 is adjustably mounted by means of feather and groove a toothed wheel 537, so that it will transmit the rotation of the spindle to a toothed wheel 538, the movements of which are transmitted to a counting mechanism Q (Figs. 1, 2 and 12) in a manner hereinafter described.

As already stated, the grooved ring 530 is not secured to its spindle 529, but is adjustably mounted on it by means of a feather and groove (Fig. 13). During the movement of the carriage, the grooved ring 530 will be thrown in and out of gear in the following manner: The wheel 174 (Fig. 5) which is also moved in a described manner during a movement of the carriage, transmits its movement to a wheel 539 which, in its turn, drives a wheel 540 transmitting its rotation to a spindle 543 by means of two toothed wheels 541, 542. The said spindle 543 is mounted in a suitable bearing on the through bar 71 and is provided at its other end with a disk 544 formed in an irregular worm (Figs. 2, 3, 33 and 34). This worm disk 544 engages between pins 546 of a slide 547. The said slide 547 is guided by slots and screws secured to the bar 71, and carries at its left end (Fig. 12) a tooth rack 548 which rotates a toothed wheel 549 secured to the spindle 550. The said spindle 550 projects through the bar 71 and carries at its front ends a wheel 551 (Fig. 13) which oscillates, by means of its teeth, an anchor 552 about its bearing 553, as the pins 554 and 555 of the anchor are alternately pushed away by the teeth of the wheel 551. To one arm of the anchor is pivoted a lever 556 adjustably guided by means of a screw 557 in a slot and reciprocating by means of a pin 558, the grooved ring 530.

The rate of transmission is calculated in such manner that when additions or subtractions take place, the grooved disk 530 is always in engagement with the toothed wheel 531 and drives it. It remains in engagement while the carriage is traveling from the point of engagement of the wheels 55 to the point of engagement of the wheels 54 of the same place value, as would be the case in Fig. 1 in case of one step to the left. When, however, the place value is changed by a step of the carriage, or rather during the said step, the wheel 531 will be released from the positive position by the grooved ring. The wheel 531 will then engage, as is well known, with the wheel 537 on which is mounted a wheel 559 (Fig. 4) engaging with a toothed wheel segment 560. The said toothed wheel will, therefore, also be rotated by the grooved ring 530 during the rotation of the wheel 531. The toothed wheel segment 560 is, however, provided with a stamped out recess 561, into which projects a pin 562 secured to a lever 563 pivoted at 564 and always pulled downward by a powerful spring 565. The pin 562 will, therefore, always have the tendency to pass into its lowest position shown in Fig. 4, and will always bring the toothed wheel segment 560 back to its original position as soon as the toothed wheel 531 has been uncoupled. Accordingly, all the wheels 559, 534, 535, 537 and 538 which are in engagement, will be always brought back to their original position, so that the final result will be that the spindle 536 during the calculating by the machine at one place value, will be first oscillated forward to an extent corresponding to the number of the revolutions of the main spindle, and while the carriage changes the place value it will be again swung back.

As will be described later on, either the forward or the backward movement of the spindle 536 to the extent of 1, 2, 3, etc., teeth, can be expressed at will by addition to a complete counting mechanism (Figs. 1 and 2) the figure wheels of which will then be turned to the extent of 1, 2, 3, etc., teeth, in such manner that at the end of the calculation, the quotient, and in case of multiplication, the factor, set on the keys T, will be recorded on the counting mechanism Q. It will be at once obvious that such a counting mechanism, which is provided with a simple device for carrying tens, must correctly express the factor set; for the spindle 91, the movements of which are counted in the last place by the counting mechanism Q, will move differently when additions and subtractions are made. If, for instance, it is desired to multiply by three, the three movements of the spindle 91 will finally result in a movement to the number 3, of a figure wheel of the counting mechanism and when, on the other hand, it is desired to multiply by eight, which in the present machine is done by the addition of ten and the subtraction of eight, this will also be correctly expressed by the counting mechanism, as then the tens figure wheel of the counting mechanism will be rotated in advance to the extent of one, as subsequently described, and the unit figure wheel will be rotated back to the extent of two, the simple device for carrying the tens of the counting mechanism, subsequently described, bringing about the appearance of 10 — 2, that is to say, 8, on the counting mechanism. As such transmissions to a counting mechanism can be effected in any desired manner, and as such counting mechanisms and transmissions can be utilized for any other purposes in the present machine, as will now be described, the description of the said counting mechanism is given only at the end. The quotient appearing in the counting mechanism can be read, but in the present machine provision is made for printing it on a piece of paper or the like, in a manner also subsequently described.

*Printing of the product and of the factor set on the setting mechanism.*—It was described in the previous section how during the movement of the carriage to the right, a spindle was oscillated to and fro, in accordance with the figures of the quotient, in such manner that the said movement was adapted to bring about the printing of the quotient or factor. The result appearing in the figure wheels 61, as well as the factor set on the carriage, will be printed owing to spindles being oscillated to and fro in a similar manner during the return of the carriage to the left, to its position of rest, according to the figures which are set on the counting mechanism or on the setting mechanism. This is done in the following manner: To the figure wheels 61 are attached two step disks 66 and 67 which, according to the position of the figure wheel at 0, 1, 2, 3, etc., will occupy such a position that two small slides 566 and 567 arranged one opposite each of the said step disks 66 and 67 (Figs. 2, 3 and 11), can be moved to the left in Fig. 3 to a different extent, that is to say, the slide 567 will be moved to the left to a less extent the greater the figure shown on the corresponding figure wheel, while conversely, the slide 566 will be moved farther to the left and to a greater extent the greater the figure shown on the corresponding figure wheel. At the figure 0, the slide 567 will not be moved to the left at all, while the slide 566 can be moved nine steps to the left, while at the figure or number 9 the converse will apply to both slides.

The slides 566 and 567 are mounted on a through bar 470 in which they are placed in correspondingly made slots. The slides are provided with upward pins 568 coöperating with oblique or cam faces of the long slide 469, so that when the said slide is in the left hand position, the small slides 566 and 567 will press forward, so that they will not interfere with the rotations of the figure wheels 61. If the slide 469 is, however, in the position shown in Fig. 2, into which it is moved, as described, when the carriage has come entirely to the right after the depression of the key 446, in order to return back to its original position to the left, the slides 566 and 567 can be pushed against the step disks 66 and 67.

On the left of the carriage is mounted a slide 571 guided in the plates 9 and 118 and having its rear end 572 terminating in a wide wedge as shown in Fig. 38. A second slide 573 is mounted below the same in the wall of the carriage. Both the slides are provided with rack-teeth cut on them, and engaging with a toothed wheel 574 secured to an angle bracket on the wall 118 of the carriage. The slide 573 carries, as shown in Fig. 38, a wedge 575 which, however, is not fixed, but is pivotally mounted on the same about a pivot 576. A stop 577 and a spring 578 cause the wedge to remain inoperative during the movement of the carriage to the right, while during the movement to the left it will have the tendency to press back the slide 567.

As will be seen from Fig. 3, the wedge 572 will coöperate with the slide 566, while the wedge 575 will coöperate with the slide 567, and the slides and the wedge surfaces are arranged in such manner that, during the movement of the carriage to the left, the bar 571 will be positively forced back to an extent corresponding to the figure shown by the figure wheel opposite which it is situated, and during the movement of the carriage to the left, the slide will successively come into engagement with one figure wheel after another, and become adjusted to suit the different figure wheels.

The movement of the slide 571 is transmitted by means of its fork 579 to a bar 580 which is mounted between the levers 581 in an oscillating manner, so that the spindle 582 will be rocked to and fro (Fig. 3). On the right hand end of the spindle 582 is mounted an arm 583 (Fig. 5) which will move a rod 584 adjustably mounted on the right hand key wall. This rod is provided at the rear with a tooth rack 585 engaging with a toothed wheel 586 (Figs. 70 and 71) secured to a tube or sleeve 587 freely rotatable on a spindle 588.

As the rod 584 is being constantly pulled by a spring 589 into its position of rest on the left of Fig. 5, it will be clear that the rod 571 and, as already described, the tube 587 will be successively forced forward and backward during the return of the carriage, in accordance with the different figures of the single place values. It is also clear that the same effect could be obtained with only one slide, and the slide 587 or 573 is merely provided for the purpose of rendering the movement positive.

In the manner described and during the return of the carriage, the position of the figure wheels 61 thus moves the tube 587 to and fro, and the spindle 588 will also be moved to and fro but in a different manner, according to the figure which is set on the keys 1. As described, the spindle 11 will rotate in a different manner in accordance with the setting of the keys 1, whereby the figure wheels 11' will set different figures in front of their windows.

To the spindle 11 are secured two step disks 590 and 591, and two slides 592 and 593 are adjustably mounted on the plate 9 of the carriage (Fig. 9) and can be pressed by the two cam faces 594 and 595 of two slides 596 and 597 against the step disks during the movement of the carriage.

The whole mechanism is practically the same as before described. The two slides 596 and 597 engage on the right and on the left by means of their tooth racks, with a toothed wheel 598 and move the latter differently in accordance with the different positions of the figure wheels 11'.

By means of the toothed wheel 599 secured to the same spindle as 598, the movement in question is transmitted to a tooth rack 600 and from the latter, by means of the tooth rack 601 secured to its right hand end (Figs. 2 and 5), to a toothed wheel segment 602, and from the same to a tooth rack 603 secured to a slide 604 provided at the rear end with a tooth rack 605 engaging with a toothed wheel 606 secured to the right hand end of the through spindle 588 (Figs. 70 and 71), so that finally, during the movement of the carriage, the spindle 588 will be moved to and fro in a different manner in accordance with the number set on the keys 1.

The spindles 588 and 536 are not fixed in the box or casing of the machine, but mounted on arms 607 (Fig. 5) which are all secured to a spindle 608 and always pulled to the right of Fig. 3 by means of a spring 609. The two spindles with the printing wheels and counting mechanisms which will be now described, will be swung rearward for the purpose of printing during the return of the carriage to the left to its original position as the carriage passes from one place value to another, and at the moment when the different parts 572 and 573 or 594 and 595 are exactly opposite the slides. This movement is effected by means of a tooth 610 (Fig. 70) which is mounted on the toothed wheel 540 rotating during the movement of the carriage and striking from below an arm 611 mounted on a lever 612 (Fig. 5) freely pivoted on the spindle 608. In this way, the lever 612 will be swung forward and engage with its two detents 614 and 615 with the two toothed wheels 586 and 616. These two toothed wheels, secured to the spindles 536 or 588, are thus locked, and the two spindles are thus swung forward. It must be pointed out that during the said preliminary movements, the two tooth racks 605 and 585 are disengaged from the two toothed wheels 606 and 586. These two tooth racks are not fixed on the slides 604 and 584, but pivoted at 617 and are generally held down in engagement by means of a spring 618. Under the two tooth racks 605 and 585 are arranged two identical levers 619, Figs. 68, 70 and 71, rotatably mounted on the wall of the casing or box and resting with their front ends 630 on a cam face on the upper end of the lever 612, so that the lever 619 and the tooth racks 605 and 585 can be raised when the printing is to be effected (Figs. 1, 2, 5 and 68).

The mechanisms hitherto described show clearly that the three series of figures of the machine will be expressed during the movement of the carriage, by the spindles 536 and 588, as well as the tube 587, being successively rotated forward and backward to a different extent, according to the value of the figures which are to be expressed in each place.

The printing apparatus will now be described with reference to the drawings, namely to Figs. 12, 26, 27, 28–31. As already described, there is secured to the bar 71 a slide 547 which, during the forward and backward movement of the carriage, is also pushed forward and backward. On the said bar 547 are mounted two brackets 621 (Figs. 1, 2, 12, 30 and 32). These brackets are secured in their position on the bar 547 by pins 622, and said bar may be provided with any desired number of holes, so as to enable the brackets in question to be adjusted at will. Each such bracket carries an arm 624 which surrounds a grooved ring of a printing wheel 623, so that the latter must move with the bracket when the slide 547 is moved. The printing wheels are adjustably mounted on the tube 587 by means of a feather and groove.

As before described, the tube 587 is moved to a different extent, depending upon the figures shown by the figure wheels 61, so that during the return of the carriage, the printing wheel 623 will be successively set in accordance with the different figures of the counting mechanism, and as at each place value, there takes place, as described, a forward swinging of the spindles 588 and 536, each of the printing wheels 623 will successively print the figures set on the figure wheels 61, the printing wheels being moved by their bar 547 in such manner that the printing will take place at the proper place values, so that it will be clear that the number expressed by the counting mechanism is printed, and if two printing wheels 623, as shown in Fig. 2, are used the printing will be in duplicate, if so desired.

The printing of the number set on the keys 1 is effected by means of a printing wheel 627 (Figs. 1 and 2) which is held by means of an arm 628 engaging a grooved disk on said wheel and can be reciprocated by the latter on the spindle 588. The arm 628 is on a block 629 mounted on an arm 630, extending from a tooth rack 631.

The tooth rack in question is slidably guided on the bar 71 by a slot and screws. The tooth rack 631 is driven by the toothed wheel 549 which, as described, receives its rotation from the tooth rack 548 which is mounted on the bar 547, so that the tooth rack 631 will move in opposition to the bar 547 (Fig. 12).

The consequence will be that, on the return of the carriage to the left, the printing wheel 627 will be moved in opposite direction, from left to right in contradistinction to printing wheels 623 which move from right to left, and accordingly the printing wheel 627 will print the various figures beginning with the highest place value, which is necessary because during the return of the carriage the highest place value of the keys 1 will first act on the wedge surfaces 594 and 595 and therefore, on the spindle 588 and the printing wheel 627. It will thus be clear that during the return of the carriage, the number set on the keys, will be properly printed.

*Printing of quotients and sums.*—The movements of the different printing spindles are utilized in the present machine also for summing up in the counting mechanism the number set or printed by the printing wheels, so that the respective counting mechanisms indicate the sum of a series of factors, or products, or quotients, or divisors, etc. It must also be pointed out that all the printing spindles uniformly oscillate to and fro, and the printing wheels must be all moved by the bar 547 or 631 in accordance with the different place values.

It will, therefore, be sufficient to describe a counting gear suitable for summing up these movements, in order to show clearly that such a counting mechanism can be connected to each of the printing spindles, and that, as already described and shown in connection with tube 587 in common with both PI, PII, two or more counting mechanisms could be arranged at will for a single printing wheel, independently of each other. Such a counting mechanism is shown in Figs. 26–32. Any desired number of figure wheels 632 are mounted in a freely rotatable manner on the printing spindle or on the printing tube 587 in question (Fig. 31) and inclosed in casings 633. From the back wall of the casing 633 plates 634 project between each two figure wheels, the said plates being bent, if desired, in such manner that they rest in recesses 635 of the figure wheels in a springy manner and hold the latter in their position.

The figure wheels are hollow, and have screwed to their left hand sides a spring arm 636 which is shown in Fig. 28 on an enlarged scale. The arm 636 has at the top a cam face 637, and the plates 634 projecting between the figure wheels, can press the arm 636 to the left by means of the cam faces in question, as soon as such an arm 636 passes a plate 634 during the rotation of the figure wheel. This will be the case when a figure wheel passes from 9 to 0 or from 0 to 9, that is to say, when a carriage of tens is to be effected. A pin 638 of the arm 636 will then engage with one of the corresponding recesses 639 of the figure wheel of the higher value, so that the latter will rotate with the figure wheel of the lower value to the extent of one figure.

It is obvious that when the figure wheels of these counting mechanisms are driven singly, as will be described subsequently, they can correctly sum up the rotations. At the side of the figure wheels are teeth 640 with which can engage the teeth of a toothed wheel 641 arranged underneath. For each figure wheel there is provided one toothed wheel 641, and the toothed wheels, are all fixed on one and the same sleeve 641', Fig. 31, through which passes the spindle 536, without, however, driving the toothed wheels in question. These toothed wheels 641 will be rotated once only when the calculator depresses the zero setting button 642 in opposition to the pressure of its spring 646 and again release the same. Then the tooth rack 643, carrying the button, will once rotate the toothed wheel 644 and all the wheels 641 on the sleeve 541', and owing to the action of the spring 646, the rack will then turn the same back again into the position shown in Fig. 26.

As one of the teeth of the wheels 641 and one tooth 640 of the figure wheels are omitted at the places which are opposite each other at the zero position of the two wheels, as shown in Fig. 26, each figure wheel will participate in well known manner in the rotation of the wheels 641, until it comes to zero in which position it will be left standing.

The printing spindles or the printing wheels turn the single figure wheels of the counting gears in the following manner: The brackets 621 are provided with levers or arms 646 as shown in Figs. 29 and 32 surrounding a grooved ring 647 into which is inserted a bar 648 situated in a groove of the printing bar or of the printing tube or sleeve 587, so that the bar 648 is rotated and moved longitudinally with the printing wheel. At the one end the bar 648 projects by means of a driver pin 649 into one of the recesses 650 provided in the wall of the figure wheels.

The driver 649 can be situated either in a figure wheel, in which case it will drive said figure wheel, or between two figure wheels, in which case no figure wheel will be driven. The bar 547, and therefore, all the printing wheels and all the drivers 649 move from one place value to the other in two half steps as described in such manner that a half step of the printing wheels is effected before any of the printing spindles are rotated, and the second half step takes place after the rotation, and before the return rotation of the printing spindles into their position of rest.

It will now be clear that when the driver 649 is placed into a position relatively to the counting gear as shown in Fig. 31, it will drive the first figure wheel 636 immediately after the first half step and thus transmit the forward turning of the printing spindle to the counting mechanism. If the bar 648 with its driver 649 is placed slightly to the left beyond the position shown in Fig. 31, so that it will drive the first figure wheel only after the second half step, it will not be rotated forward by the printing spindles, but the rotation backward will be transmitted to the counting mechanism, that is to say, the number printed by the printing wheel will be subtracted from the counting gear instead of being added to the same.

If, on the contrary, the bar 648 is placed into a position between the addition and the subtraction positions, the driver 649 will be in engagement with the figure wheel after the first and also after the second step, although it will only be a partial engagement and it will turn the figure wheels both forward and also backward, that is to say neither an addition nor a subtraction will take place.

Of course the driver-bar 648 could be made of such dimensions that in the middle position it would not come into engagement with the figure wheels either after the first or after the second step, but would always remain between each two figure wheels, and in this manner the result would also be that in the middle position there would be neither an addition nor a subtraction of the number printed by the printing wheels on the corresponding counting gear.

The position of the driver 649, or of the bar 648, of the grooved ring 647 and of the fork 646 can be controlled by the calculator by shifting a lever 650 as follows: The lever 650 is mounted on a screw spindle 651 screwed into the correspondingly threaded bracket 621, and its right hand end with respect to Fig. 29 carries the arm 646 which in turn carries guiding pins 652 sliding in said bracket and in which arm 646 the spindle 651 is rotatably but not slidably arranged. The position of the lever 650 is insured by a spring 653 and recesses 654 into which the spring projects.

The different positions of the lever 650 result in different types being printed according to its position. When during a calculation a bracket with its printing wheel has come quite near to the casing of the counting mechanism, a pin 655 located on a lever 656, carried by the spindle 651 will according to the position of the lever 650, that is to say, according as to whether addition or subtraction is to be performed, push forward either the slide 657 or the slide 658 mounted. These slides are provided at their rear ends with cam faces 657' and 658' against which the pin 655 presses, thus bringing about the advance of one of the slides. These slides carry at their front ends at 657'' and 658'' corresponding type, for instance a+ and a− signs, by means of which they indicate at each number printed by the printing wheel, whether it has been added to the counting mechanism, or subtracted from the same. A suitable printing type 661' will also indicate by printing a corresponding sign, for instance an "N," when a counting mechanism has been set to C. See Fig. 27. When the zero setting key 642 is depressed, a pin 659 on the tooth rack 643 will press to the left a lever 660 mounted in a pivotal manner inside the casing of the counting mechanism, and the front arm 645 of the said lever can push out a lever 661 in opposition to the pressure of a spring 662. The lever 661 is mounted by means of a screw 663 on the inner wall of the casing, and on the same screw there is also mounted a lever 664 which, by means of a catch 665, will hold the lever 660 to the right, because a pin 666 of the said lever will be engaged by the catch 665 and held back until the arm of the lever 664 projecting rearward from the counting mechanism casing is depressed.

An arm 667 projecting downward from the bracket 621 (Fig. 30) will effect this depression at the moment in which, during the calculation, the bracket is brought against the counting mechanism casing. The consequence will be that in that counting mechanism in which the zero setter has been operated, a corresponding printing type will print owing to the arm 660 under the actuation of its spring 668, forcing back the lever 661 carrying the printing type.

One or more counting gears or mechanisms arranged in any desired manner on the right and on the left hand sides, similar to that described, may therefore be connected to each of the printing wheels 623 and 627 and cause the numbers printed by the said printing wheels to be added or subtracted at will in the counting mechanism.

As has been shown, in accordance with the factors or the quotients set on the keys T, the spindle 536 (Fig. 12) will be rocked and this rocking is transmitted by means of the toothed wheels 537 and 538 to the tube or sleeve 669, so that, in this instance, the non-printing toothed wheel 538 with its tube 669 will be rocked to a corresponding extent instead of the printing wheels already described.

The toothed wheel 538, as well as the toothed wheel 537 will also be moved by means of grooved rings by the arms 671 of the bracket 672, Fig. 2, in the same way as the printing wheels were moved, and the concomitant parts of block 672 are exactly the same as those already described including the setting lever 650, so that the rocking of the wheel 538 is transmitted to the quotient counting gear Q either for addition or for subtraction. This quotient counting mechanism differs from the other counting mechanism only in the fact that, after each calculation is completed, it is automatically brought to zero after the number set has been automatically printed each time. When the bracket 672 comes quite close to the counting mechanism Q a cam surface 674 of the said bracket raises a lever 675 (Figs. 12 and 26). The said lever 675 is pivotally mounted on the left hand wall of the quotient counting mechanism, and has suspended to it a shield 675′ shown in Fig. 30 which will hang normally between the ink ribbon and the paper, and prevent the numbers of the counting mechanism from being printed. As soon, however, as the cam surface 674 oscillates the lever 675, the shield will be sufficiently lowered in order to enable the printing to be effected at that moment. The lever 675 is always withdrawn to its position of rest by means of a suitable spring.

The counting mechanism Q is each time automatically brought back to zero in the following manner: On the tooth rack 643 of the casing Q is mounted an arm 676 projecting out through a slot of the casing. The end of the arm 676 is surrounded by the bifurcated end of a three-armed lever 677 rotatably mounted on the back of the casing and always pulled by a spring 678 into the position shown in Fig. 12.

On the slide 547 is mounted a hooked arm 679, (Fig. 26) the lower end 680 of which, during the movement of the bar to the right in Fig. 12, will finally arrive behind the oscillating arm 681 of the lever 677, so that, during the return of the bar, the arm will be caused to participate in the movement, until it strikes the cam face 682 secured to the casing Q, when the arm 681 will be pressed outward to such an extent as to be out of reach of the arm 680, and the lever 677 and, therefore, also the zero setting tooth rack, will again come back to their position of rest under the action of the spring 678.

The numbers of the quotient will, therefore, be indicated in the quotient counting gear Q during the movement of the carriage to the right, while during the return of the carriage, the quotient counting mechanism will be returned to zero in the manner described.

The rotation of the spindle 536, in addition to being transmitted to the quotient counting gear can also be transmitted to one of the product counting mechanism PI and PII by the following device: On the right hand end of the spindle 536 is mounted a toothed wheel 616 (Fig. 71) transmitting the rotation of the spindle 536 to a toothed wheel 683 provided with a driver pin 684 by means of which it can engage with the tooth gap of the wheel 586 and drive the latter, as soon as it is pulled to the right. This can be effected by a movement to the right of the lever 686 which engages by means of a pin with a grooved ring provided on the toothed wheel 683, and, therefore, moves the latter. At the same time a pin 687 of the lever 686, Figs. 5, 70 and 71 projecting backward, will press against the wedge surface 620 provided at the front end of the lever 619, and in that way will force the latter lever upward and thus disengage the tooth rack 605 above it, from the toothed wheel 586.

The result will be that the wheel 586 will receive its rotation from the wheel 616 of the spindle 536 instead of from the tooth rack, so that the printing wheels and counting mechanism mounted on the tube 587, will print and add the quotient or one factor. The numbers set in the counting mechanism will not be normally printed, this being prevented by shields which, as already stated, always move between the paper and the ink ribbon.

In the counting mechanism F, as well as PI and PII, the shields will not be pushed back automatically, but the operator will push back a lever 638 (Figs. 20 and 30) to which are suspended the shields, so that they will be moved downward away from the counting mechanisms. For the purpose of printing the sums of the counting mechanism, the crank 689 secured to the spindle 608, Fig. 12, will be moved forward, and in that way the wheel printing mechanisms will be swung forward against the paper carriage. The paper carriage is not shown, for as a rule the machine according to this invention, will be placed next to a typewriting machine with a long platen as shown in Fig. 37, so that the printing mechanisms can then print directly on the platen of the typewriting machine, and, therefore, any desired text can be written in invoicing.

The method of operating will be, that first the text will be simply written down, and then the platen shifted to the right, whereupon the platen can receive the printing from the mechanisms of the calculating machine at which time the platen need not move, as in calculating machines according to this invention the printing mechanisms receive the necessary movements.

If instead of the typewriting machine shown in Fig. 37, it were desired to use a machine with visible writing, or any other machine in which the printing is effected at the top of the platen, the counting mechanisms and the printing wheels can be easily reserved or changed, as shown in Fig. 36, in which can be seen the paper carriage 691 of a typewriter, and the other mechanisms may be recognized at once by their numbers. Such and other modifications are of course possible and do not constitute separate inventions. Thus, for instance, it would be advantageous, instead of moving the printing wheels against the paper, to move the paper in well known manner by means of hammers against the printing wheels.

The present machine has also a mechanism which is of great advantage in many calculations. If the lever 692 (Fig. 1) projecting from the carriage covering plate, is pressed forward, the other arm 693 of the said lever 692 (Fig. 4) will thereby be oscillated about its pivots 694, so that a bar 695 (Figs. 3 and 9) pivoted on its lower end, will be pressed to the right. The said bar passes entirely through the carriage. The bar 695 engages at the top with grooved rings secured to the locking wheels 6 (Fig. 3) which, as described, are generally held locked by the bar 5. The movement of the bar 695 to the right disengages the toothed wheels 6 from the locking teeth 5, so that the spindles 11 are rotated by springs 10 (Fig. 9), as described. The movement of the bar to the right brings, however, the toothed wheels 6 into engagement with toothed wheels 697 secured to the spindle 18, so that the springs 10 will now have the tendency to rotate the spindle 18, and at the same time, owing to the wheels 54 and 58, the figure wheels 61 will be caused to participate in the rotation, and the arrangement is such that the figure wheels 61 will be turned from any of their positions toward zero and at the same time must stop the spindle 11, for as is well known, they cannot move from 0 to 9 in the position of rest of the main spindle 20. In this way the spindles 11 and 18 will, therefore, be rotated to an extent depending on the number set in the figure wheels 61, and the arrangement is such that when the operator pushes back the lever 692 into its position of rest, the spindles 11 will have turned to such an extent that the figure wheels 11' will show the numbers which were formerly set on the figure wheels 61, so that for instance a product will now appear automatically set as a divisor.

It must also be pointed out that the carriage, as shown in the drawings, will move only past the first nine figure wheels with its lever 571 transmitting the printing movement. If it is desired to print and to add all the sixteen figures of the counting mechanism, it would be necessary either to make the machine casing or box so long that it should be possible to move the carriage entirely to the right, or a repetition of the levers 571 and 573 etc. could be provided at the right hand side of the carriage, so that starting from the said levers, the figures at the right of the counting mechanism could be printed and added by means of a separate printing wheel.

It may perhaps be desirable when shifting the carriage, to disengage the toothed wheels 54 and 55 from the toothed wheel 58. To that end, the bevel wheels 51 (Fig. 3) could be slidably mounted on the spindle 18 by means of a feather and groove and the spindle 56 mounted in an adjustable manner in slots in suitable bearings 57. The spindle 56 would have to be provided with a clutching part 698 which would drive the bevel wheel 51 on the spindle being shifted. On the carriage wall 118 would have to be provided a pivot 699 on which is mounted a double-armed lever 700 which can advance and withdraw the spindle 56 by means of arm 701.

Normally the spindle 698 will be pulled back out of engagement by means of a suitable spring. When, however, the tooth racks 28 are raised, a stop 702 of the first tooth rack, will raise the lever 700 and thus bring the spindle 56 into the position of engagement. This mechanism may be desirable but it is not absolutely essential. It may also be found desirable to raise the division button 505 automatically back to its position of rest, as soon as the carriage, after the completion of a division, nearly arrives to the left. If the button 505 (Fig. 6) is depressed, it raises, as described, the lever 512 in opposition to the action of the spring 703, and the lever arm 507 will be held fast in the depressed position by a locking detent 704. As soon, however, as the carriage reaches its left hand position, the pin 509 will disengage the locking pawl 704 by moving it to the left, whereby the division key and the whole division mechanism will spring back to their position of rest.

It is clear that the mechanisms described can be used for making all possible calculations in various combinations, and for printing problems and results. Additions are simply multiplications by 1, subtractions are multiplications by 1 with a simultaneous depression of the minus key 141 (Figs. 1 and 6).

For the purpose of carrying out additions, subtractions and multiplications, one number is, therefore, set on the keys of the carriage 1, and thereupon the second factor on the key 1 in the series of keys T is depressed. If, thereupon the key 446 is depressed, the problems set, as well as the result appearing on the figure wheels 61 will be printed, and added to or subtracted in any desired manner from the figures on the counting mechanisms F, Q, PI and PII.

When making divisions, the dividend is set on the figure wheels 61, and the divisor on the keys 1, whereupon the machine automatically carries out the division, and after the depression of the key 446, prints it and adds and subtracts in any desired manner on the printing and counting mechanisms. The figure wheels 61 and the number set on the keys 1 can be set to zero at will automatically, and a result appearing on the figure wheels 61 can be automatically transferred to the setting mechanism. The quotient can be deducted from a formerly calculated product, or added to the same, etc.

It is specially to be noted that in the machine according to this invention, the figure wheels, unlike all constructions hitherto known, are not suddenly driven with full speed, but the tooth racks 28 and all other driving mechanisms bring about a gradual starting of the figure wheels, and also a slow stopping of their movement, an advantage the importance of which will be at once obvious to any engineer.

What I claim is:

1. In a calculating machine, the combination with means for setting up a multiplier, and means for setting up a multiplicand, of means to perform additions and subtractions, and means to select a suitable combination of additions and subtractions instead of the multiplier set up.

2. In a calculating machine, the combination with means for setting up a dividend, of means for setting up a divisor, means adapted to perform the operation of division, a paper carriage, means to print the result of the division upon a paper arranged on the paper carriage, means arranged in working relationship to the paper carriage to print the divisor and the dividend thereof, and letter printing mechanism arranged also in working relationship to the paper carriage.

3. In a calculating machine, the combination with means for setting up a multiplicand, of registering devices, means to add the multiplicand set up to said registering devices, means to change the position of the multiplicand relative to said registering devices to different denominations, a set of keys for setting up the multiplier and means actuated by said keys for causing primarily a change to a lower denomination followed by a number of additions or subtractions in accordance with the multiplier key set.

4. In a calculating machine, the combination with means for setting up a multiplier, of means for setting up a multiplicand, registering means and operating means for the same to add to or subtract the multiplicand from them, a slidable carriage, one of said means, that is the means for setting up a multiplier and means for setting up a multiplicand, being mounted upon said carriage, a spring or weight for drawing said carriage during a calculation out of its initial position to different digit places, a motor, and means driven by said motor to return said carriage to its initial position in opposition to the traction of said carriage spring or weight.

5. In a calculating machine, the combination with means for setting up a multiplier in the machine and for printing said multiplier by a single operation of the operator, of means for adjusting a multiplicand, means adapted to perform the multiplication and to register the result thereof comprising operating means and also registering means, one of which means is bodily movable relatively to the other and said operating means being adapted to simultaneously transfer two or more digits to said registering means, typewriting mechanism including a paper carriage and means to shift the paper carriage sidewise opposite the printing means for the multiplier.

6. In a calculating machine, the combination with means for setting up a multiplier, of means for adjusting a multiplicand in the machine and for printing said multiplicand by a single operation of the operator, means adapted to perform the multiplication and to register the result thereof, comprising operating means and also registering means, one of which means is bodily movable relatively to the other and said operating means being adapted to simultaneously transfer two or more digits to said registering means, and typewriting mechanism including a paper carriage and means to shift the paper carriage sidewise opposite the printing means for the multiplicand.

7. In a calculating machine, the combination with means for setting up a multiplier, of means for adjusting a multiplicand, means adapted to perform the multiplication and to register and print the result thereof comprising operating means and also registering means, one of which means is bodily movable relatively to the other and said operating means being adapted to simultaneously transfer two or more digits to said registering means, and typewriting mechanism including a paper carriage and means to shift the paper carriage sidewise opposite the printing means for the product.

8. In a calculating machine, the combination with means for setting up a divisor in the machine and for printing said divisor by a single operation of the operator, of means for adjusting a dividend and means adapted to perform the division and to register the result thereof, comprising operating means and also registering means, one of which means is bodily movable relatively to the other and said operating means being adapted to simultaneously transfer two or more digits to said registering means, and typewriting mechanism including a paper carriage and means to shift the paper carriage sidewise opposite the printing means for the divisor.

9. In a calculating machine, the combination with means for setting up a divisor, of means for adjusting a dividend in the machine and for printing said dividend by a single operation of the operator, means adapted to perform the division and to register the result thereof comprising operating means and also registering means, one of which means is bodily movable relatively to the other and said operating means being adapted to simultaneously transfer two or more digits to said registering means, and typewriting mechanism including a paper carriage and means to shift the paper carriage sidewise opposite the printing means for the dividend.

10. In a calculating machine, the combination with means for setting up a divisor, of means for adjusting a dividend, means adapted to perform the division and to register and print the result thereof, comprising operating means and also registering means, one of which means is bodily movable relatively to the other and said operating means being adapted to simultaneously transfer two or more digits to said registering means, and typewriting mechanism including a paper carriage and means to shift the paper carriage sidewise opposite the printing means for the quotient.

11. In a calculating machine, the combination with means for setting up a multiplicand, operating means forming part of a means for multiplication and registering means forming another part of said means for multiplication, and one of said means being bodily movable relatively to the other, and said operating means being adapted to simultaneously transfer two or more digits to said registering means, an extra registering device to show the sum of the multiplicands of two or more multiplications registered upon the extra registering device, and means to successively adjust the extra register in accordance with the multiplicand to be added.

12. In a calculating machine, the combination with means for setting up a multiplicand, operating means forming part of a means for multiplication and registering means forming another part of said means for multiplication, and one of said means being bodily movable relatively to the other, and said operating means being adapted to simultaneously transfer two or more digits to said registering means, an extra registering device to show the sum of the multipliers of two or more multiplications registered upon the extra registering device, and means to successively adjust the extra register in accordance with the multiplier to be added.

13. In a calculating machine, the combination with means for setting up a multiplicand, operating means forming part of a means for multiplication and registering means forming another part of said means for multiplication, and one of said means being bodily movable relatively to the other, and said operating means being adapted to simultaneously transfer two or more digits to said registering means, an extra registering device to show the sum of the products of two or more multiplications registered upon the extra registering device, and means to successively adjust the extra register in accordance with the product to be added.

14. In a calculating machine, the combination with means for setting up a multiplicand, operating means forming part of a means for multiplication and registering means forming another part of said means for multiplication, and one of said means being bodily movable relatively to the other, and said operating means being adapted to simultaneously transfer two or more digits to said registering means, an extra registering device to show the difference of the multiplicands of two or more multiplications registered upon the extra registering device, and means to successively adjust the extra register in accordance with the multiplicand to be subtracted.

15. In a calculating machine, the combination with means for setting up a multiplicand, operating means forming part of a means for multiplication and registering means forming another part of said means for multiplication, and one of said means being bodily movable relatively to the other, and said operating means being adapted to simultaneously transfer two or more digits to said registering means, an extra registering device to show the difference of the multipliers of two or more multiplications registered upon the extra registering device, and means to successively adjust the extra register in accordance with the multiplier to be subtracted.

16. In a calculating machine, the combination with means for setting up a multiplicand, operating means forming part of a means for multiplication and registering means forming another part of said means for multiplication and one of said means being bodily movable relatively to the other, and said operating means being adapted to simultaneously transfer two or more digits to said registering means, an extra registering device to show difference of the products of two or more multiplications registered upon the extra registering device, and means to successively adjust the extra register in accordance with the product to be subtracted.

17. In a calculating machine, the combination with means for setting up a dividend, operating means forming part of a means for division and registering means forming another part of said means for division, and one of said means being bodily movable relatively to the other, an extra registering device to show the sum of the dividends of two or more divisions registered upon the extra registering device, and means to successively adjust the extra register in accordance with the dividend to be added.

18. In a calculating machine, the combination with means for setting up a dividend, operating means forming part of a means for division and registering means forming another part of said means for division, and one of said means being bodily movable relatively to the other, an extra registering device to show the sum of the divisors of two or more divisions registered upon the extra registering device, and means to successively adjust the extra register in accordance with the divisor to be added.

19. In a calculation machine, the combination with means for setting up a dividend, operating means forming part of a means for division and registering means forming another part of said means for division, and one of said means being bodily movable relatively to the other, an extra registering device to show the sum of the quotients of two or more divisions registered upon the extra registering device, and means to successively adjust the extra register in accordance with the quotient to be added.

20. In a calculating machine, the combination with means for setting up a dividend, operating means forming part of a means for division and registering means forming another part of said means for division, and one of said means being bodily movable relatively to the other, an extra registering device to show the difference of the dividends of two or more divisions registered upon the extra registering device, and means to successively adjust the extra register in accordance with the dividends to be subtracted.

21. In a calculating machine, the combination with means for setting up a dividend, operating means forming part of a means for division and registering means forming another part of said means for division, and one of said means being bodily movable relatively to the other, an extra registering device to show the difference of the divisors of two or more divisions registered upon the extra registering device, and means to successively adjust the extra register in accordance with the divisor to be subtracted.

22. In a calculating machine, the combination with means for setting up a dividend, operating means forming part of a means for division and registering means forming another part of said means for division, and one of said means being bodily movable relatively to the other, an extra registering device to show the difference of the quotients of two or more divisions registered upon the extra registering device, and means to successively adjust the extra register in accordance with the quotient to be subtracted.

23. In a calculating machine, the combination of means for setting up a selected number, an adjusting means, adapted to represent a number, and means for introducing from said setting up means to said adjusting means a certain number by over multiplication by ten and subtraction by a complement of the number set up to give the number desired.

24. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the multiplier upon registers containing several registering wheels rotating upon the same axis, a catch rotating with each numeral wheel and adapted to be moved into the numeral wheel of higher order, and means to move the catch into the numeral wheel of higher order when a carrying has to be performed.

25. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the multiplicand upon registers containing several registering wheels rotating upon the same axis, a catch rotating with each numeral wheel and adapted to be moved into the numeral wheel of higher order, and means to move the catch into the numeral wheel of higher order when a carrying has to be performed.

26. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the product upon registers containing several registering wheels rotating upon the same axis, a catch rotating with each numeral wheel and adapted to be moved into the numeral wheel of higher order, and means to move the catch into the numeral wheel of higher order when a carrying has to be performed.

27. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the multiplier from registers containing several registering wheels rotating upon the same axis, a catch rotating with each numeral wheel and adapted to be moved into the numeral wheel of higher order, and means to move the catch into the numeral wheel of higher order when a carrying has to be performed.

28. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the multiplicand from registers containing several registering wheels rotating upon the same axis, a catch rotating with each numeral wheel and adapted to be moved into the numeral wheel of higher order, and means to move the catch into the numeral wheel of higher order when a carrying has to be performed.

29. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the product from registers containing several registering wheels rotating upon the same axis, and a catch rotating with each numeral wheel and adapted to be moved into the numeral wheel of higher order when a carrying has to be performed.

30. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the multiplier upon registers containing registering wheels, a carrying mechanism between the registering wheels, an axis upon which the registering wheels are mounted, and a catch movable along the axis and adapted to transfer the movements of the axis to registering wheels of different digits.

31. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the multiplicand upon registers containing registering wheels, a carrying mechanism between the registering wheels, an axis upon which the registering wheels are mounted, and a catch movable along the axis and adapted to transfer the movements of the axis to registering wheels of different digits.

32. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the product upon registers containing registering wheels, a carrying mechanism between the registering wheels, an axis upon which the registering wheels are mounted, and a catch movable along the axis and adapted to transfer the movements of the axis to registering wheels of different digits.

33. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the multiplier from registers containing registering wheels, a carrying mechanism between the registering wheels, an axis upon which the registering wheels are mounted, and a catch movable along the axis and adapted to transfer the movements of the axis to registering wheels of different digits.

34. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the multiplicand from registers containing registering wheels, a carrying mechanism between the registering wheels, an axis upon which the registering wheels are mounted, and a catch movable along the axis and adapted to transfer the movements of the axis to registering wheels of different digits.

35. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the product from registers containing registering wheels, a carrying mechanism between the registering wheels, an axis upon which the registering wheels are mounted, and a catch movable along the axis and adapted to transfer the movements of the axis to registering wheels of different digits.

36. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the multiplier upon registers containing registering wheels, and an axis upon which the registering wheels are mounted and by which the necessary movements are transferred to the registering wheels.

37. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the multiplicand upon registers containing registering wheels, and an axis upon which the registering wheels are mounted and by which the necessary movements are transferred to the registering wheels.

38. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to add the product upon registers containing registering wheels, and an axis upon which the registering wheels are mounted, and by which the necessary movements are transferred to the registering wheels.

39. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the multiplier from registers containing registering wheels, and an axis upon which the registering wheels are mounted and by which the necessary movements are transferred to the registering wheels.

40. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the multiplicand from registers containing registering wheels, and an axis upon which the registering wheels are mounted and by which the necessary movements are transferred to the registering wheels.

41. In a calculating machine, the combination with means for setting up a multiplicand, of means to perform the multiplication with a multiplier selected comprising operating means and also registering means, one of which means is bodily movable relatively to the other and said operating means being adapted to simultaneously transfer two or more digits to said registering means, means to subtract the product from registers containing registering wheels, and an axis upon which the registering wheels are mounted and by which the necessary movements are transferred to the registering wheels.

42. In a calculating machine, the combination with means for setting up a multiplicand, of registering devices, means to add or subtract the multiplicand set up to said registering devices, means to change the position of the multiplicand relative to said registering devices to different denominations, and a set of keys for setting up the multiplier, causing an addition followed by a change to lower denomination and a number of subtractions in accordance with the multiplier set up.

43. In a calculating machine, the combination with means for setting up a multiplicand, of registering devices, means to add or subtract the multiplicand set up to said registering devices, means to change the positions of the multiplicand relative to said registering devices to different denominations, and two kinds of setting devices for setting up the multiplier, one kind of which causes primarily a change to a lower denomination, followed by a number of additions, the other an addition followed by a change to lower denomination and a number of subtractions.

44. In a calculating machine, comprising numeral wheels and depressible keys arranged in series, and a slidable pinion adapted through intermediate mechanism to actuate said numeral wheels, means for moving the pinion to proper position to engage with said mechanism, comprising a carrier for the pinion, a spring under tension acting thereon, a latch holding the carrier stationary, a bar extending along the series of keys and adapted to release said latch, and a stop secured to each key and adapted to be interposed in the path of the carrier when said key is depressed.

45. In a calculating machine, comprising numeral wheels and depressible keys arranged in series, and a slidable pinion adapted through intermediate mechanism to actuate said numeral wheels, means for moving the pinion to proper position to engage with said mechanism, comprising a carrier for the pinion, a spring under tension secured thereto, a latch holding the carrier stationary, means for releasing the latch through the depression of any of the keys and a stop for the carrier secured to the key depressed.

46. In a calculating machine, the combination of means for setting up a number in a product counter, means for setting up a multiplier, means for setting up a multiplicand on a key-board, means for performing the operation of multiplication with the multiplicand and multiplier set up, by deducting the product from the product counter.

47. In a calculating machine, the combination with means for setting up a multiplicand, of regulating means, means adapted when put into operation to perform the operation of multiplication with a multiplier, set up in the regulating means, and means to adjust the regulating means during such operation so that the machine begins to calculate before finishing the setting up of the multiplier.

48. In a calculating machine, the combination with means for setting up a multiplicand, of registering means, means to add the multiplicand set up to the registering means, regulating means to regulate the number of additions in accordance with their adjustment representing a digit of the multiplier, adjusting means for setting up the regulating means controlled by a key-board adjustable during a digit calculation, and means to transfer the figure set up in the adjusting means to the regulating means after the end of a digit calculation.

49. In a calculating machine, comprising numeral wheels and keys arranged in series and a movable pinion, adapted, through intermediate mechanism to actuate the said numeral wheels different amounts, and means operated by each key for moving said pinion to engage with said mechanism.

50. In a calculating machine, comprising numeral wheels and keys arranged in series and a pinion, adapted, through intermediate mechanism, to actuate the said numeral wheels, and a slide adapted to travel in a line parallel with and throughout the range of said series of keys and connecting with said pinion.

51. In a calculating machine, comprising numeral wheels and keys arranged in series and a pinion, adapted, through intermediate mechanism, to actuate the said numeral wheels, and a slide adapted to travel in a line parallel with and throughout the range of said series of keys and connecting with said pinion, said slide constituting means for pushing back the pinion to its initial position after such engagement.

52. In a calculating machine, comprising numeral wheels and depressible keys arranged in series and a slidable pinion adapted, through intermediate mechanism, to actuate said numeral wheels, means for moving the pinion to proper position to engage with said mechanism, comprising a carrier for the pinion, a spring under tension secured thereto, a latch holding the carrier stationary, means for releasing the latch through the depression of any of the keys, and a stop for the carrier secured to the key depressed.

53. In a calculating machine, comprising numeral wheels and keys arranged in series and a slidable pinion, adapted, through intermediate mechanism to actuate said numeral wheels, means for moving the pinion to proper position to engage said mechanism, a latch holding the pinion stationary, and means for automatically replacing the latch in its initial position.

54. In a calculating machine, comprising numeral wheels and keys arranged in series and a pinion. adapted, through intermediate mechanism, to actuate the said numeral wheels, a slide adapted to travel in a line parallel with said series of keys and connecting with said pinion, and a spring under tension acting upon said slide.

55. In a calculating machine in combination, an indicator, operating mechanism adapted to move said indicator different amounts depending on the different points at which said operating mechanism is connected with said indicator, and selecting mechanism comprising a connector movable to each of such points, a key corresponding to each of such points, and mechanism to move said connector to such points, controlled by said keys.

56. In a calculating machine in combination, an indicator, a series of members each adapted to operate said indicator a different amount and adapted to be separately connected with the same, and selecting mechanism comprising a series of keys and a movable connector controlled thereby, adapted to independently connect any one of said members with said indicator through said connector.

In testimony whereof, I have signed my name to this specification in the presence of two subscribing witnesses.

ALEXANDER RECHNITZER.

Witnesses:
 JOHANN GÜNGLE,
 AUGUST FUGGER.